(12) United States Patent  
Asami

(10) Patent No.: US 9,176,305 B2  
(45) Date of Patent: Nov. 3, 2015

(54) IMAGING LENS AND IMAGING APPARATUS

(71) Applicant: FUJIFILM Corporation, Tokyo (JP)

(72) Inventor: Taro Asami, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 173 days.

(21) Appl. No.: 13/911,496

(22) Filed: Jun. 6, 2013

(65) Prior Publication Data

US 2013/0265656 A1 Oct. 10, 2013

Related U.S. Application Data

(63) Continuation of application No. PCT/JP2011/007155, filed on Dec. 21, 2011.

(30) Foreign Application Priority Data

Dec. 22, 2010 (JP) .................................. 2010-286286

(51) Int. Cl.
*G02B 13/04* (2006.01)
*B60R 1/00* (2006.01)
(Continued)

(52) U.S. Cl.
CPC . *G02B 13/04* (2013.01); *B60R 1/00* (2013.01); *B60R 11/04* (2013.01); *G02B 13/0045* (2013.01); *G02B 13/06* (2013.01)

(58) Field of Classification Search
CPC ...... B60R 1/00; B60R 11/04; G02B 13/0045; G02B 13/04; G02B 13/06; G02B 13/045

USPC ......... 359/752, 713, 658, 687–689, 753, 756, 359/761, 628, 781, 784

See application file for complete search history.

(56) References Cited

U.S. PATENT DOCUMENTS 4,206,975 A 6/1980 Maeda
4,311,367 A 1/1982 Mori
(Continued)

FOREIGN PATENT DOCUMENTS

JP S5-449132 4/1979
JP S54-49132 4/1979
(Continued)

OTHER PUBLICATIONS

Japanese Office Action, dated Oct. 14, 2014, in corresponding Japanese Patent Application No. 2012-549641, with partial English translation.

(Continued)

*Primary Examiner* — Ricky Mack
*Assistant Examiner* — Mustak Choudhury
(74) *Attorney, Agent, or Firm* — Young & Thompson

(57) ABSTRACT

An imaging lens consists of negative first lens having a concave image-side surface, positive second lens, negative third lens, positive fourth lens, positive fifth lens having a convex image-side surface, and negative sixth lens, which are in this order from an object side. In the imaging lens, all of the lenses constituting the lens system are single lenses, which are not cemented lenses, and a stop is arranged closer to the object side than an image-side surface of the fourth lens is arranged. When a refractive index of a material of the third lens for d-line is Nd3, the following formula (1-1) is satisfied:

$Nd3 < 1.65$      (1-1).

19 Claims, 20 Drawing Sheets

(51) Int. Cl.
  *B60R 11/04*  (2006.01)
  *G02B 13/06*  (2006.01)
  *G02B 13/00*  (2006.01)

(56) References Cited

U.S. PATENT DOCUMENTS

| | | | |
|---|---|---|---|
| 4,806,001 | A | 2/1989 | Okabe et al. |
| 5,216,547 | A | 6/1993 | Ogata |
| 5,363,243 | A | 11/1994 | Takayuki et al. |
| 5,455,714 | A | 10/1995 | Kohno |
| 7,440,195 | B2 | 10/2008 | Hagimori et al. |
| 8,040,618 | B2 * | 10/2011 | Kitahara ............... 359/752 |
| 8,054,562 | B2 | 11/2011 | Asami |
| 2011/0249349 | A1 | 10/2011 | Asami |

FOREIGN PATENT DOCUMENTS

| | | | | |
|---|---|---|---|---|
| JP | S55-143517 | 11/1980 | | |
| JP | S62-173415 | 7/1987 | | |
| JP | H04-76511 | 3/1992 | | |
| JP | H05-88085 | 4/1993 | | |
| JP | H06-82697 | 3/1994 | | |
| JP | 10111454 | 4/1998 | | |
| JP | 10111454 A * | 4/1998 | ............. | G02B 13/04 |
| JP | H10-104519 | 4/1998 | | |
| JP | H11-119098 | 4/1999 | | |
| JP | H11-142730 | 5/1999 | | |
| JP | 2004-318102 | 11/2004 | | |
| JP | 2009-216858 | 9/2009 | | |
| JP | 2010107531 | 5/2010 | | |
| JP | 2011-237750 | 11/2011 | | |

OTHER PUBLICATIONS

Chinese Office Action, dated Nov. 25, 2014, in corresponding Chinese Patent Application No. 201180060952.7.

Chinese Official Action—201180060952.7—Jul. 28, 2015.

* cited by examiner

FIG.5 EXAMPLE 1
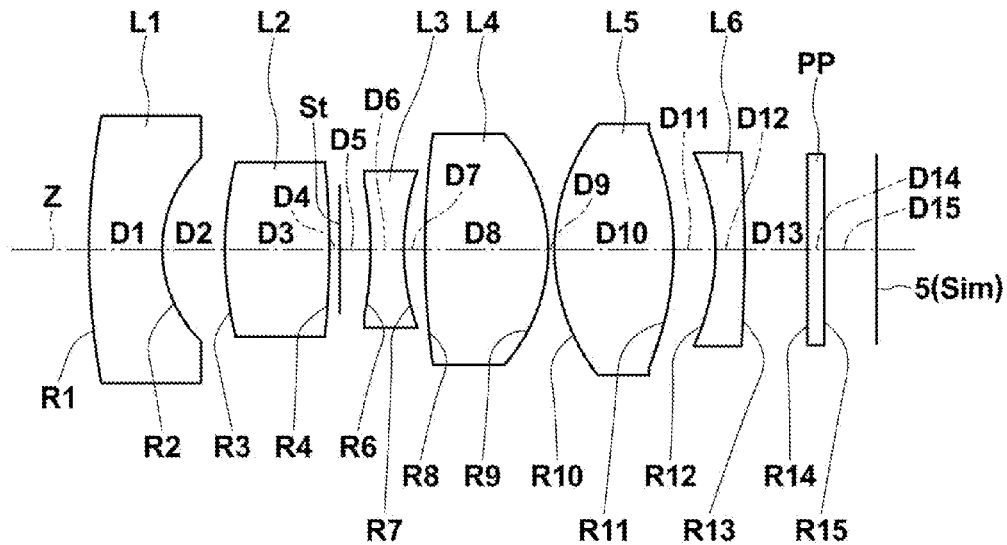
FIG.6 EXAMPLE 2
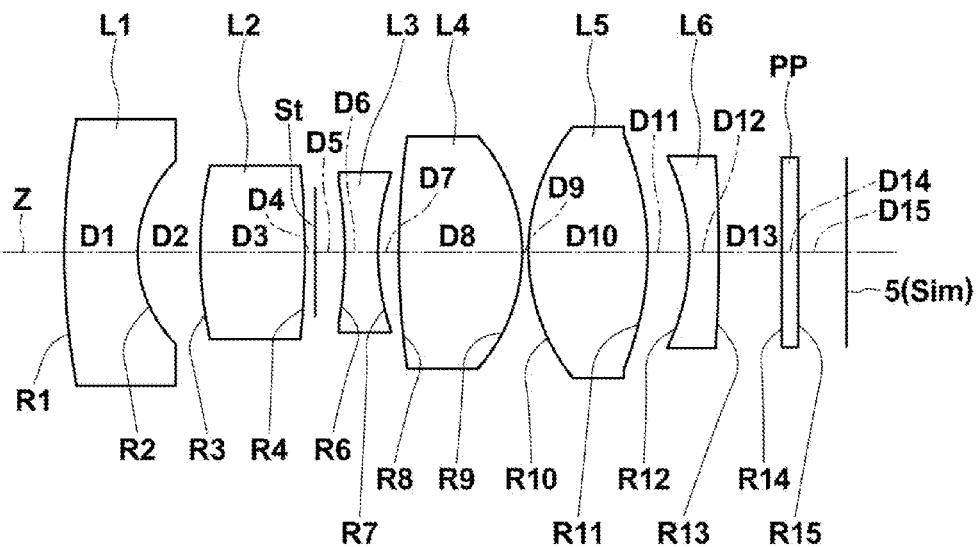

FIG.7  EXAMPLE 3
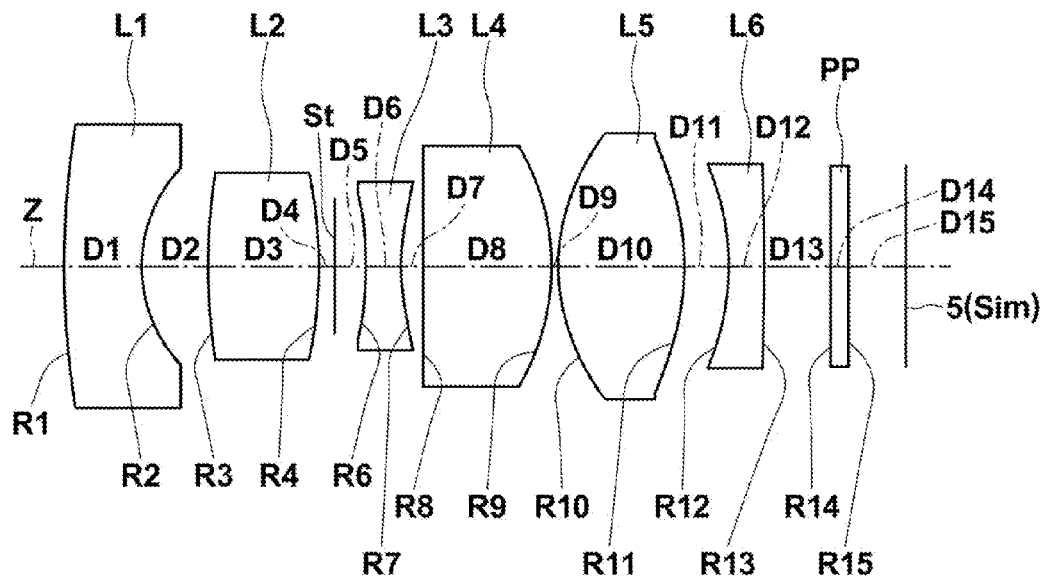
FIG.8  EXAMPLE 4
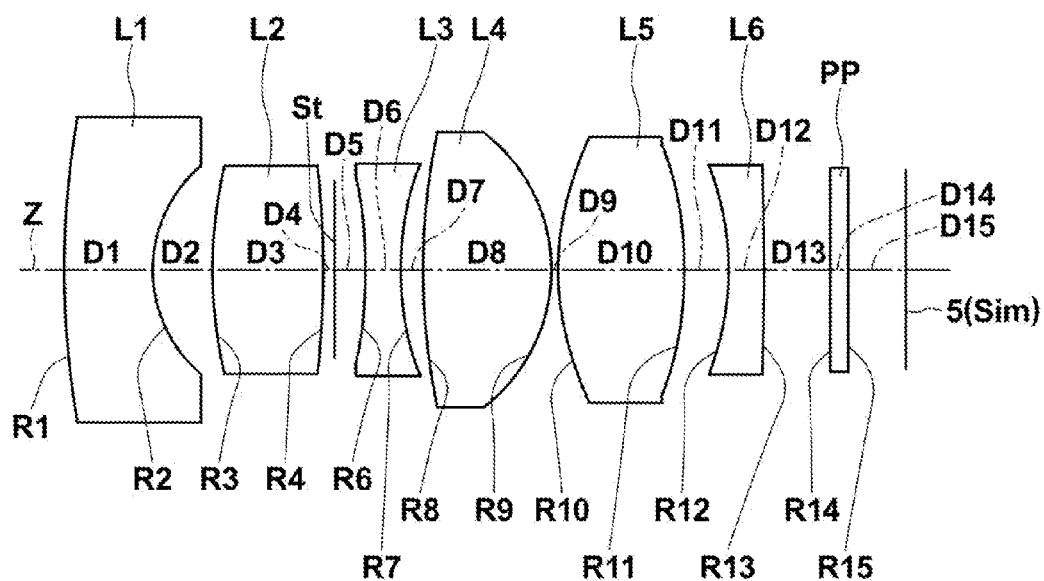

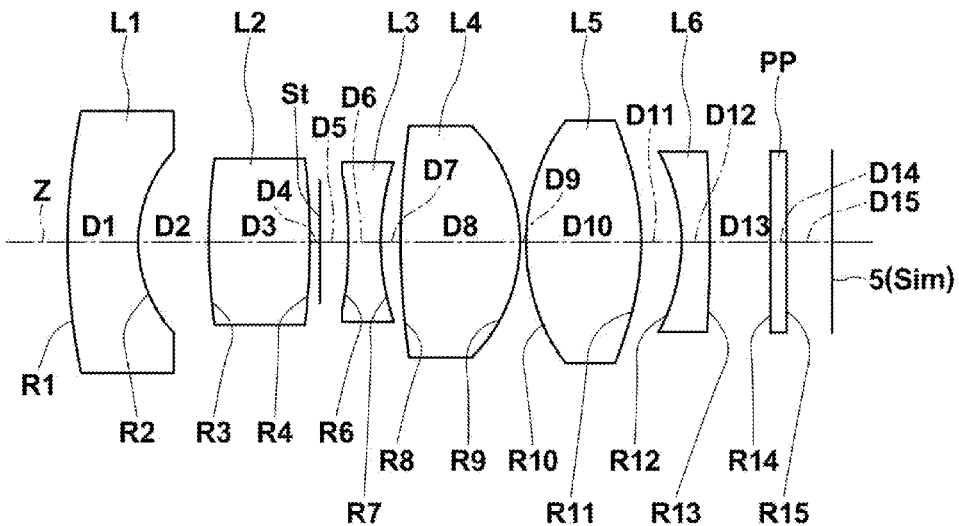
FIG.9 EXAMPLE 5
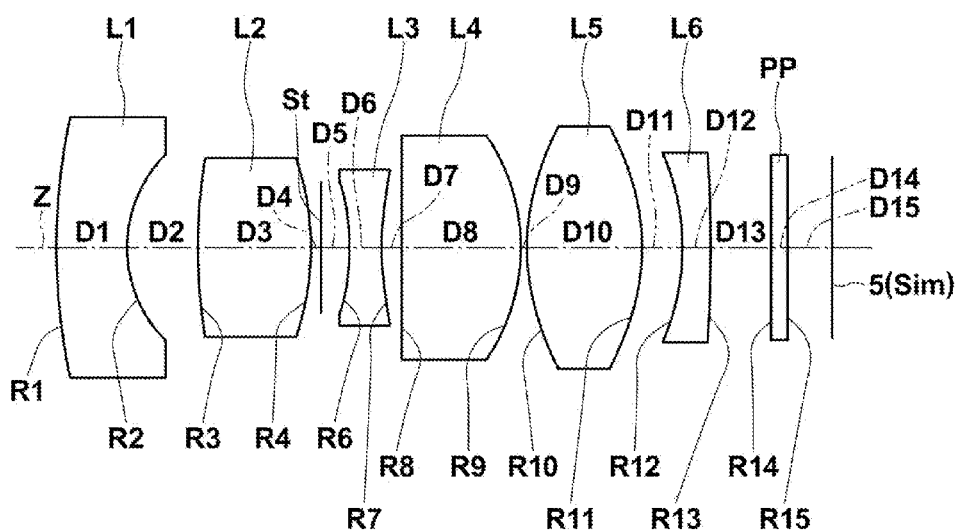
FIG.10 EXAMPLE 6

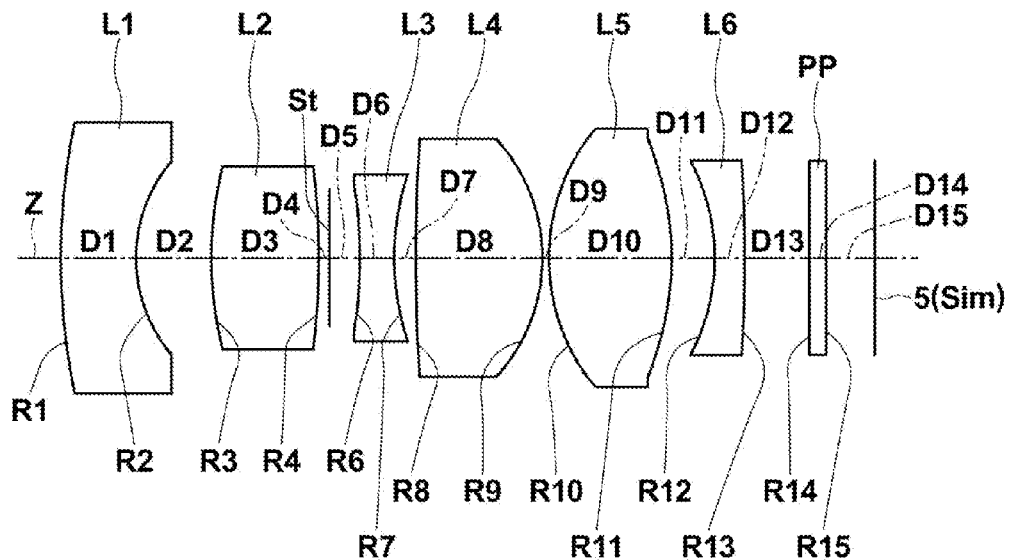
FIG.11  EXAMPLE 7
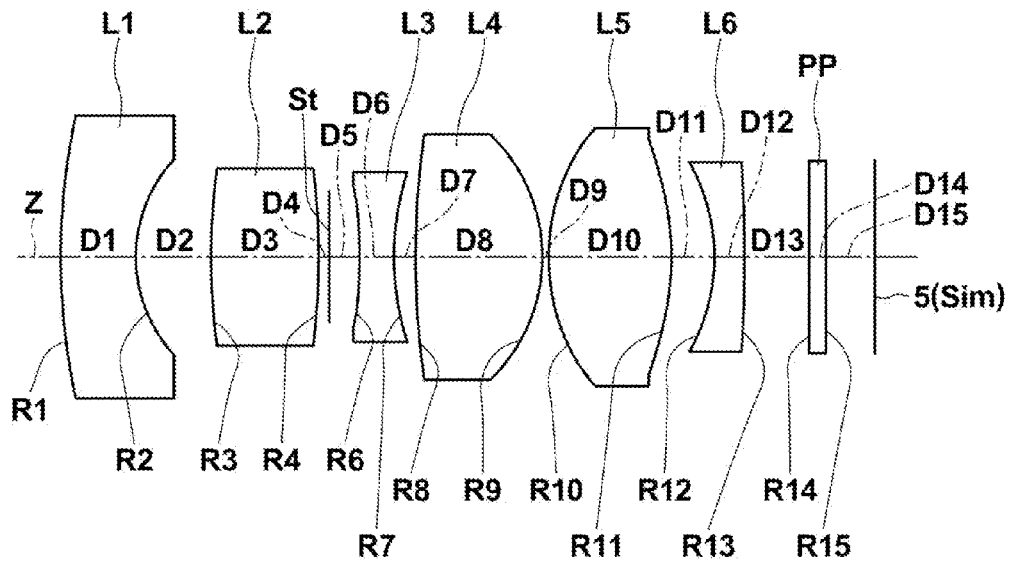
FIG.12  EXAMPLE 8

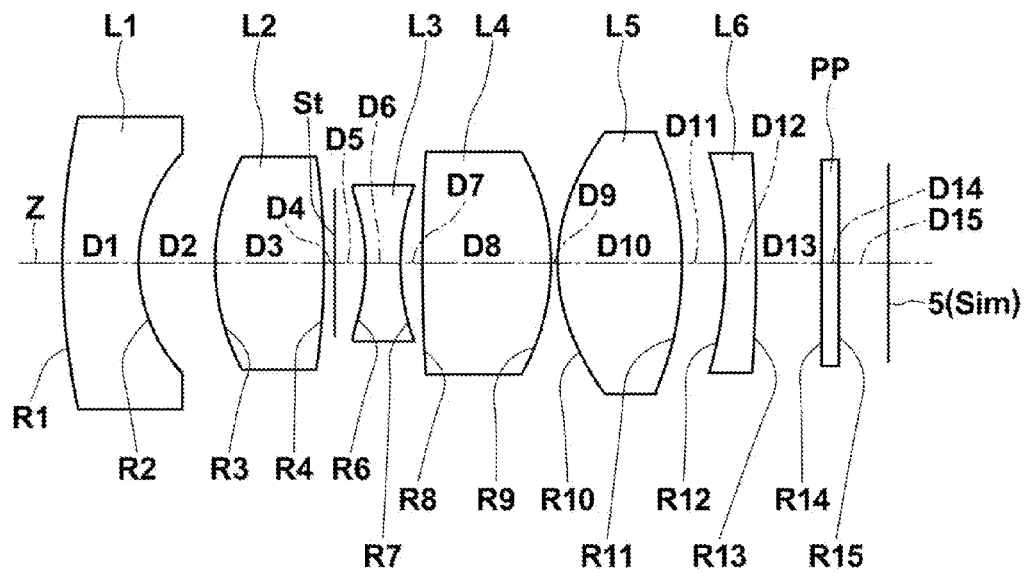
FIG.13  EXAMPLE 9
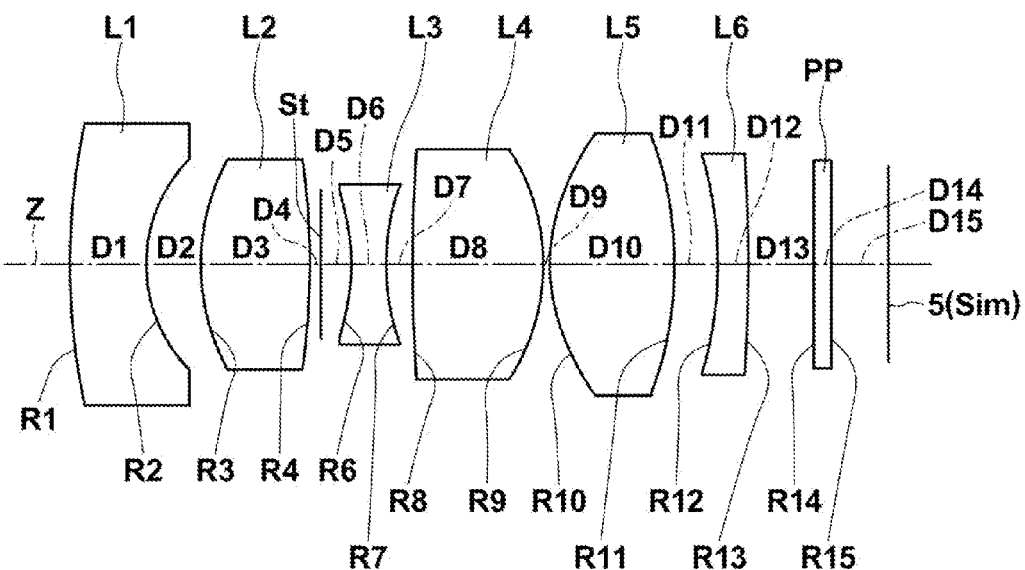
FIG.14  EXAMPLE 10

FIG.15   EXAMPLE 11
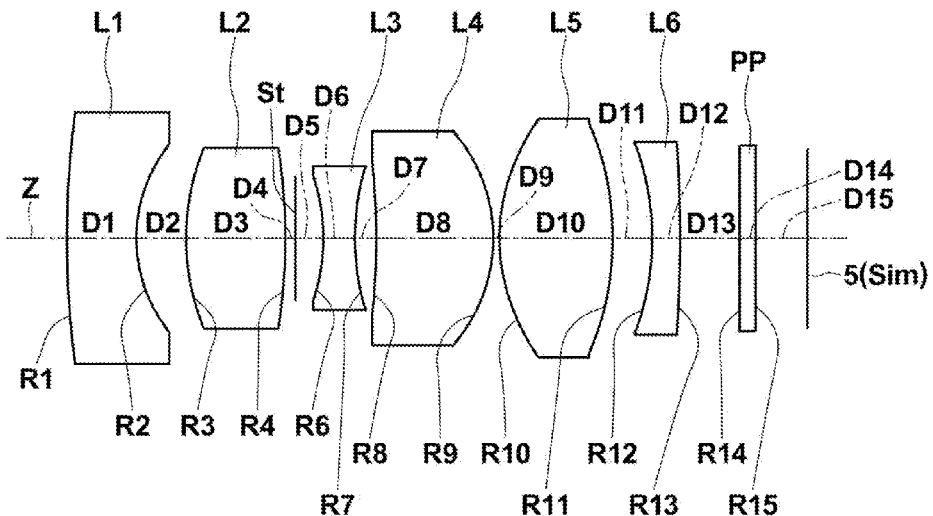
FIG.16   EXAMPLE 12
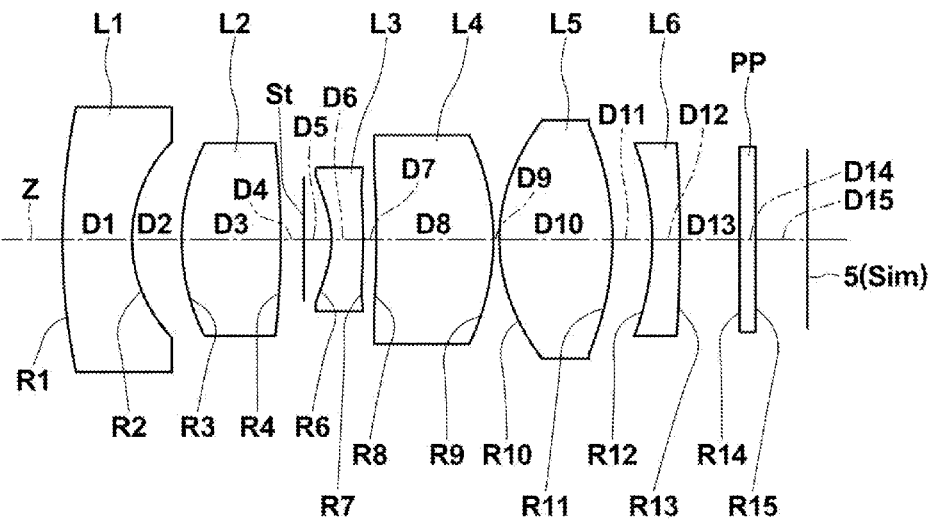

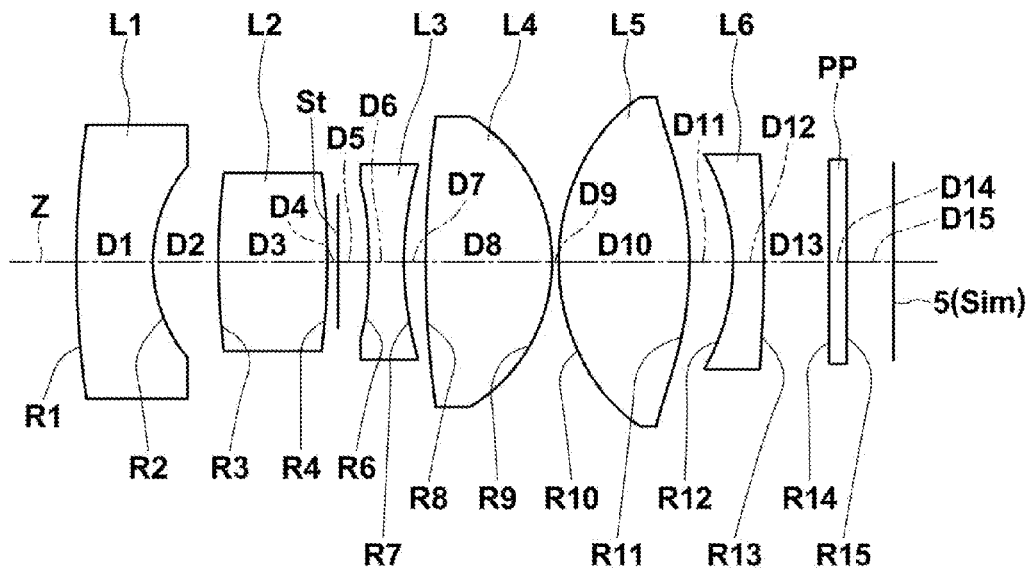
FIG.17 EXAMPLE 13
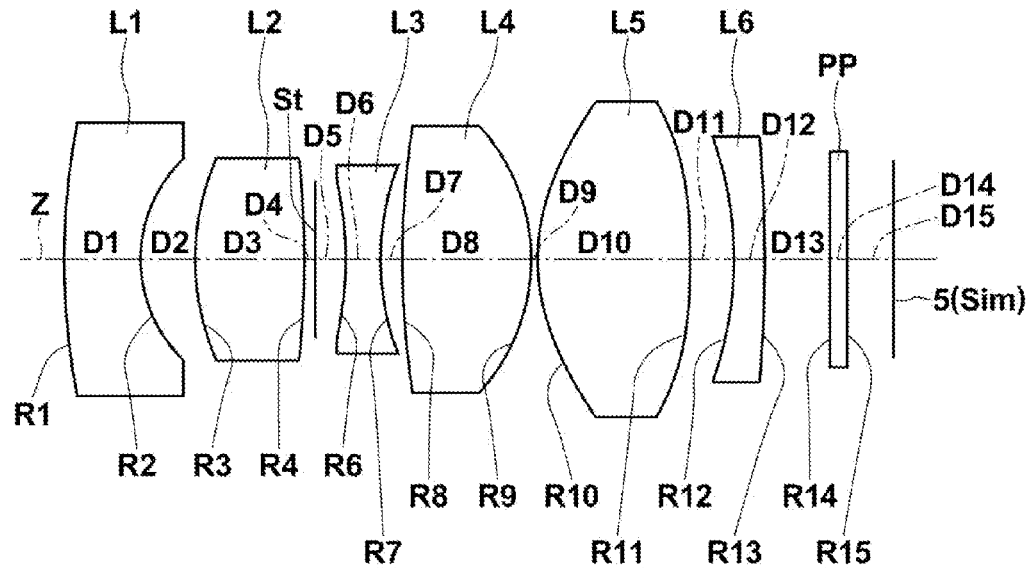
FIG.18 EXAMPLE 14

FIG.19 EXAMPLE 15
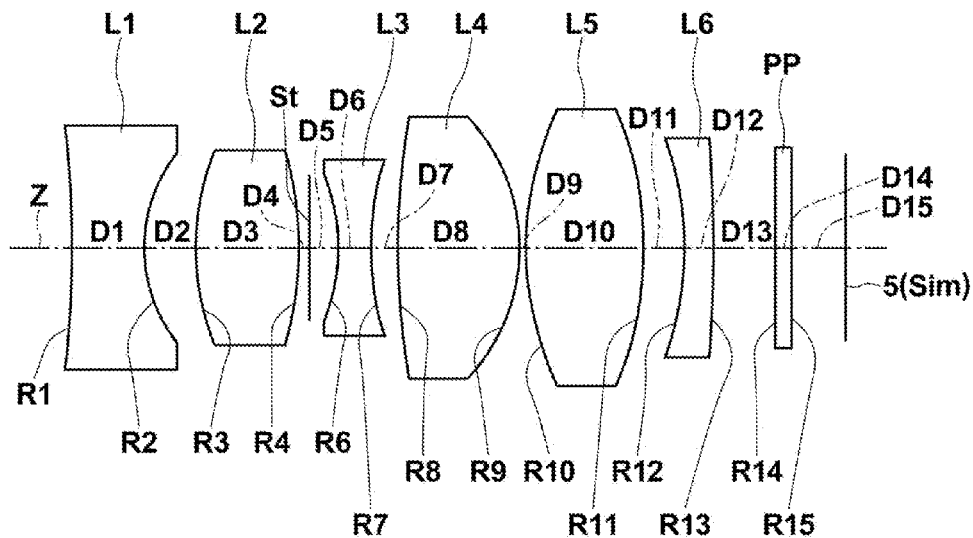
FIG.20 EXAMPLE 16
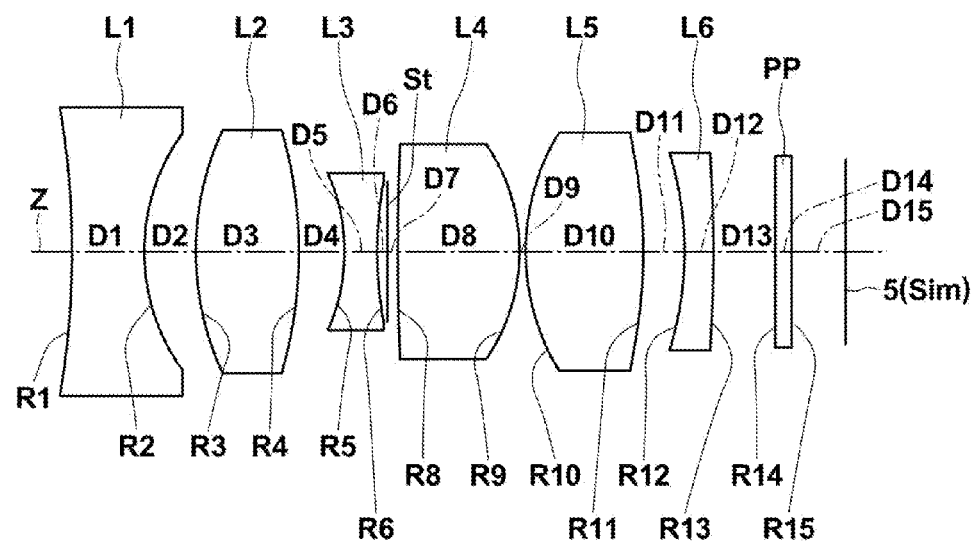

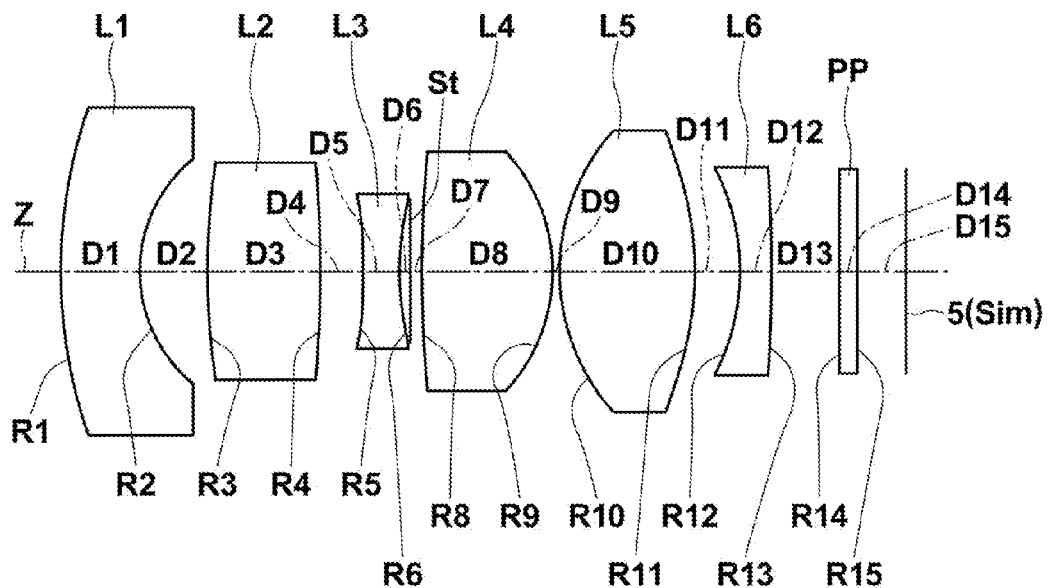
FIG.21 EXAMPLE 17
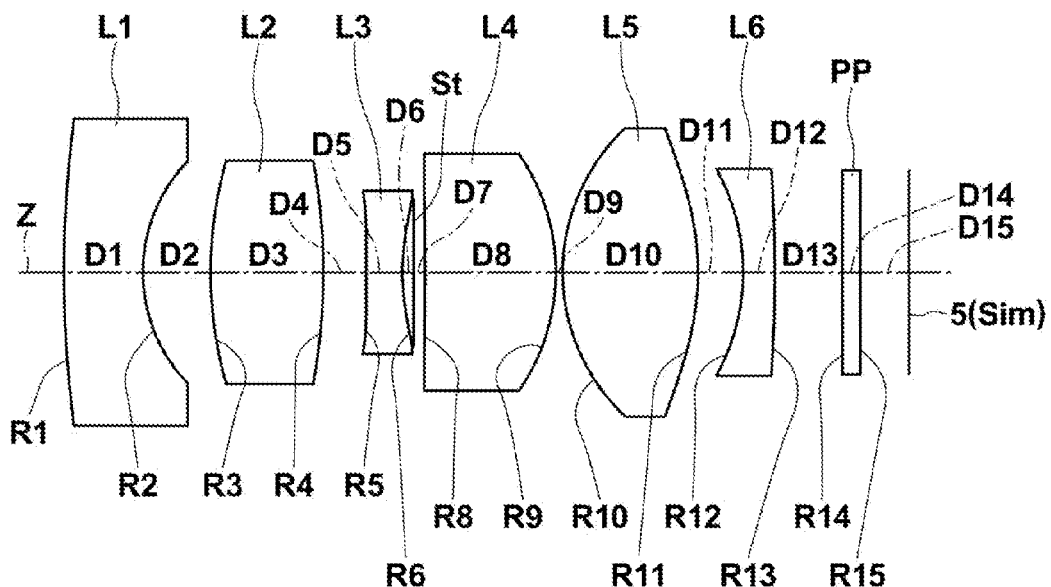
FIG.22 EXAMPLE 18

FIG.23 EXAMPLE 19
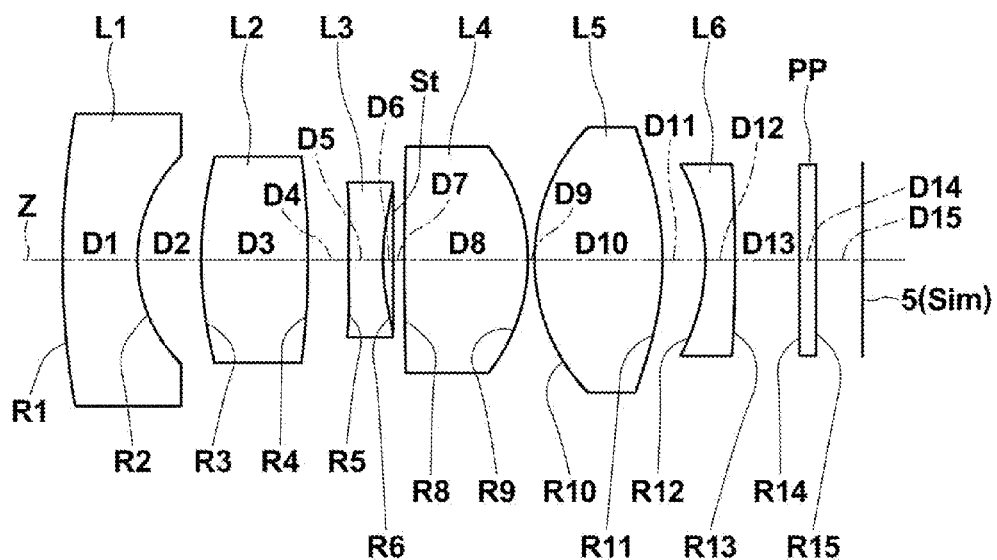
FIG.24 EXAMPLE 20
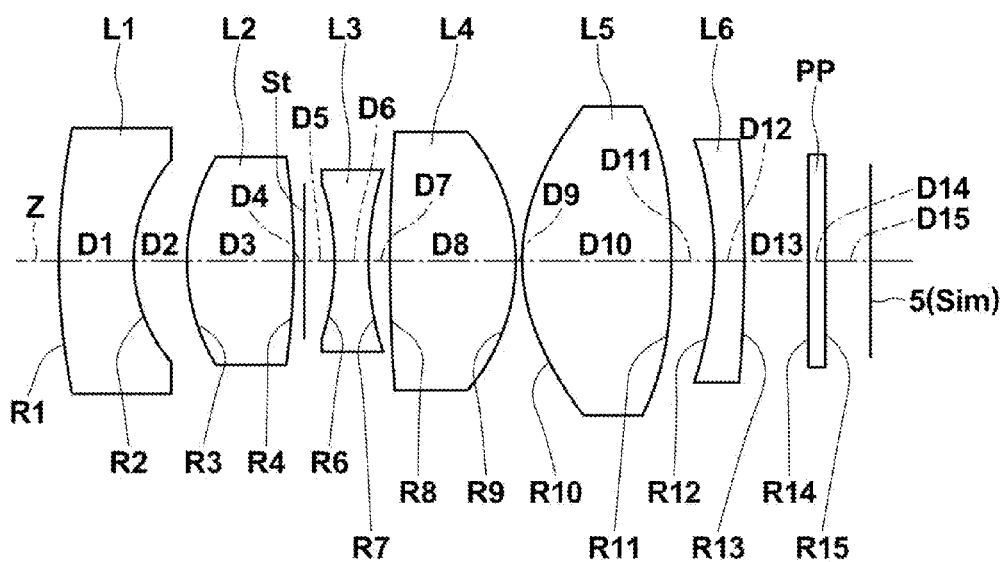

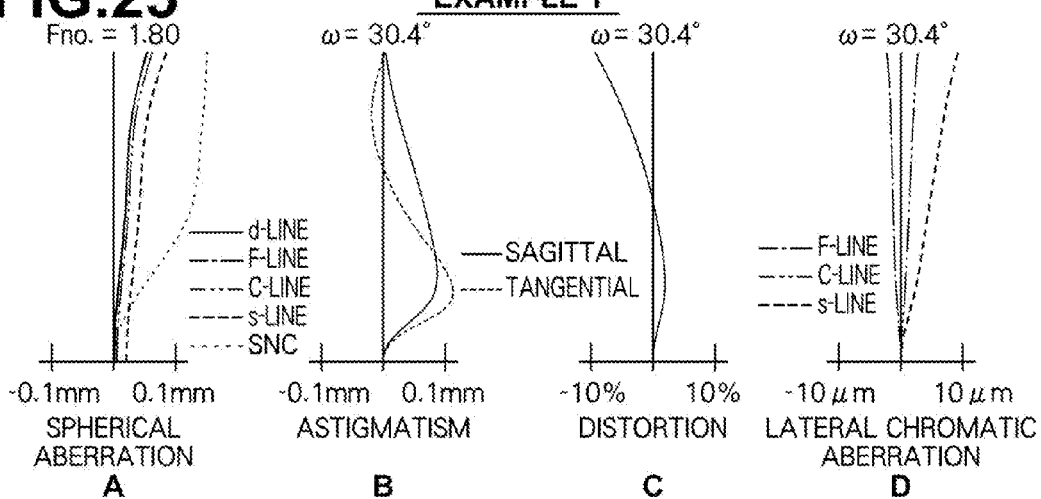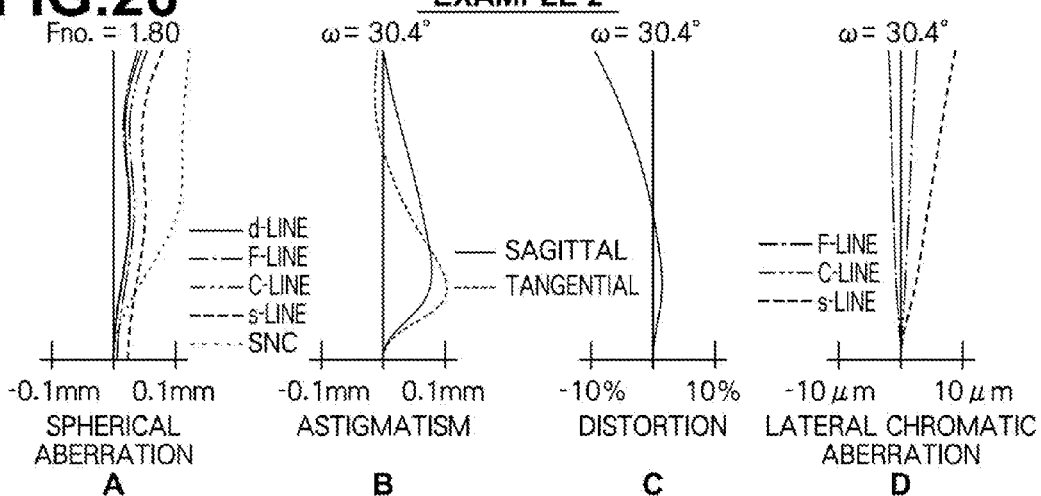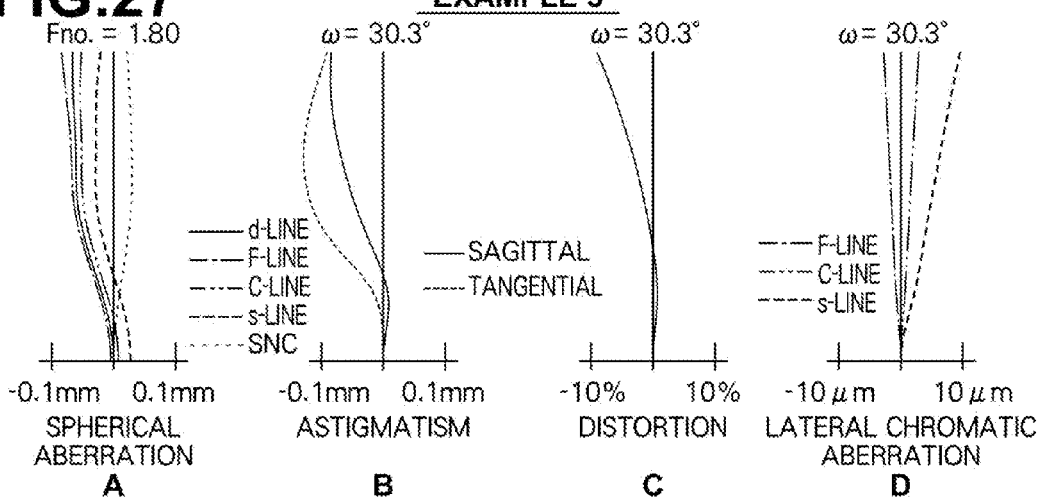

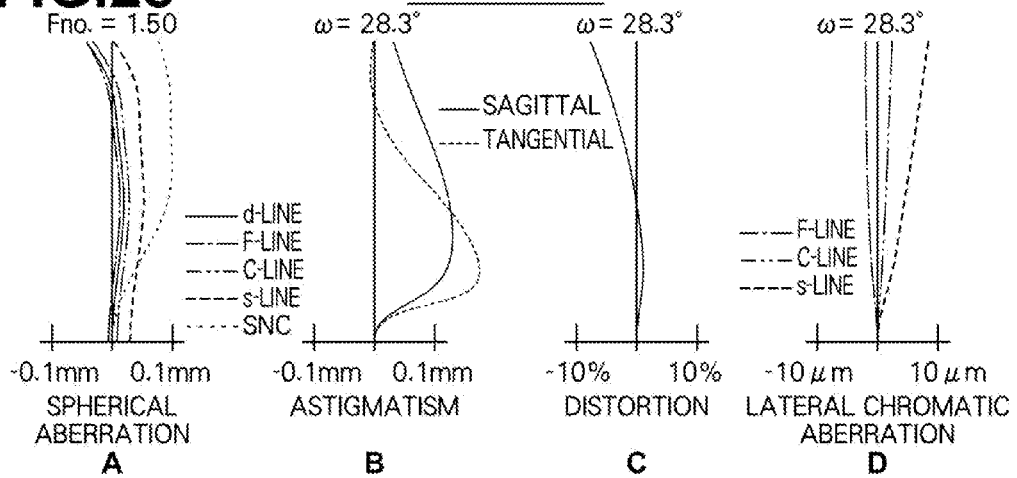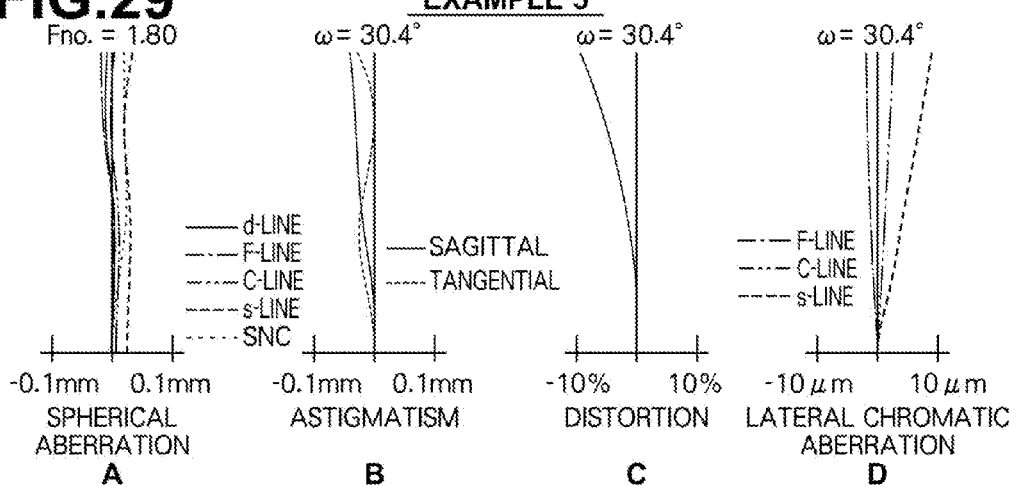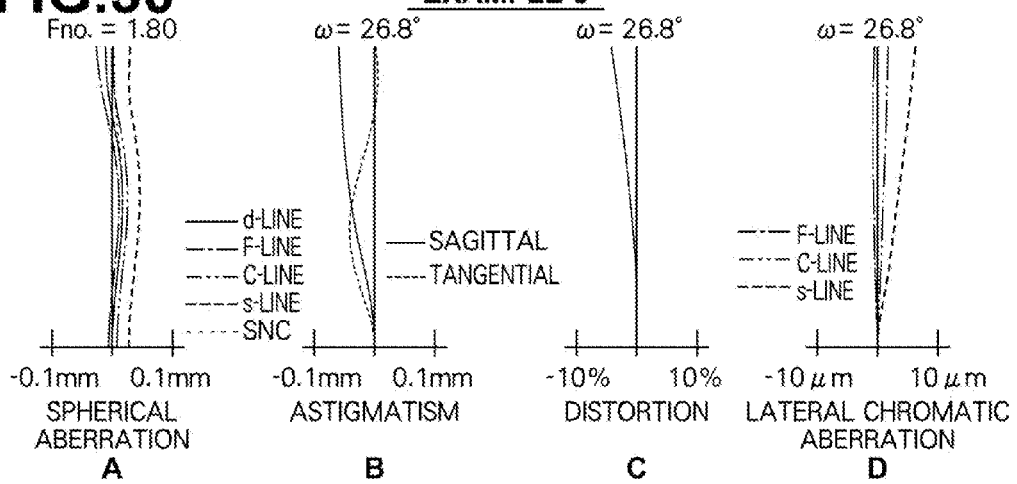

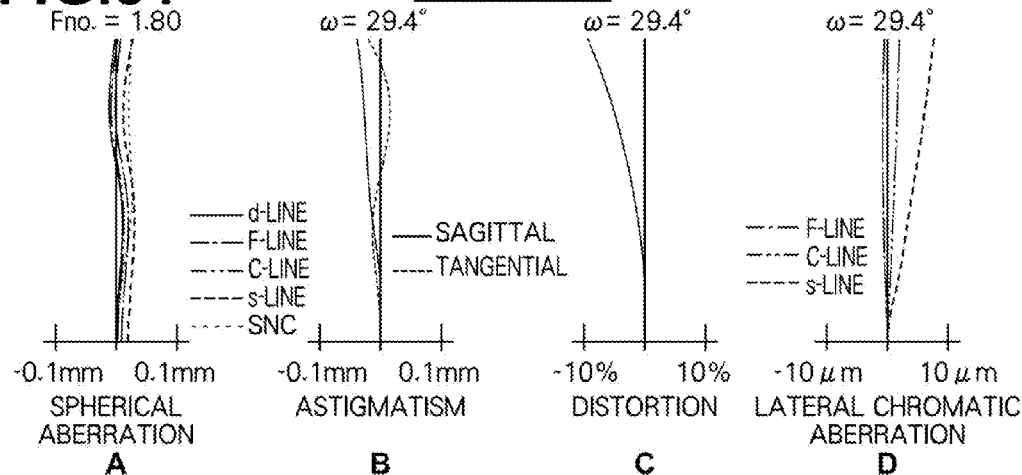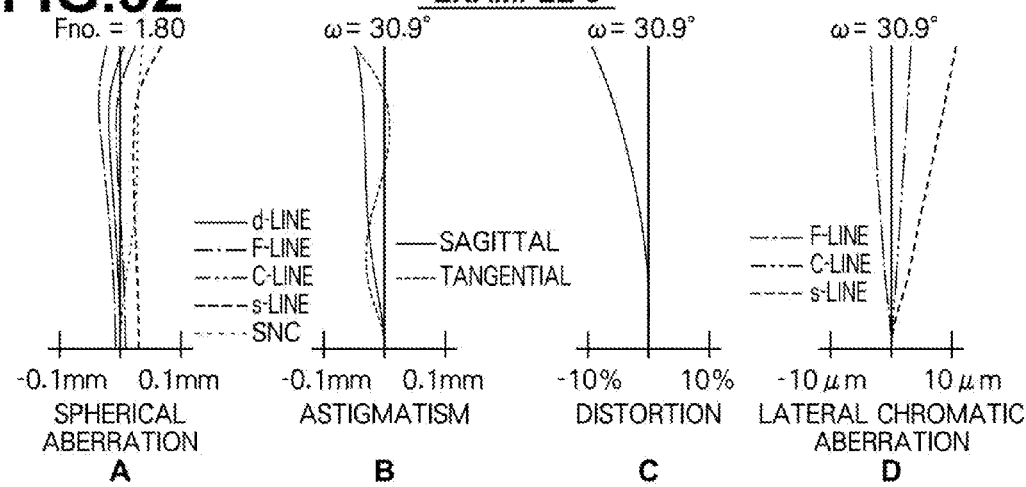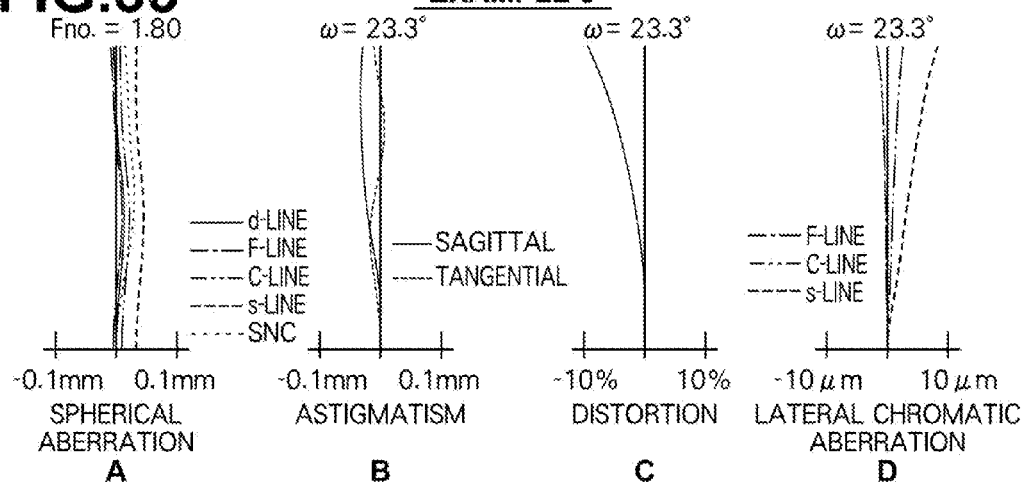

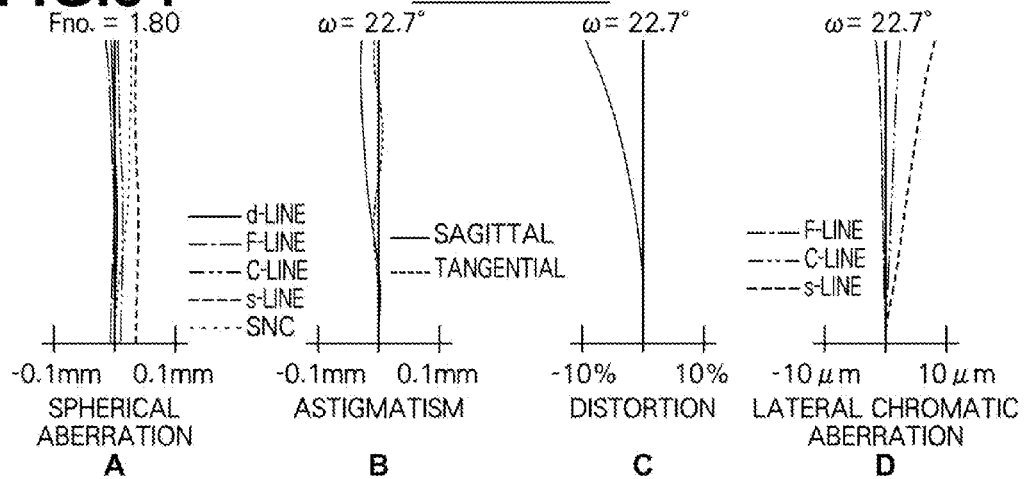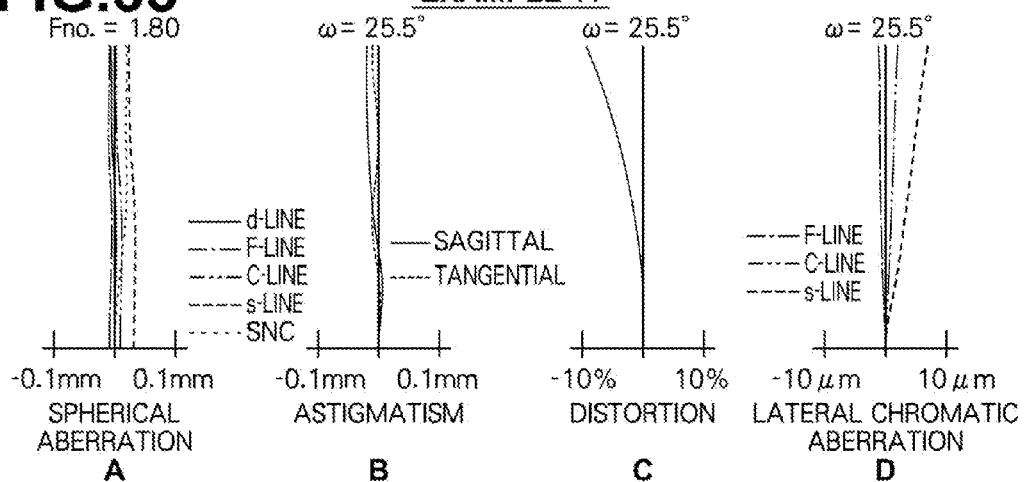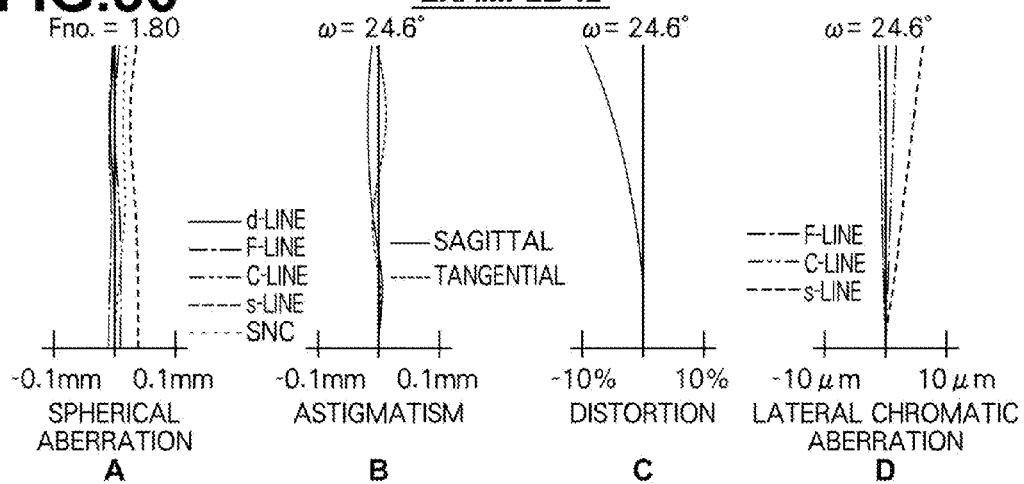

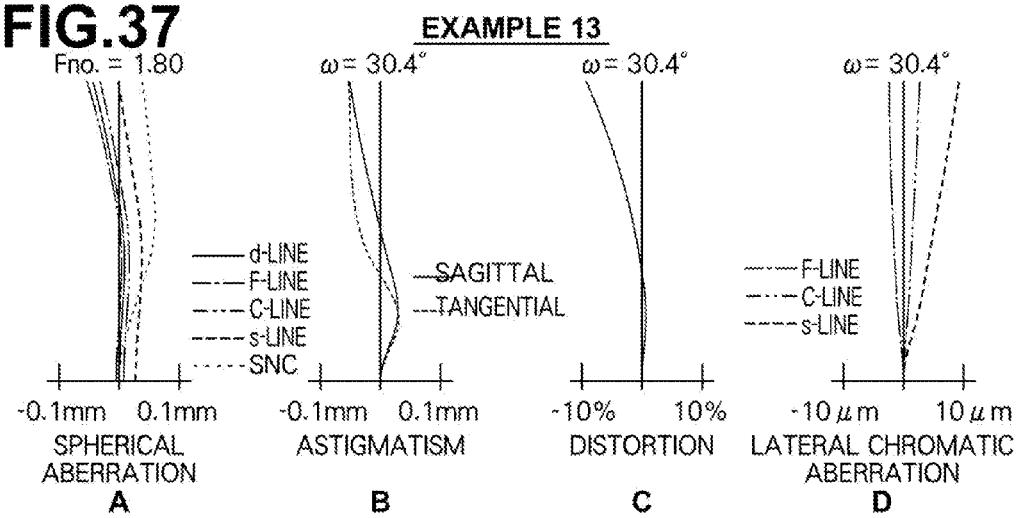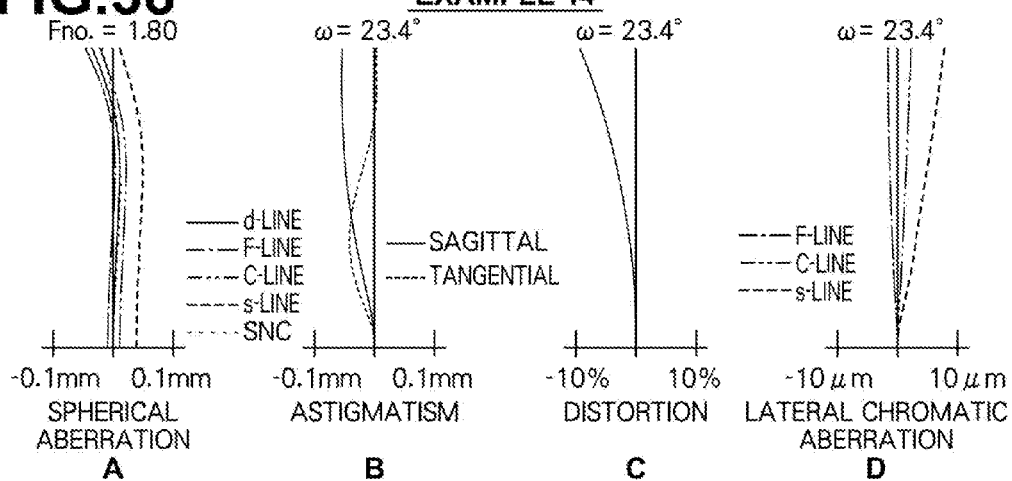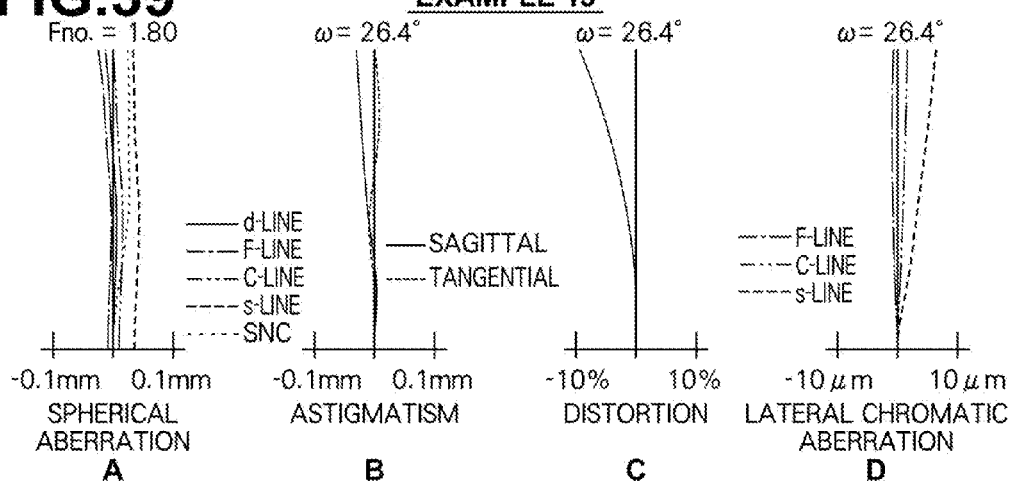

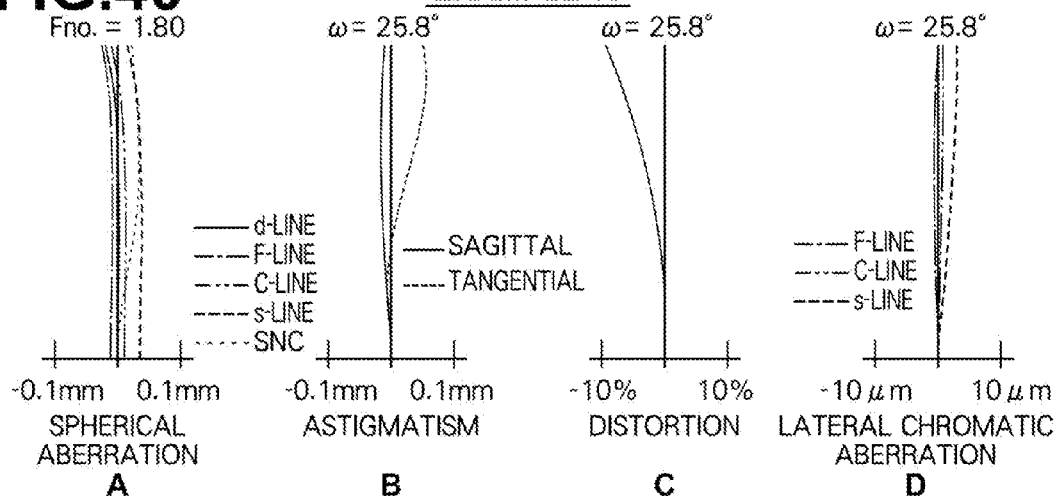
FIG.40 EXAMPLE 16
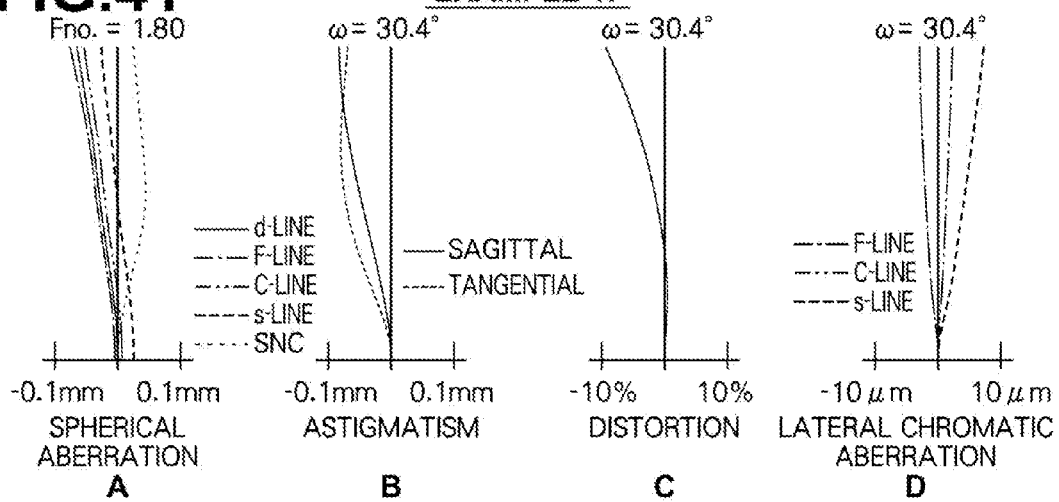
FIG.41 EXAMPLE 17
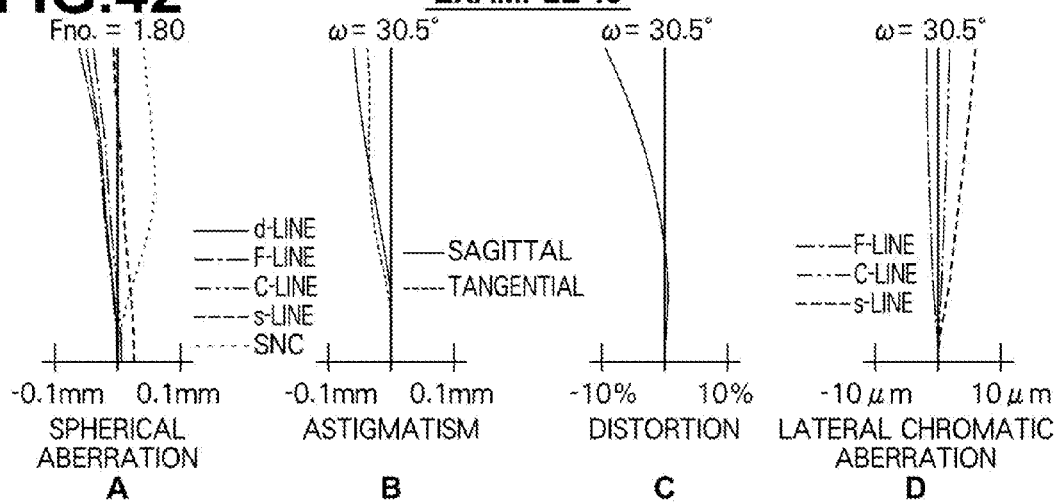
FIG.42 EXAMPLE 18

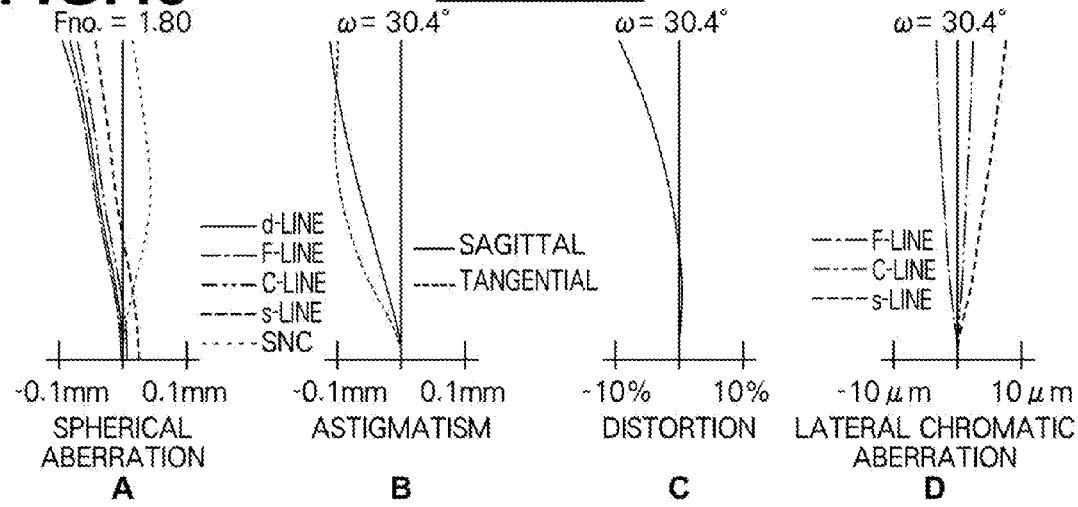
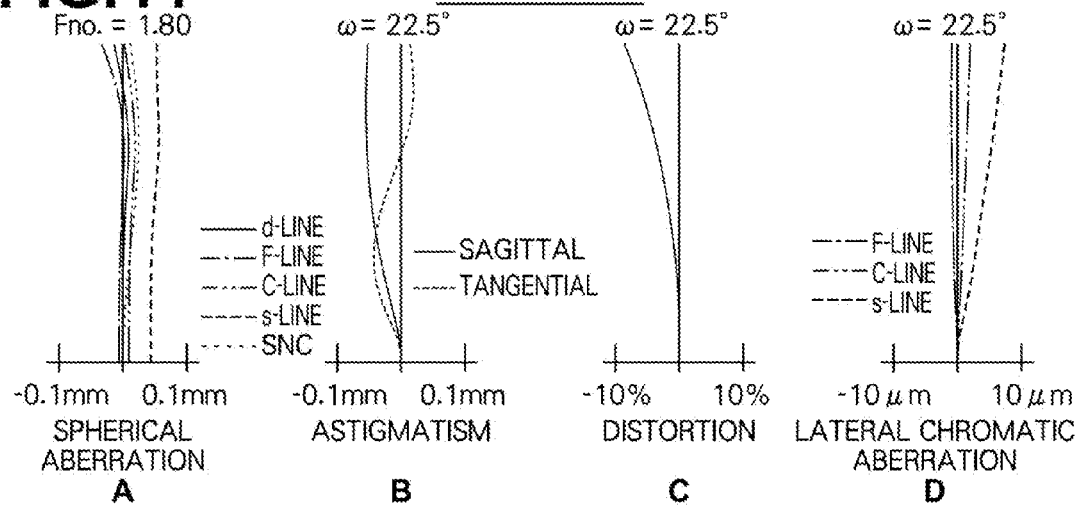

IMAGING LENS AND IMAGING APPARATUS

BACKGROUND OF THE INVENTION

1. Field of the Invention

The present invention relates to an imaging lens and an imaging apparatus. In particular, the present invention relates to an imaging lens appropriate for use in an in-vehicle camera, a camera for a mobile terminal, a surveillance camera, or the like using an imaging device, such as a CCD (Charge Coupled Device) and a CMOS (Complementary Metal Oxide Semiconductor). Further, the present invention relates to an imaging apparatus including the imaging lens.

2. Description of the Related Art

In recent years, the size of an imaging device, such as a CCD and a CMOS, became very small, and the resolution of the imaging device became very high. Consequently, the size of the body of imaging equipment including such an imaging device became small. Therefore, reduction in the size of an imaging lens to be mounted on the imaging equipment is also needed in addition to high optical performance of the imaging lens. Meanwhile, lenses mounted on an in-vehicle camera, a surveillance camera and the like need to be structurable at low cost in addition to being small-sized. Further, the lenses need to have small F-numbers so that photography is possible even in low illumination conditions, and to achieve a wide angle of view and high performance. Further, excellent environment-resistance is required in some cases.

Japanese Unexamined Patent Publication No. 11 (1999)-142730 (Patent Document 1) discloses a lens system usable in a camera on which a small-size CCD is mounted. The lens system consists of five lenses or six lenses, and uses a plastic aspheric lens.

SUMMARY OF THE INVENTION

However, the lens system disclosed in Patent Document 1 has room for improvement in environment-resistance in that a first lens, which is the most-object-side lens, is a plastic aspheric lens. In the lens systems disclosed in Japanese Unexamined Patent Publication No. 2009-216858 (Patent Document 2), U.S. Pat. No. 8,054,562 (Patent Document 3), and U.S. Pat. No. 8,040,618 (Patent Document 4), all of the lenses are glass spheric lenses. Therefore, they can be low-cost lens systems having excellent weather-resistance. However, if an aspheric surface is used, higher resolution performance would be expectable.

In view of the foregoing circumstances, it is an object of the present invention to provide an imaging lens that is small-sized and structurable at low cost, and that has excellent environment-resistance, a wide angle of view, a small F-number and high optical performance. Further, it is another object of the present invention to provide an imaging apparatus including the imaging lens.

A first imaging lens of the present invention is an imaging lens consisting of:
a negative first lens having a concave image-side surface;
a positive second lens;
a negative third lens;
a positive fourth lens;
a positive fifth lens having a convex image-side surface; and
a negative sixth lens, which are in this order from an object side,
wherein all of the lenses constituting the lens system are single lenses, which are not cemented lenses, and
wherein a stop is arranged closer to the object side than an image-side surface of the fourth lens is arranged, and
wherein when a refractive index of a material of the third lens for d-line is Nd3, the following formula (1) is satisfied:

$$Nd3<1.75 \tag{1}$$

A second imaging lens of the present invention is an imaging lens consisting of:
a negative first lens having a concave image-side surface;
a positive second lens;
a negative third lens;
a positive fourth lens;
a positive fifth lens having a convex image-side surface; and
a negative sixth lens, which are in this order from an object side,
wherein all of the lenses constituting the lens system are single lenses, which are not cemented lenses, and
wherein a stop is arranged closer to the object side than an image-side surface of the fourth lens is arranged, and
wherein when a curvature radius of an object-side surface of the third lens and a curvature radius of an image-side surface of the third lens are L3F and L3R, respectively, and a focal length of the entire system is f, and a focal length of the fifth lens is f5, the following formulas (2) and (3) are satisfied:

$$-0.1<(L3F+L3R)/(L3F-L3R) \tag{2; and}$$

$$1.15<f5/f<3.00 \tag{3}$$

A third imaging lens of the present invention is an imaging lens consisting of:
a negative first lens having a concave image-side surface;
a positive second lens;
a negative third lens;
a positive fourth lens;
a positive fifth lens having a convex image-side surface; and
a negative sixth lens, which are in this order from an object side,
wherein all of the lenses constituting the lens system are single lenses, which are not cemented lenses, and
wherein a stop is arranged closer to the object side than an image-side surface of the fourth lens is arranged, and
wherein when a focal length of the fourth lens is f4, and a focal length of the fifth lens is f5, the following formula (4) is satisfied:

$$1.29<f4/f5<2.5 \tag{4}$$

In the first, second and third imaging lenses of the present invention, it is desirable that an Abbe number of a material of the first lens for d-line is greater than or equal to 40, and that an Abbe number of a material of the second lens for d-line is greater than or equal to 25, and that an Abbe number of a material of the third lens for d-line is less than or equal to 35, and that an Abbe number of a material of the fourth lens for d-line is greater than or equal to 40, and that an Abbe number of a material of the fifth lens for d-line is greater than or equal to 40, and that an Abbe number of a material of the sixth lens for d-line is less than or equal to 25.

In the first, second and third imaging lenses of the present invention, it is desirable that a material of the third lens and a material of the fifth lens are plastic.

In the first, second and third imaging lenses of the present invention, when a focal length of the entire system is f and a focal length of the third lens is f3, it is desirable that the following formula (5) is satisfied:

$$-2.5<f3/f<-0.4 \tag{5}$$

In the first, second and third imaging lenses of the present invention, it is desirable that the absolute value of a curvature radius of an object-side surface of the second lens is less than the absolute value of a curvature radius of an image-side surface of the second lens.

In the first, second and third imaging lenses of the present invention, when a focal length of the entire system is f and a curvature radius of an image-side surface of the third lens is L3R, it is desirable that, the following formula (6) is satisfied:

$$0.5<|L3R/f|<2.5 \qquad (6).$$

In the first, second and third imaging lenses of the present invention, when a focal length of the entire system is f, and a curvature radius of an object-side surface of the fifth lens and a curvature radius of an image-side surface of the fifth lens are L5F and L5R, respectively, it is desirable that the following formula (7) is satisfied:

$$0.1<|L5F/L5R|<1.5 \qquad (7).$$

In the first, second and third imaging lenses of the present invention, when a focal length of the entire system is f, and a curvature radius of an image-side surface of the fourth lens is L4R, it is desirable that the following formula (8) is satisfied:

$$-2.5<L4R/f<-0.5 \qquad (8).$$

In the first, second and third imaging lenses of the present invention, it is desirable that the stop is arranged between an object-side surface of the second lens and the image-side surface of the fourth lens.

In the first, second and third imaging lenses of the present invention, it is desirable that the center thickness of the first lens is greater than or equal to 1.5 mm.

In the imaging lens of the present invention, when a lens is an aspheric lens, the concave/convex shape of a surface, and the sign of refractive power (power) will be considered in a paraxial region unless otherwise noted. In the imaging lenses of the present invention, the sign of a curvature radius is positive when the shape of a surface is convex toward the object side, and the sign of a curvature radius is negative when the shape of a surface is convex toward the image side.

An imaging apparatus of the present invention includes one of the first, second and third imaging lenses of the present invention.

According to the first imaging lens of the present invention, the arrangement of power in the system, the position of the stop, the shapes of the surfaces of the first lens and the fifth lens, and the like are appropriately set in the lens system consisting of six lenses, and no cemented lens is included, and formula (1) is satisfied. Therefore, it is possible to realize small-size low-cost structure, a wide angle of view, excellent environment-resistance, a small F-number, and high optical performance.

According to the second imaging lens of the present invention, the arrangement of power in the system, the position of the stop, the shapes of the surfaces of the first lens and the fifth lens, and the like are appropriately set in the lens system consisting of six lenses, and no cemented lens is included, and formulas (2) and (3) are satisfied. Therefore, it is possible to realize small-size low-cost structure, a wide angle of view, excellent environment-resistance, a small F-number, and high optical performance.

According to the third imaging lens of the present invention, the arrangement of power in the system, the position of the stop, the shapes of the surfaces of the first lens and the fifth lens, and the like are appropriately set in the lens system consisting of six lenses, and no cemented lens is included, and formula (4) is satisfied. Therefore, it is possible to realize small-size low-cost structure, a wide angle of view, excellent environment-resistance, a small F-number, and high optical performance.

The imaging apparatus of the present invention includes one of the first, second and third imaging lenses of the present invention. Therefore, it is possible to structure the imaging apparatus in small size and at low cost. Further, the imaging apparatus has excellent weather-resistance, and is usable even in low illumination photography conditions. It is possible to obtain an excellent wide-angle image.

BRIEF DESCRIPTION OF THE DRAWINGS

FIG. 5 is a cross section illustrating the lens structure of an imaging lens in Example 1 of the present invention;

FIG. 6 is a cross section illustrating the lens structure of an imaging lens in Example 2 of the present invention;

FIG. 7 is a cross section illustrating the lens structure of an imaging lens in Example 3 of the present invention;

FIG. 8 is a cross section illustrating the lens structure of an imaging lens in Example 4 of the present invention;

FIG. 9 is a cross section illustrating the lens structure of an imaging lens in Example 5 of the present invention;

FIG. 10 is a cross section illustrating the lens structure of an imaging lens in Example 6 of the present invention;

FIG. 11 is a cross section illustrating the lens structure of an imaging lens in Example 7 of the present invention;

FIG. 12 is a cross section illustrating the lens structure of an imaging lens in Example 8 of the present invention;

FIG. 13 is a cross section illustrating the lens structure of an imaging lens in Example 9 of the present invention;

FIG. 14 is a cross section illustrating the lens structure of an imaging lens in Example 10 of the present invention;

FIG. 15 is a cross section illustrating the lens structure of an imaging lens in Example 11 of the present invention;

FIG. 16 is a cross section illustrating the lens structure of an imaging lens in Example 12 of the present invention;

FIG. 17 is a cross section illustrating the lens structure of an imaging lens in Example 13 of the present invention;

FIG. 18 is a cross section illustrating the lens structure of an imaging lens in Example 14 of the present invention;

FIG. 19 is a cross section illustrating the lens structure of an imaging lens in Example 15 of the present invention;

FIG. 20 is a cross section illustrating the lens structure of an imaging lens in Example 16 of the present invention;

FIG. 21 is a cross section illustrating the lens structure of an imaging lens in Example 17 of the present invention;

FIG. 22 is a cross section illustrating the lens structure of an imaging lens in Example 18 of the present invention;

FIG. 23 is a cross section illustrating the lens structure of an imaging lens in Example 19 of the present invention;

FIG. 24 is a cross section illustrating the lens structure of an imaging lens in Example 20 of the present invention;

FIG. 25, Section A through FIG. 25, Section D are aberration diagrams of the imaging lens in Example 1 of the present invention;

FIG. 26, Section A through FIG. 26, Section D are aberration diagrams of the imaging lens in Example 2 of the present invention;

FIG. 27, Section A through FIG. 27, Section D are aberration diagrams of the imaging lens in Example 3 of the present invention;

FIG. 28, Section A through FIG. 28, Section D are aberration diagrams of the imaging lens in Example 4 of the present invention;

FIG. 29, Section A through FIG. 29, Section D are aberration diagrams of the imaging lens in Example 5 of the present invention;

FIG. 30, Section A through FIG. 30, Section D are aberration diagrams of the imaging lens in Example 6 of the present invention;

FIG. 31, Section A through FIG. 31, Section D are aberration diagrams of the imaging lens in Example 7 of the present invention;

FIG. 32, Section A through FIG. 32, Section D are aberration diagrams of the imaging lens in Example 8 of the present invention;

FIG. 33, Section A through FIG. 33, Section D are aberration diagrams of the imaging lens in Example 9 of the present invention;

FIG. 34, Section A through FIG. 34, Section D are aberration diagrams of the imaging lens in Example 10 of the present invention;

FIG. 35, Section A through FIG. 35, Section D are aberration diagrams of the imaging lens in Example 11 of the present invention;

FIG. 36, Section A through FIG. 36, Section D are aberration diagrams of the imaging lens in Example 12 of the present invention;

FIG. 37, Section A through FIG. 37, Section D are aberration diagrams of the imaging lens in Example 13 of the present invention;

FIG. 38, Section A through FIG. 38, Section D are aberration diagrams of the imaging lens in Example 14 of the present invention;

FIG. 39, Section A through FIG. 39, Section D are aberration diagrams of the imaging lens in Example 15 of the present invention;

FIG. 40, Section A through FIG. 40, Section D are aberration diagrams of the imaging lens in Example 16 of the present invention;

FIG. 41, Section A through FIG. 41, Section D are aberration diagrams of the imaging lens in Example 17 of the present invention;

FIG. 42, Section A through FIG. 42, Section D are aberration diagrams of the imaging lens in Example 18 of the present invention;

FIG. 43, Section A through FIG. 43, Section D are aberration diagrams of the imaging lens in Example 19 of the present invention;

FIG. 44, Section A through FIG. 44, Section D are aberration diagrams of the imaging lens in Example 20 of the present invention.

DESCRIPTION OF THE PREFERRED EMBODIMENTS

Figure 1:
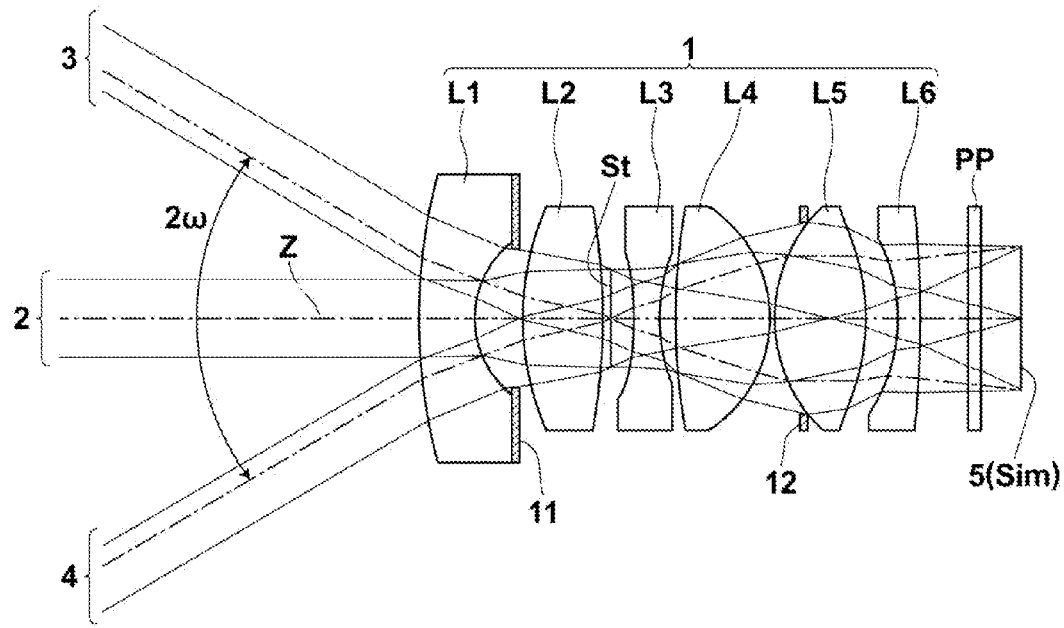
FIG. 1 is a diagram illustrating the structure of an imaging lens according to an embodiment of the present invention, and optical paths.

Hereinafter, embodiments of the present invention will be described with reference to drawings. First, an imaging lens according to an embodiment of the present invention will be described with reference to FIG. 1. FIG. 1 is a lens cross section of an imaging lens 1 according to an embodiment of the present invention. Further, FIG. 1 illustrates axial rays 2 from an object point at infinity, and off-axial rays 3, 4 at full angle of view 2ω. A structure example illustrated in FIG. 1 corresponds to an imaging lens in Example 1, which will be described later. In FIG. 1, the left side is the object side and the right side is the image side.

In FIG. 1, a case of applying the imaging lens 1 to an imaging apparatus is considered, and an imaging device 5 arranged at image plane Sim of the imaging lens 1 is also illustrated. In FIG. 1, the imaging device is illustrated in a simplified manner. However, in actual cases, the imaging device 5 is arranged in such a manner that the imaging plane of the imaging device 5 is located at the position of the image plane Sim. The imaging device 5 converts an optical image formed by the imaging lens 1 into electrical signals. For example, a CCD image sensor, a CMOS image sensor, or the like may be used as the imaging device.

When the imaging lens 1 is applied to an imaging apparatus, it is desirable to set a cover glass or various filters, such as a low-pass filter and an infrared ray cut filter, based on the structure of a camera on which the lens is mounted. FIG. 1 illustrates a case in which parallel-flat-plate-shaped optical member PP, which is assumed to be such elements, is arranged between the most-image-side lens and the imaging device 5 (image plane Sim). Especially when the imaging lens 1 is used together with the imaging device 5, the cover glass and various filters are arranged between the lens system and image plane Sim in many cases. Therefore, the lens system needs to have a sufficiently long back focus for arranging these elements.

The imaging lens 1 consists of negative first lens L1 having a concave image-side surface, positive second lens L2, negative third lens L3, positive fourth lens L4, positive fifth lens L5 having a convex image-side surface, and negative sixth lens L6, which are in this order from an object side along optical axis Z. All of the lenses constituting the lens system are single lenses, which are not cemented lenses, and aperture stop St is arranged closer to the object side than an image-side surface of the fourth lens L4 is arranged. These are the basic structure of the imaging lens 1.

Since the negative first lens L1 is arranged on the most object side, it is possible to easily widen an angle of view of the lens system. Since the third lens L3 is a negative lens and the fourth lens L4 is a positive lens, it is possible to correct a longitudinal chromatic aberration in an excellent manner. Since the fifth lens L5 is a positive lens and the sixth lens L6 is a negative lens, it is possible to correct a lateral chromatic aberration in an excellent manner. Since the arrangement of power is negative, positive, negative, positive, positive and negative in this order from the object side, it is possible to obtain a lens system that is small-sized and that has a wide angle of view and high resolution even in the lens system having a small F-number.

Since the first lens L1 has a concave image-side surface, correction of curvature of field is easy. Since the fifth lens L5 has a convex image-side surface, it is possible to make the positive power of the fifth lens L5 strong, and that is advantageous in correcting a spherical aberration. Further, it is possible to easily correct a longitudinal chromatic aberration and a lateral chromatic aberration in cooperation with the sixth lens L6.

When the arrangement of power is negative, positive, negative, positive, positive and negative, the positive power on the image-side is divided and allocated to two lenses of the fourth lens L4 and the fifth lens L5. Therefore, correction of a spherical aberration is easy, and it is possible to correct aberrations in an excellent manner even in a lens system having a small F-number.

In the imaging lens 1, all of the lenses are single lenses, which are not cemented lenses. For example, when the imaging lens 1 is used as a lens for an in-vehicle camera or a lens for a surveillance camera, the imaging lens 1 may be used in tough environment conditions, such as a wide temperature range of a high temperature to a low temperature. When a cemented lens is used, it is possible to correct chromatic aberrations in an excellent manner. However, since it becomes necessary to use a special adhesive, or to perform a process for increasing environment-resistance, depending on the required environment-resistance, the cost becomes high. Therefore, when environment-resistance is strictly required, structure in which all of the lenses are single lenses is cost-advantageous.

In the imaging lens 1, aperture stop St is arranged closer to the object side than the image-side surface of the fourth lens L4 is arranged. Such arrangement is advantageous in reducing size and in external appearance. If the aperture stop St is arranged closer to the image side than the image-side surface of the fourth lens L4 is arranged, the effective diameter of the first lens L1, which is located at a most-object-side position, becomes large, and it becomes difficult to reduce the size of a part of the lens system exposed to the outside. Especially, when the imaging lens 1 is used in an in-vehicle camera or a camera for a mobile terminal, there is a demand for reducing the part of the lens exposed to the outside to prevent the external appearance of the camera from being damaged. Further, when the imaging lens 1 is used in a surveillance camera or the like, there is a demand for reducing the part of the lens exposed to the outside so that the presence of the camera is as unnoticeable as possible. When the aperture stop St is arranged closer to the object side than the image-side surface of the fourth lens L4 is arranged, it is possible to satisfy such demands.

Further, it is desirable that the aperture stop St is arranged closer to the image side than the object-side surface of the second lens L2 is arranged. If the aperture stop St is arranged closer to the object side than the object-side surface of the second lens L2 is arranged, it is possible to make the diameter of rays at the first lens L1 small. However, the height of rays at the fifth lens L5 and the sixth lens L6 becomes high, and the diameters of the lenses become large. Therefore, the lens diameter on the object side of the aperture stop St and the lens diameter on the image side of the aperture stop St become unbalanced. Further, such arrangement is disadvantageous in reducing the diameter of the entire lens system.

Specifically, it is desirable that the aperture stop St is arranged between the object-side surface of the second lens L2 and the image-side surface of the fourth lens L4. For example, the aperture stop St may be arranged between the second lens L2 and the third lens L3, or between the third lens L3 and the fourth lens L4.

When the aperture stop St is arranged between the second lens L2 and the third lens L3, it is possible to reduce the diameter of rays at the first lens L1 even more, compared with the case in which the aperture stop St is arranged between the third lens L3 and the fourth lens L4. Further, it is possible to reduce an area of the lens system exposed to the outside.

When the aperture stop St is arranged between the third lens L3 and the fourth lens L4, it is possible to prevent the effective diameter of the first lens L1 from becoming too large. Further, it is possible to prevent the effective diameter of the sixth lens L6 from becoming too large. Therefore, it is possible to balance the lens diameter on the object side of the aperture stop St and the lens diameter on the image side of the aperture stop St, and to reduce a part of the lens system exposed to the outside. Further, such arrangement is advantageous in reducing the diameter of the entire lens system. Further, it is possible to easily secure a sufficient relative illumination.

The aperture stop St may be arranged in such a manner that the position of the aperture stop St in the optical axis direction is between the vertex of the object-side surface of the second lens L2 and the vertex of the image-side surface of the second lens L2. When the aperture stop St is arranged in such a manner, it is possible to further reduce the diameter of rays at the first lens L1, and to further reduce an area of the lens system exposed to the outside.

Alternatively, the aperture stop St may be arranged in such a manner that the position of the aperture stop St in the optical axis direction is between the vertex of the object-side surface of the third lens L3 and the vertex of the image-side surface of the third lens L3. Alternatively, the aperture stop St may be arranged in such a manner that the position of the aperture stop St in the optical axis direction is between the vertex of the object-side surface of the fourth lens L4 and the vertex of the image-side surface of the fourth lens L4.

It is desirable that the aperture stop St is arranged between the object-side surface of the second lens L2 and the object-side surface of the fourth lens L4. When the aperture stop is arranged closer to the object side than the object-side surface of the fourth lens L4 is arranged, it is possible to further reduce the diameter of rays at the first lens L1, compared with a case in which the aperture stop St is located between the vertex of the object-side surface of the fourth lens L4 and the vertex of the image-side surface of the fourth lens L4, and to further reduce an area of the lens system exposed to the outside.

In addition to the basic structure, the imaging lens 1 illustrated in FIG. 1 includes first, second and third modes that will be described next. The first mode satisfies the following formula (1) when a refractive index of a material of the third lens L3 for d-line is Nd3:

$$Nd3 < 1.75 \qquad (1).$$

In an optical system such as the imaging lens of the present invention, use of a material having a small Abbe number, in other words, a large dispersion material, as the material of the third lens L3, is effective to correct chromatic aberrations. However, the refractive index of a material is higher as the Abbe number of the material is smaller. Further, the material tends to be more expensive. When the formula (1) is satisfied, it is possible to prevent the refractive index of the third lens L3 from becoming high, and to use an inexpensive material. Therefore, it is possible to produce the lens system at low cost.

The second mode satisfies the following formulas (2) and (3) when a curvature radius of an object-side surface of the third lens L3 is L3F and a curvature radius of an image-side surface of the third lens L3 is L3R, and a focal length of the entire system is f, and a focal length of the fifth lens L5 is f5:

$$-0.1 < (L3F + L3R)/(L3F - L3R) \qquad (2); \text{ and}$$

$$1.15 < f5/f < 3.00 \qquad (3).$$

While the third lens L3 has negative power, the value is lower than the lower limit of the formula (2) when the third lens L3 is a negative meniscus lens having a concave object-side surface, or when the third lens L3 is a double concave lens in which the absolute value of a curvature radius of the object-side surface is smaller than the absolute value of a curvature radius of the image-side surface, and in which a difference between the curvature radius of the object-side surface and the curvature radius of the image-side surface is large. When the lower limit of the formula (2) is satisfied, it is possible to make the absolute value of the curvature radius of the image-side surface of the third lens L3 small while the image-side surface of the third lens L3 is concave. It is possible easily correct chromatic aberrations by making the third lens L3 and the fourth lens L4 cooperate with each other.

When the value exceeds the upper limit of the formula (3), the power of the fifth lens L5 becomes weak, and correction of a lateral chromatic aberration becomes difficult. When the value is lower than the lower limit of the formula (3), the power of the fifth lens L5 becomes strong, and it becomes impossible to maintain balance between the power of the fourth lens L4 and the power of the fifth lens L5. Further, correction of a spherical aberration becomes difficult.

The third mode satisfies the following formula (4) when a focal length of the fourth lens L4 is f4, and a focal length of the fifth lens L5 is f5. Correction of a spherical aberration is difficult if the value exceeds the upper limit of the formula (4), or if the value is lower than the lower limit of the formula.

$$1.29 < f4/f5 < 2.5 \tag{4}$$

It is desirable that each of the imaging lenses of the first, second and third modes has the following structure. As a desirable mode, an imaging lens may have one of the structures, or two or more arbitrary structures in combination.

When a focal length of the entire system is f, and a focal length of the third lens L3 is f3, it is desirable that the following formula (5) is satisfied:

$$-2.5 < f3/f < -0.4 \tag{5}$$

When the upper limit of the formula (5) is satisfied, it is possible to prevent the power of the third lens L3 from becoming too strong. Therefore, correction of curvature of field is easy. When the value is lower than the lower limit of the formula (5), the power of the third lens L3 becomes weak, and correction of a longitudinal chromatic aberration becomes difficult.

It is desirable that the formula (3) and the formula (5) are satisfied at the same time. When the third lens L3 and the fifth lens L5 are made of plastic material, if the formulas (3) and (5) are satisfied at the same time, it is possible to make the positive power and the negative power of the two plastic lenses substantially equal to each other, and to easily suppress movement of a focal position when temperature changes.

When a focal length of the entire system is f and a curvature radius of an image-side surface of the third lens L3 is L3R, it is desirable that the following formula (6) is satisfied:

$$0.5 < |L3R/f| < 2.5 \tag{6}$$

When the value exceeds the upper limit of the formula (6), the absolute value of a curvature radius of the image-side surface of the third lens L3 becomes large, and it becomes difficult to correct chromatic aberrations in an excellent manner in cooperation with the fourth lens L4. When the value is lower than the lower limit of the formula (6), the absolute value of a curvature radius of the image-side surface of the third lens L3 becomes too small, and it becomes difficult to correct a spherical aberration and curvature of field.

When a focal length of the entire system is f, and a curvature radius of an object-side surface of the fifth lens L5 is L5F and a curvature radius of an image-side surface of the fifth lens L5 is L5R, it is desirable that the following formula (7) is satisfied:

$$0.1 < |L5F/L5R| < 1.5 \tag{7}$$

When the value exceeds the upper limit of the formula (7), the absolute value of a curvature radius of the object-side surface of the fifth lens L5 becomes too large, or the absolute value of a curvature radius of the image-side surface of the fifth lens L5 becomes too small. Therefore, correction of a spherical aberration is difficult. When the value is lower than the lower limit of the formula (7), the absolute value of a curvature radius of the object-side surface of the fifth lens L5 becomes too small, and it becomes difficult to secure a sufficient back focus, or the absolute value of a curvature radius of the image-side surface of the fifth lens L5 becomes too large, and correction of curvature of field and a coma aberration becomes difficult.

When a focal length of the entire system is f, and a curvature radius of an image-side surface of the fourth lens L4 is L4R, it is desirable that the following formula (8) is satisfied:

$$-2.5 < L4R/f < -0.5 \tag{8}$$

When the value exceeds the upper limit of the formula (8), it becomes difficult to correct a spherical aberration in an excellent manner. When the value is lower than the lower limit of the formula (8), it becomes difficult to correct curvature of field in an excellent manner.

When a focal length of the entire system is f, and a length on an optical axis from an object-side surface of the first lens L1 to image plane Sim is L, it is desirable that the following formula (9) is satisfied. Here, a length in air is used for a back focus portion of L.

$$2.0 < L/f < 7.0 \tag{9}$$

When the value exceeds the upper limit of the formula (9), the total length of the lens system becomes long, and it becomes difficult to reduce the size of the lens system. When the value is lower than the lower limit of the formula (9), it becomes difficult to widen an angle of view, or the total length becomes too short, and each lens becomes thin, and production becomes difficult, or the cost goes up.

When a focal length of the entire system is f, and a length on an optical axis from an image-side surface of the sixth lens L6 to image plane Sim is Bf, it is desirable that the following formula (10) is satisfied:

$$0.3 < Bf/f < 1.2 \tag{10}$$

When the value exceeds the upper limit of the formula (10), the back focus becomes long, and the size of the lens system becomes large. When the value is lower than the lower limit of the formula (10), the back focus becomes too short, and it becomes difficult to arrange various filters, a cover glass or the like between the lens system and the imaging device 5.

When a focal length of the entire system is f, and a curvature radius of the object-side surface of the first lens L1 is L1F, it is desirable that the following formula (11) is satisfied:

$$1.8 < |L1F/f| < 8.0 \tag{11}$$

When the value exceeds the upper limit of the formula (11), a curvature radius of the object-side surface of the first lens L1 becomes large, and correction of curvature of field and a coma aberration becomes difficult. When the value is lower than the lower limit of the formula (11), the absolute value of a curvature radius of the object-side surface of the first lens L1 becomes small. When the object-side surface of the first lens L1 is convex, it becomes difficult to widen an angle of view. When the object-side surface of the first lens L1 is concave, it is possible to easily widen an angle of view, but correction of distortion is difficult.

When a focal length of the third lens L3 is f3, and a focal length of the fifth lens L5 is f5, it is desirable that the following formula (12) is satisfied:

$$-2.5 < f3/f5 < -0.4 \tag{12}$$

When the value exceeds the upper limit of the formula (12), the power of the fifth lens L5 becomes weak, and it becomes difficult to suppress an angle of incidence at which peripheral rays enter an image plane, or the power of the third lens L3 becomes too strong, and an error sensitivity with respect to eccentricity becomes high. Therefore, production becomes difficult, or the cost goes up. When the value is lower than the lower limit of the formula (12), the power of the third lens L3 becomes weak, and correction of a longitudinal chromatic aberration becomes difficult, or the power of the fifth lens L5 becomes too strong, and it becomes difficult to secure a sufficient back focus.

When both of the third lens L3 and the fifth lens L5 are plastic lenses, if the value is not in the range of the formula (12), the power of the third lens L3 and the power of the fifth lens L5 become unbalanced. Therefore, a shift in focus becomes large when temperature changes, and it becomes difficult to achieve a lens system resistant to a change in temperature.

When a curvature radius of the object-side surface of the first lens L1 is L1F, and a curvature radius of the image-side surface of the first lens L1 is L1R, it is desirable that the following formula (13) is satisfied:

$$0.2 < (L1F - L1R)/(L1F + L1R) < 2.2 \qquad (13).$$

While the first lens L1 is a negative lens, the value of (L1F−L1R)/(L1F+L1R) exceeds 1.0 when the first lens L1 is a double concave lens in which the absolute value of a curvature radius of the object-side surface is greater than the absolute value of a curvature radius of the image-side surface. While the first lens L1 is a negative lens, the value of (L1F−L1R)/(L1F+L1R) is less than 1.0 and greater than 0.0 when the first lens L1 is a negative meniscus lens having a convex object-side surface. Further, the value of (L1F−L1R)/(L1F+L1R) is less than 0.0, when the first lens L1 is a negative meniscus lens having a concave object-side surface, or when the first lens L1 is a double concave lens in which the absolute value of a curvature radius of the object-side surface is less than the absolute value of a curvature radius of the image-side surface.

When the value exceeds the upper limit of the formula (13), a difference between a curvature radius of the object-side surface of the first lens L1 and a curvature radius of the image-side surface of the first lens L1 becomes small in the double concave lens in which the absolute value of a curvature radius of the object-side surface is larger than the absolute value of a curvature radius of the image-side surface. Therefore, the power of the first lens L1 becomes weak, and it becomes difficult to widen an angle of view of the lens system, or correction of distortion, curvature of field and a coma aberration becomes difficult. The value of (L1F−L1R)/(L1F+L1R) is greater than 0.0 and less than the lower limit of the formula (13) when the first lens L1 is a meniscus lens having a convex object-side surface, and a difference between a curvature radius of the object-side surface and a curvature radius of the image-side surface is small. In such a case, the power of the first lens L1 becomes weak, and it becomes difficult to widen an angle of view. When the value of (L1F−L1R)/(L1F+L1R) is less than or equal to 0.0, correction of curvature of field and a coma aberration becomes difficult.

When a curvature radius of the object-side surface of the fourth lens L4 is L4F, and a curvature radius of the image-side surface of the fourth lens L4 is L4R, it is desirable that the following formula (14) is satisfied:

$$0.5 < (L4F - L4R)/(L4F + L4R) < 2.5 \qquad (14).$$

While the fourth lens L4 is a positive lens, the value exceeds the upper limit of the formula (14) when the fourth lens L4 is a double convex lens in which the absolute value of a curvature radius of the object-side surface is greater than the absolute value of a curvature radius of the image-side surface, and in which a difference between the curvature radius of the object-side surface and the curvature radius of the image-side surface is small. In such a case, the absolute value of the curvature radius of the image-side surface of the fourth lens L4 becomes too strong, and correction of curvature of field becomes difficult, or the absolute value of the curvature radius of the object-side surface of the fourth lens L4 becomes small, and the power of the fourth lens L4 becomes too strong. Therefore, balance between the power of the fourth lens L4 and the power of the fifth lens L5 is lost, and correction of a spherical aberration becomes difficult. Further, it becomes difficult to provide a long back focus.

While the fourth lens L4 is a positive lens, the value of (L4F−L4R)/(L4F+L4R) is greater than 0.0 and lower than the lower limit of the formula (14) when the fourth lens L4 is a positive meniscus lens having a convex image-side surface, and a difference between a curvature radius of the object-side surface and a curvature radius of the image-side surface is small. In such a case, the positive power of the fourth lens L4 becomes weak, and balance between the power of the fourth lens L4 and the power of the fifth lens L5 is lost, and correction of a spherical aberration becomes difficult, or the absolute value of the curvature radius of the image-side surface of the fourth lens L4 becomes small, and correction of curvature of field and a coma aberration becomes difficult. Further, when the value of (L4F−L4R)/(L4F+L4R) is less than 0.0, correction of curvature of field and a coma aberration becomes difficult.

When a curvature radius of the object-side surface of the fifth lens L5 is L5F and a curvature radius of the image-side surface of the fifth lens L5 is L5R, it is desirable that the following formula (15) is satisfied:

$$-1.0 < (L5F + L5R)/(L5F - L5R) \qquad (15).$$

While the fifth lens L5 is a positive lens, the value is lower than the lower limit of the formula (15) when the fifth lens L5 is a positive meniscus lens having a concave image-side surface. However, this contradict the basic structure that the fifth lens L5 is a positive lens having a convex image-side surface. Further, if the image-side surface is concave, the power of the fifth lens becomes weak. Therefore, balance between the power of the fourth lens L4 and the power of the fifth lens L5 is lost, and correction of a spherical aberration becomes difficult, or correction of curvature of field becomes difficult.

With respect to each of the aforementioned formulas, it is desirable to satisfy a modified lower limit or a modified upper limit as will be described next. As a desirable mode, a formula composed of a modified value of the lower limit and a modified value of the upper limit, as will be described next, in combination may be satisfied.

As a modified value of the upper limit of the formula (1), 1.70 is desirable, and 1.65 is more desirable. Further, it is desirable that refractive index Nd3 of a material of the third lens L3 for d-line is greater than 1.55. When Nd3 is greater than 1.55, it is possible to make the refractive index of the third lens L3 high, and it is possible to easily make the power of the third lens L3 strong. Therefore, it is possible to easily correct a longitudinal chromatic aberration and a lateral chromatic aberration. It is more desirable that Nd3 is greater than 1.58 to correct chromatic aberrations.

With respect to the formula (2), it is more desirable to further set the upper limit of (L3F+L3R)/(L3F−L3R), as in the following formula (2-2):

$$-0.1<(L3F+L3R)/(L3F-L3R)<1.0 \quad (2-2).$$

While the third lens L3 is a negative lens, the upper limit of the formula (2-2) is satisfied when the third lens L3 is a double concave lens in which the absolute value of a curvature radius of the object-side surface is greater than the absolute value of a curvature radius of the image-side surface. In such a case, it is possible to easily make the power of the third lens L3 strong. When the power of the third lens L3 is strong, correction of a longitudinal chromatic aberration becomes easier.

As a modified value of the lower limit of the formula (2), −0.08 is desirable, and 0.0 is more desirable. Further, 0.05 is even more desirable, and 0.1 is still even more desirable. As a modified value of the upper limit of the formula (2-2) to correct a longitudinal chromatic aberration more easily, 0.8 is desirable, and 0.7 is more desirable, and 0.6 is even more desirable.

As a modified value of the lower limit of the formula (3), 1.17 is desirable, and 1.19 is more desirable. As a modified value of the upper limit of the formula (3), 2.5 is desirable, and 2.0 is more desirable. Further, 1.80 is even more desirable, and 1.70 is still even more desirable.

As a modified value of the lower limit of the formula (4), 1.30 is desirable, and 1.32 is more desirable. As a modified value of the upper limit of the formula (4), 2.0 is desirable, and 1.9 is more desirable, and 1.85 is even more desirable.

As a modified value of the lower limit of the formula (5), −2.20 is desirable, and −2.00 is more desirable, and −1.80 is even more desirable. As a modified value of the upper limit of the formula (5), −0.6 is desirable, and −0.8 is more desirable. Further, −1.0 is even more desirable, and −1.15 is still even more desirable. Further, −1.2 is more desirable.

For example, it is desirable that the following formula (5-2) is satisfied instead of the formula (5). It is more desirable that the following formula (5-3) is satisfied, and it is even more desirable that the following formula (5-4) is satisfied:

$$-2.20<f3/f<-1.15 \quad (5-2);$$

$$-2.00<f3/f<-1.15 \quad (5-3);\text{ and}$$

$$-1.80<f3/f<-1.20 \quad (5-4).$$

As a modified value of the lower limit of the formula (6), 0.7 is desirable, and 0.8 is more desirable, and 0.9 is even more desirable. As a modified value of the upper limit of the formula (6), 2.2 is desirable, and 2.0 is more desirable, and 1.8 is even more desirable.

As a modified value of the lower limit of the formula (7), 0.2 is desirable, and 0.3 is more desirable. Further, 0.4 is even more desirable, and 0.5 is still even more desirable. As a modified value of the upper limit of the formula (7), 1.2 is desirable, and 1.1 is more desirable. Further, 1.0 is even more desirable, and 0.85 is still even more desirable.

As a modified value of the lower limit of the formula (8), −2.0 is desirable, and −1.5 is more desirable, and −1.3 is even more desirable. As a modified value of the upper limit of the formula (8), −0.6 is desirable, and −0.7 is more desirable, and −0.8 is even more desirable.

As a modified value of the lower limit of the formula (9), 3.0 is desirable, and 3.2 is more desirable, and 3.6 is even more desirable. As a modified value of the upper limit of the formula (9), 6.0 is desirable, and 5.0 is more desirable, and 4.5 is even more desirable.

As a modified value of the lower limit of the formula (10), 0.5 is desirable, and 0.6 is more desirable. As a modified value of the upper limit of the formula (10), 1.0 is desirable, and 0.9 is more desirable, and 0.8 is even more desirable.

As a modified value of the lower limit of the formula (11), 2.0 is desirable, and 2.5 is more desirable. As a modified value of the upper limit of the formula (11), 7.0 is desirable, and 6.0 is more desirable, and 5.0 is even more desirable.

As a modified value of the lower limit of the formula (12), −2.0 is desirable, and −1.8 is more desirable. Further, −1.7 is even more desirable, and −1.5 is still even more desirable. As a modified value of the upper limit of the formula (12), −0.5 is desirable, and −0.6 is more desirable. Further, −0.7 is even more desirable, and −0.8 is still even more desirable. Further, −0.9 is more desirable.

As a modified value of the lower limit of the formula (13), 0.4 is desirable, and 0.5 is more desirable, and 0.6 is even more desirable. As a modified value of the upper limit of the formula (13), 2.0 is desirable, and 1.7 is more desirable. Further, 1.5 is even more desirable, and 1.0 is still even more desirable.

As a modified value of the lower limit of the formula (14), 0.6 is desirable, and 0.7 is more desirable. Further, 0.9 is even more desirable, and 1.0 is still even more desirable. As a modified value of the upper limit of the formula (14), 2.0 is desirable, and 1.8 is more desirable, and 1.7 is even more desirable.

With respect to the formula (15), it is more desirable to set the upper limit of (L5F+L5R)/(L5F−L5R), as in the following formula (15-2):

$$-1.0<(L5F+L5R)/(L5F-L5R)<0.0 \quad (15-2).$$

While the fifth lens L5 is a positive lens, if the upper limit and the lower limit of the formula (15-2) are satisfied, the fifth lens L5 can become a double convex lens in which the absolute value of a curvature radius of the object-side surface is greater than the absolute value of a curvature radius of the image-side surface, and correction of a spherical aberration, curvature of field and a coma aberration becomes easy.

As a modified value of the lower limit of the formula (15), −0.9 is desirable, and −0.8 is more desirable, and −0.6 is even more desirable. Further, as the upper limit value of (L5F+L5R)/(L5F−L5R) in the formula (15) to more easily correct a spherical aberration, curvature of field and a coma aberration, −0.05 is more desirable, and −0.11 is even more desirable.

When the focal length of the entire system is f, and the maximum half angle of view is ω, it is desirable that distortion is less than or equal to ±10% in a system in which an ideal image height is represented by f×tan(ω). In such a case, it is possible to obtain an image with little distortion. In the system in which the ideal image height is represented by f×tan(ω), it is more desirable that distortion is less than or equal to ±5%. In such a case, it is possible to further suppress distortion of an image.

When an Abbe number of the material of the first lens L1 for d-line is vd1, it is desirable that vd1 is greater than or equal to 40. In such a case, it is possible to correct a longitudinal chromatic aberration and a lateral chromatic aberration in an excellent manner. It is more desirable that vd1 is greater than or equal to 50 to correct a longitudinal chromatic aberration and a lateral chromatic aberration in a more excellent manner. It is even more desirable that vd1 is greater than or equal to 55.

When an Abbe number of the material of the second lens L2 for d-line is vd2, it is desirable that vd2 is greater than or equal to 25. In such a case, it is possible to correct a longitudinal chromatic aberration and a lateral chromatic aberration in an excellent manner. It is more desirable that vd2 is greater than or equal to 35 to correct a longitudinal chromatic aberration and a lateral chromatic aberration in a more excellent manner. It is even more desirable that vd2 is greater than or equal to 40.

When an Abbe number of the material of the third lens L3 for d-line is vd3, it is desirable that vd3 is less than or equal to 35. In such a case, it is possible to correct a longitudinal chromatic aberration and a lateral chromatic aberration in an excellent manner. It is more desirable that vd3 is less than or equal to 30 to correct a longitudinal chromatic aberration and a lateral chromatic aberration in a more excellent manner. It is even more desirable that vd3 is less than or equal to 28, and it is still even more desirable that vd3 is less than or equal to 26.

When an Abbe number of the material of the fourth lens L4 for d-line is vd4, it is desirable that vd4 is greater than or equal to 40. In such a case, it is possible to correct a longitudinal chromatic aberration and a lateral chromatic aberration in an excellent manner. It is more desirable that vd4 is greater than or equal to 50 to correct a longitudinal chromatic aberration and a lateral chromatic aberration in a more excellent manner. It is even more desirable that vd4 is greater than or equal to 55.

When an Abbe number of the material of the fifth lens L5 for d-line is vd5, it is desirable that vd5 is greater than or equal to 40. In such a case, it is possible to correct a longitudinal chromatic aberration and a lateral chromatic aberration in an excellent manner. It is more desirable that vd5 is greater than or equal to 50 to correct a longitudinal chromatic aberration and a lateral chromatic aberration in a more excellent manner. It is even more desirable that vd5 is greater than or equal to 52.

When an Abbe number of the material of the sixth lens L6 for d-line is vd6, it is desirable that vd6 is less than or equal to 25. In such a case, it is possible to correct a longitudinal chromatic aberration and a lateral chromatic aberration in an excellent manner. It is more desirable that vd6 is less than or equal to 20 to correct a longitudinal chromatic aberration and a lateral chromatic aberration in a more excellent manner.

When an Abbe number of the material of the first lens L1 for d-line is vd1, and an Abbe number of the material of the second lens L2 for d-line is vd2, it is desirable that vd1+vd2 is greater than or equal to 80. In such a case, it is possible to correct a longitudinal chromatic aberration and a lateral chromatic aberration in an excellent manner. It is more desirable that vd1+vd2 is greater than or equal to 90 to correct a longitudinal chromatic aberration and a lateral chromatic aberration in a more excellent manner. It is even more desirable that vd1+vd2 is greater than or equal to 100.

When an Abbe number of the material of the third lens L3 for d-line is vd3, and an Abbe number of the material of the fourth lens L4 for d-line is vd4, it is desirable that vd4−vd3 is greater than or equal to 30. In such a case, it is possible to correct a longitudinal chromatic aberration and a lateral chromatic aberration in an excellent manner. It is more desirable that vd4−vd3 is greater than or equal to 35 to correct a longitudinal chromatic aberration and a lateral chromatic aberration in a more excellent manner.

When an Abbe number of the material of the fifth lens L5 for d-line is vd5, and an Abbe number of the material of the sixth lens L6 for d-line is vd6, it is desirable that vd5−vd6 is greater than or equal to 30. In such a case, it is possible to correct a longitudinal chromatic aberration and a lateral chromatic aberration in an excellent manner. It is more desirable that vd5−vd6 is greater than or equal to 35 to correct a longitudinal chromatic aberration and a lateral chromatic aberration in a more excellent manner.

It is desirable that the first lens L1 is a negative meniscus lens having a convex object-side surface. When the first lens L1 has such a shape, correction of distortion is easy. Alternatively, the first lens L1 may be a double concave lens. When the first lens L1 has such a shape, it is possible to make the negative power of the first lens L1 strong, and that is advantageous in widening an angle of view. Further, it is possible to easily provide long back focus. When the first lens L1 is a double concave lens, it is desirable that the absolute value of a curvature radius of the object-side surface of the first lens L1 is greater than the absolute value of a curvature radius of the image-side surface of the first lens L1. When the first lens L1 has such a shape, it is possible to easily correct curvature of field while achieving a wide angle of view.

It is desirable that the second lens L2 is a double convex lens. When the second lens L2 has such a shape, it is possible to make the power of the second lens L2 strong. Further, even if the power of the first lens L1 is made strong, it is possible to maintain the balance of the combined power of the first lens L1 and the second lens L2. Therefore, it is possible to easily correct a coma aberration and curvature of field. In the second lens L2, it is desirable that the absolute value of a curvature radius of the object-side surface is less than the absolute value of a curvature radius of the image-side surface. When the second lens L2 has such a shape, it is possible to correct a spherical aberration, curvature of field, and a coma aberration in an excellent manner.

It is desirable that the object-side surface of the third lens L3 is a concave surface. When the object-side surface of the third lens L3 is a concave surface, it is possible to easily make the power of the third lens L3 strong. Further, correction of a longitudinal chromatic aberration and a lateral chromatic aberration becomes easy.

It is desirable that the image-side surface of the third lens L3 is a concave surface. When the image-side surface of the third lens L3 is a concave surface, it is possible to easily make the power of the third lens L3 strong, and to easily correct a longitudinal chromatic aberration and a lateral chromatic aberration.

It is desirable that the third lens L3 is a double concave lens. When the third lens L3 has such a shape, it is possible to make the power of the third lens L3 strong, and to easily correct a longitudinal chromatic aberration and a lateral chromatic aberration. Alternatively, the third lens L3 may be a negative meniscus lens in a paraxial region. When the third lens L3 has such a shape, it is possible to correct curvature of field and a coma aberration in an excellent manner.

When the third lens L3 is structured in such a manner that the absolute value of a curvature radius of the object-side surface is greater than the absolute value of a curvature radius of the image-side surface, correction of a longitudinal chromatic aberration and a lateral chromatic aberration becomes easy. Further, it is possible to correct curvature of field in an excellent manner. Alternatively, the third lens L3 may be structured in such a manner that the absolute value of a curvature radius of the object-side surface is less than the absolute value of a curvature radius of the image-side surface. In such a case, correction of a spherical aberration becomes easy.

It is desirable that the fourth lens L4 is a double convex lens. When the fourth lens L4 has such a shape, it is possible to make the power of the fourth lens L4 strong. The fourth lens L4 can easily correct chromatic aberrations in cooperation with the third lens L3. Alternatively, the fourth lens L4 may have a plano-convex shape. When the fourth lens L4 has such a shape, it is possible to produce the fourth lens L4 at low cost. Alternatively, the fourth lens L4 may be a positive meniscus lens. Such a shape of the fourth lens L4 is advantageous in correcting curvature of field and a coma aberration. It is desirable that the absolute value of a curvature radius of the object-side surface of the fourth lens L4 is greater than the absolute value of a curvature radius of the image-side surface of the fourth lens L4. When the fourth lens L4 has such a shape, it is possible to correct curvature of field in an excellent manner.

It is desirable that the fifth lens L5 is a lens having a convex object-side surface. When the fifth lens L5 has such a shape, correction of curvature of field becomes easy. It is desirable that the fifth lens L5 is a double convex lens. When the fifth lens L5 has such a shape, correction of a spherical aberration, a longitudinal chromatic aberration, a lateral chromatic aberration and curvature of field becomes easy. It is desirable that the absolute value of the curvature radius of the object-side surface of the fifth lens L5 is less than the absolute value of the curvature radius of the image-side surface of the fifth lens L5. When the fifth lens L5 has such a shape, it is possible to correct a spherical aberration and a coma aberration in an excellent manner.

It is desirable that the sixth lens L6 is a meniscus lens having a convex image-side surface. When the sixth lens L6 has such a shape, it becomes possible to correct a lateral chromatic aberration and curvature of field in an excellent manner. Further, when the sixth lens L6 is a meniscus lens having a concave object-side surface, it is possible to increase the telecentricity, compared with the case in which the sixth lens L6 is a double-concave lens.

Here, the desirable shapes of the first lens L1 through the sixth lens L6, as described above, are considered in a paraxial region when each lens is an aspheric lens.

It is desirable that at least one of the object-side surface and the image-side surface of the third lens L3 is an aspheric surface. In such a case, it becomes possible to easily correct curvature of field and a spherical aberration in an excellent manner, and to obtain excellent resolution. Further, it is desirable that both surfaces of the third lens L3 are aspheric surfaces to obtain more excellent resolution.

Here, in an aspheric surface, when the center of each lens surface, i.e., a point of intersection of the surface and optical axis Z is Ci (i is a symbol representing the surface. For example, when the object-side surface of the third lens L3 is represented by 3F, it is regarded that i=3F in the following descriptions about the object-side surface of the third lens L3.) Further, when a point on the lens surface is Xi, and a point of intersection of a normal to the lens surface at point Xi and optical axis Z is Pi, power at the point Xi is defined based on whether the point Pi is located on the object side of the point Ci or on the image side of the point Ci. When the aspheric surface is an object-side surface, if the point Pi is located on the image side of the point Ci, power at point Xi is defined as positive power. If the point Pi is located on the object side of the point Ci, power at point Xi is defined as negative power. In contrast, when the aspheric surface is an image-side surface, if the point Pi is located on the object side of the point Ci, power at point Xi is defined as positive power. If the point Pi is located on the image side of the point Ci, power at point Xi is defined as negative power.

Further, in an aspheric surface, a segment connecting point Xi and point Pi is defined as curvature radius Rxi at the point Xi. When the absolute value of RXi is |RXi|=|Xi−Pi|, and the absolute value of a curvature radius at point Ci is |Ri|, if the sign of power at the point Xi and the sign of power at the center are the same, a shape in which power at the point Xi is weaker than power at the center is a shape in which |RXi| is greater than |Ri|. A shape in which power at the point Xi is stronger than power at the center is a shape in which |RXi| is less than |Ri|.

The general explanation about the aspheric surface is applicable also to an arbitrary aspheric lens surface of an imaging lens of the present invention. In the explanation, the symbols Ci, Xi, Pi, RXi, and Ri were used for the convenience of explanation, but they are not limited. The point Xi in the above explanation may be an arbitrary point on a lens surface. For example, the point Xi may be regarded as a point at an axial ray diameter edge or a point at an effective diameter edge.

It is desirable that the object-side surface of the third lens L3 is an aspheric surface. In such a case, correction of a spherical aberration and curvature of field becomes easy. It is desirable that the object-side surface of the third lens L3 has a shape having negative power at the center and stronger negative power at an axial ray diameter edge, compared with the center. When the object-side surface of the third lens L3 is such a shape, correction of a spherical aberration and curvature of field becomes easy. Here, the term "axial ray diameter edge" means outermost points (points farthest from the optical axis) in the direction of the diameter when points at which all rays contributing to image formation on an axis and a lens surface intersect with each other are considered. In other words, the axial ray diameter edge is points at which rays that are passing through the periphery of the aperture of aperture stop St intersect with a lens surface.

Figure 2:
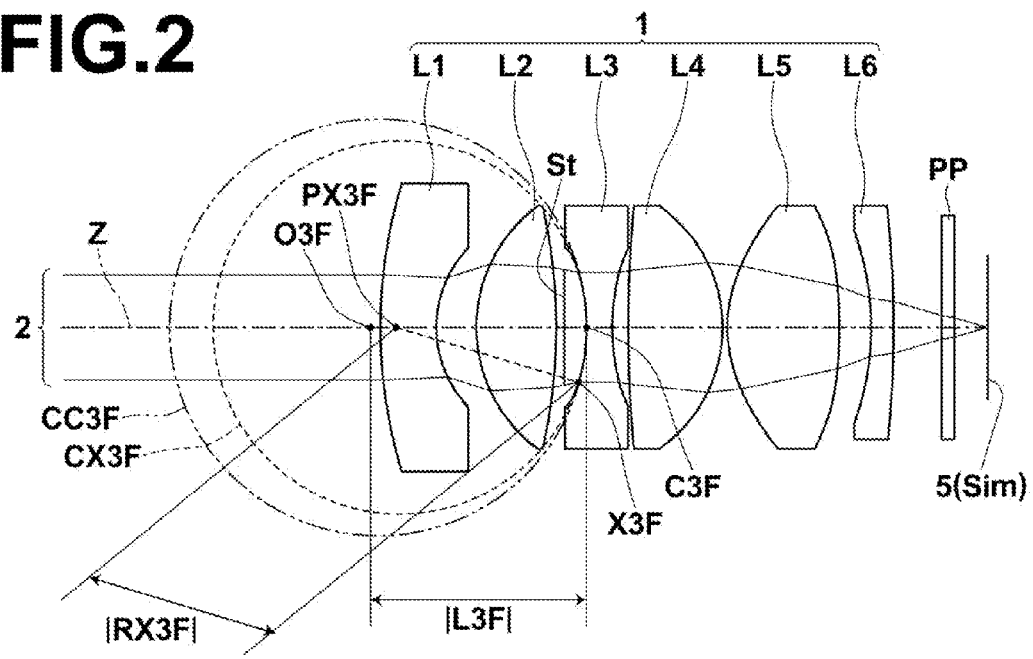
FIG. 2 is a diagram for explaining the aspheric surface shape of an object-side surface of a third lens.

Here, with reference to FIG. 2, the shape of the object-side surface of the third lens L3 will be described. FIG. 2 illustrates a case in which point Xi is an axial ray diameter edge. In FIG. 2, an axial ray diameter edge on the object-side surface of the third lens L3 is represented by point X3F. In FIG. 2, point C3F is a center of the object-side surface of the third lens L3, and the point C3F is a point of intersection of the object-side surface of the third lens L3 and optical axis Z. Here, a point of intersection of a normal to the lens surface at the point X3F and optical axis Z is point PX3F, as illustrated in FIG. 2.

At this time, a segment connecting the point X3F and the point PX3F is defined as curvature radius RX3F at the point X3F, and the length of the segment is defined as the absolute value |RX3F| of the curvature radius RX3F. Further, a curvature radius at point C3F is defined as L3F, and the absolute value of the curvature radius is defined as |L3F|. In other words, when the center of curvature in a paraxial region of the object-side surface of the third lens L3 is point O3F, the length of a segment connecting the point C3F and the point O3F is |L3F|.

The expression that the object-side surface of the third lens L3 "has negative power at the center" means that the shape of a paraxial region including the point C3F is concave. Further, the expression that the object-side surface of the third lens L3 has "a shape having stronger negative power at an axial ray diameter edge, compared with the center" means a shape in which the point PX3F is located on the object side of the point C3F, and the value of |RX3F| is less than the value of |L3F|.

Alternatively, the object-side surface of the third lens L3 may be an aspheric surface that is shaped in such a manner to have positive power at the center and negative power at an axial ray diameter edge. When the object-side surface of the third lens L3 has such a shape, correction of a spherical aberration and curvature of field is easy.

When the aforementioned symbols are used in consideration, the expression that the object-side surface of the third lens L3 "has positive power at the center" means that the shape of a paraxial region including the point C3F is convex. Further, the expression that the object-side surface of the third lens L3 "has negative power at the axial ray diameter edge" means a shape in which the point PX3F is located on the object side of the point C3F.

It is desirable that the image-side surface of the third lens L3 is an aspheric surface. In such a case, correction of a spherical aberration and curvature of field is easy. It is desirable that the image-side surface of the third lens L3 has negative power at the center, and stronger negative power at an axial ray diameter edge, compared with the center. When the object-side surface of the third lens L3 has such a shape, correction of a spherical aberration and curvature of field is easy.

The shape of the image-side surface of the third lens L3 may be considered in a similar manner to the shape of the object-side surface of the third lens L3, which was described with reference to FIG. 2, as follows. In a lens cross section, when an axial ray diameter edge on the image-side surface of the third lens L3 is point X3R, a point of intersection of a normal at the point and optical axis Z is point PX3R, a segment connecting the point X3R and the point PX3R is defined as curvature radius RX3R at the point X3R, and the length of the segment is defined as the absolute value |RX3R| of the curvature radius. Further, a point of intersection of the image-side surface of the third lens L3 and optical axis Z, in other words, the center of the image-side surface of the third lens L3 is point C3R, and a curvature radius at the point C3R is L3R, and the absolute value of the curvature radius is |L3R|.

The expression that the image-side surface of the third lens L3 "has negative power at the center" means that the shape of a paraxial region including the point C3R is concave. Further, the expression that the image-side surface of the third lens L3 has "a shape having stronger negative power at an axial ray diameter edge, compared with the center" means a shape in which the point PX3R is located on the image side of the point C3R, and the value of |RX3R| is less than the value of |L3R|.

Alternatively, the image-side surface of the third lens L3 may be an aspheric surface that is shaped in such a manner to have positive power at the center and negative power at an axial ray diameter edge. When the image-side surface of the third lens L3 has such a shape, correction of a spherical aberration and curvature of field is easy.

Here, when the image-side surface of the third lens L3 is an aspheric surface that is shaped in such a manner to have negative power at the center and weaker negative power at an axial ray diameter edge, compared with the center, correction of a coma aberration is easy.

Here, when the object-side surface of the third lens L3 is an aspheric surface that is shaped in such a manner to have negative power at the center and stronger negative power at an effective diameter edge, compared with the center, correction of a spherical aberration and curvature of field is easy.

Here, when the object-side surface of the third lens L3 is an aspheric surface that is shaped in such a manner to have positive power at the center and stronger positive power at an effective diameter edge, compared with the center, correction of a spherical aberration and curvature of field is easy.

Here, when the image-side surface of the third lens L3 is an aspheric surface that is shaped in such a manner to have negative power at the center and stronger negative power at an effective diameter edge, compared with the center, correction of a spherical aberration and curvature of field is easy.

It is desirable that at least one of the object-side surface and the image-side surface of the fifth lens L5 is an aspheric surface. In such a case, it is possible to easily correct curvature of field and a spherical aberration in an excellent manner, and to obtain excellent resolution. It is desirable that both sides of the fifth lens L5 are aspheric surfaces to obtain more excellent resolution.

It is desirable that the object-side surface of the fifth lens L5 is an aspheric surface. In such a case, correction of a coma aberration and curvature of field is easy. It is desirable that the object-side surface of the fifth lens L5 is shaped in such a manner to have positive power at the center and stronger positive power at an effective diameter edge, compared with the center. When the object-side surface of the fifth lens L5 has such a shape, correction of a coma aberration and curvature of field is easy.

Here, the phrase "effective diameter of a surface" means the diameter of a circle composed of outermost points (points farthest from the optical axis) in the direction of the diameter when points at which all rays contributing to image formation and a lens surface intersect with each other are considered. Further, the term "effective diameter edge" means the outermost points. When a system is rotationally symmetric with respect to an optical axis, a figure composed of the outermost points is a circle. However, when a system is not rotationally symmetric, a figure composed of the outermost points is not a circle in some cases. In such a case, an equivalent circle may be considered, and the diameter of the equivalent circle may be regarded as an effective diameter. For example, the effective diameter may be determined based on the size of an imaging plane of an imaging device when a lens system is used in combination with the imaging device. When the imaging plane is a rectangle and the center of the rectangle matches with the optical axis, for example, ½ of the diagonal length of the rectangle may be determined as the maximum image height, and the effective diameter may be calculated.

Figure 3:
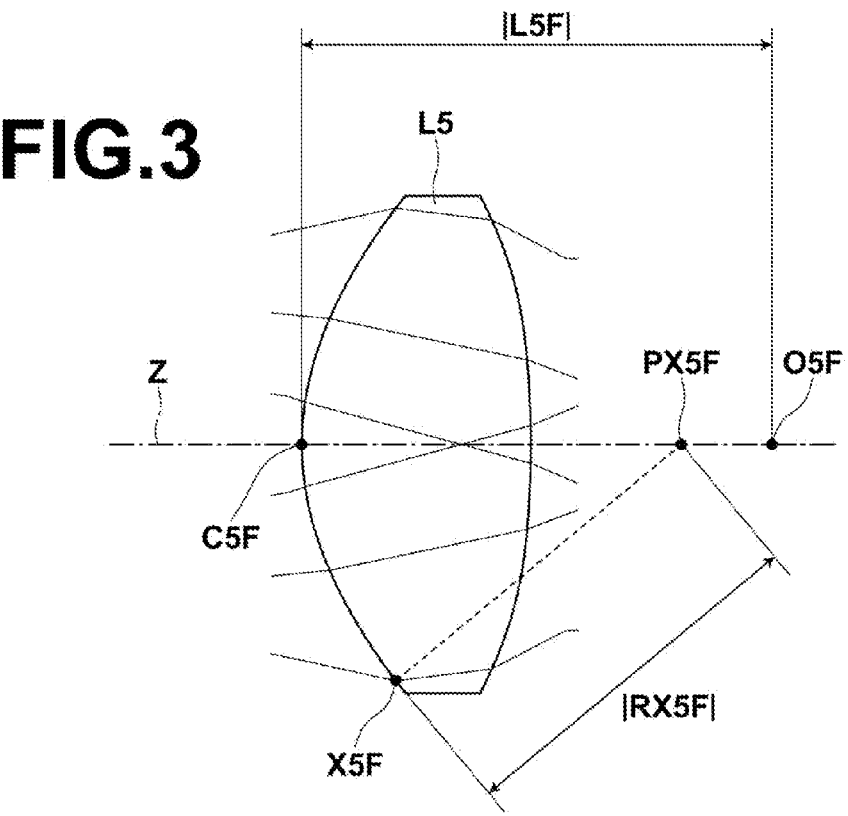
FIG. 3 is a diagram for explaining the aspheric surface shape of an object-side surface of a fifth lens.

Here, with reference to FIG. 3, the shape of the object-side surface of the fifth lens L5 will be described. FIG. 3 is a partially enlarged diagram of the fifth lens L5 and rays passing through the fifth lens L5. Signs of rays are omitted so that the drawing is easily recognizable. FIG. 3 illustrates a case in which point Xi (point X5F) is an effective diameter edge. In FIG. 3, point C5F is a center of the object-side surface of the fifth lens L5, and the point C5F is a point of intersection of the object-side surface of the fifth lens L5 and optical axis Z. The point X5F in FIG. 3 is a point at an effective diameter edge on the object-side surface of the fifth lens L5. Here, a point of intersection of a normal to the lens surface at the point X5F and optical axis Z is point PX5F, as illustrated in FIG. 3.

At this time, a segment connecting the point X5F and the point PX5F is defined as curvature radius RX5F at the point X5F, and the length of the segment is defined as the absolute value |RX5F| of the curvature radius RX5F. Further, a curvature radius at point C5F is defined as L5F, and the absolute value of the curvature radius is defined as |L5F|. In other words, when the center of curvature in a paraxial region of the object-side surface of the fifth lens L5 is point O5F, the length of a segment connecting the point C5F and the point O5F is |L5F|.

The expression that the object-side surface of the fifth lens L5 "has positive power at the center" means that the shape of a paraxial region including the point C5F is convex. Further, the expression that the object-side surface of the fifth lens L5 has "a shape having stronger positive power at an effective diameter edge, compared with the center" means a shape in which the point PX5F is located on the image side of the point C5F, and the value of |RX5F| is less than the value of |L5F|.

It is desirable that the image-side surface of the fifth lens L5 is an aspheric surface. In such a case, correction of a spherical aberration and curvature of field is easy. It is desirable that the image-side surface of the fifth lens L5 is shaped in such a manner to have positive power at the center and weaker positive power at an effective diameter edge, compared with the center. When the image-side surface of the fifth lens L5 has such a shape, correction of a spherical aberration and curvature of field is easy.

The shape of the image-side surface of the fifth lens L5 may be considered in a similar manner to the shape of the object-side surface of the fifth lens L5, which was described with reference to FIG. 3, as follows. In the lens cross section, when an effective diameter edge on the image-side surface of the fifth lens L5 is point X5R and a point of intersection of a normal at the point and optical axis Z is point PX5R, a segment connecting the point X5R and the point PX5R is curvature radius RX5R at the point X5R, and the length of the segment is the absolute value |RX5R| of the curvature radius. Further, a point of intersection of the image-side surface of the fifth lens L5 and optical axis Z, in other words, the center of the image-side surface of the fifth lens 15 is point C5R, and a curvature radius at the point C5R is L5R, and its absolute value is |L5R|.

The expression that the image-side surface of the fifth lens L5 "has positive power at the center" means that the shape of a paraxial region including the point C5R is convex. Further, the expression that the image-side surface of the fifth lens L5 has "a shape having weaker positive power at an effective diameter edge, compared with the center" means a shape in which the point PX5R is located on the object side of the point C5R, and the value of |X5R| is less than the value of |L5R|.

Here, when the image-side surface of the fifth lens L5 is an aspheric surface that is shaped in such a manner to have positive power at the center and weaker positive power at an axial ray diameter edge, compared with the center, correction of a coma aberration and curvature of field is easy.

Here, when the object-side surface of the fifth lens L5 is an aspheric surface that is shaped in such a manner to have positive power at the center and stronger positive power at an axial ray diameter edge, compared with the center, correction of a coma aberration and curvature of field is easy.

Further, the object-side surface of the fifth lens L5 and the image-side surface of the fifth lens L5 may be aspheric surfaces. The object-side surface may have positive power at the center and stronger positive power at an axial ray diameter edge, compared with the center. The image-side surface may have positive power at the center and weaker positive power at an axial ray diameter edge, compared with the center. Alternatively, the fifth lens L5 may be shaped in such a manner that the object-side surface has positive power at the center and stronger positive power at an effective diameter edge, compared with the center, and that the image-side surface has positive power at the center and weaker positive power at an effective diameter edge, compared with the center. When the fifth lens L5 has such a shape, correction of a spherical aberration and curvature of field is easy.

It is desirable that the material of the third lens L3 is plastic. In such a case, it is possible to easily produce a surface having an accurate aspheric shape, and to easily obtain excellent resolution performance. Further, a plastic aspheric lens is advantageous in reducing cost and the weight of the lens, compared with a glass aspheric lens.

It is desirable that the material of the fifth lens L5 is plastic. In such a case, it is possible to easily produce a surface having an accurate aspheric shape, and to easily obtain excellent resolution performance. Further, a plastic aspheric lens is advantageous in reducing cost and the weight of the lens, compared with a glass aspheric lens.

A plastic lens has a drawback that a movement amount of a focal position is large when temperature changes. However, when the lens system is structured in such a manner to include both of a plastic lens having positive power and a plastic lens having negative power, a change in the power of the positive lens and a change in the power of the negative lens during temperature change are cancelled by each other. Therefore, it is possible to suppress deterioration of performance. For that purpose, it is desirable to maintain the balance between the positive power of the plastic lens included in the lens system and the negative power of the plastic lens included in the lens system.

FIG. 1 illustrates an example in which the third lens L3 and the fifth lens L5 are plastic lenses and the other lenses are glass lenses. The third lens L3 is a negative lens and the fifth lens L5 is a positive lens. As described above, in the example illustrated in FIG. 1, the number of the plastic lens having positive power and the number of the plastic lens having negative power are the same, and the balance is maintained. Here, it is not always necessary that the number of the plastic lens having positive power included in the lens system and the number of the plastic lens having negative power included in the lens system are the same as far as the balance between the positive power of the plastic lens or lenses included in the lens system and the negative power of the plastic lens or lenses included in the lens system is maintained.

The lenses made of plastic are not always limited to the third lens L3 and the fifth lens L5, and the other lenses may be made of plastic. For example, the sixth lens L6 instead of the third lens L3 may be a plastic lens. The fourth lens L4 instead of the fifth lens L5 may be a plastic lens.

When an imaging lens is used in tough environment conditions, for example, such as use in an in-vehicle camera or a surveillance camera, the first lens L1, which is arranged on the most object side, needs to use a material resistant to a deterioration of a surface by wind and rain and a change in temperature by direct sun light, and resistant to chemicals, such as oils and fats and detergents. In other words, the material needs to be highly water-resistant, weather-resistant, acid-resistant, chemical-resistant, and the like. Further, in some cases, the material needs to be hard and not easily breakable. If the material of the first lens L1 is glass, it is possible to satisfy such needs. Alternatively, transparent ceramic may be used as the material of the first lens L1. It is desirable that the first lens L1 is a glass spheric lens under the above circumstances and also to lower cost. However, when high optical performance is important, a glass aspheric surface may be used as the first lens L1.

Further, a protection means may be applied to the object-side surface of the first lens L1 to increase the strength, scratch-resistance, and chemical-resistance of the surface. In that case, the material of the first lens L1 may be plastic. The protection means may be a hard coating or a water-repellent coating.

For example, in a lens for an in-vehicle camera, the first lens L1 needs to have resistance to various shocks. It is desirable that the center thickness of the first lens L1 is greater than or equal to 1.5 mm.

When an imaging lens is used in an in-vehicle camera or in a surveillance camera, the imaging lens may be used in various conditions, such as a wide temperature range including an outdoor temperature in a cold district through a temperature in a car in summer in the tropical zone and high humidity. It is desirable that the imaging lens is a lens system having high environment resistance to cope with such conditions. For that purpose, for example, the material of all of the lenses may be glass.

Further, various kinds of filters that cut, pass or reflect light in a specific wavelength band, such as a UV (Ultra Violet) cut filter and an IR (InfraRed) cut filter, may be inserted between the lens system and the imaging device 5 based on the purpose of the imaging lens 1. Alternatively, a coating having a function similar to such a filter may be applied to a lens surface, or a material that absorbs ultraviolet light, blue light, infrared light or the like may be used as the material of one of the lenses.

FIG. 1 illustrates a case of arranging optical member PP, which is assumed to be various filters or the like, between a lens system and the imaging device 5. Alternatively, the various filters may be arranged between the lenses.

Here, rays of light passing through the outside of the effective diameter between lenses may become stray light, and reach the image plane. Further, the stray light may become ghost. Therefore, it is desirable that a light shield means for blocking the stray light is provided, if necessary. The light shield means may be provided, for example, by applying an opaque paint to a portion of a lens in the outside of the effective diameter, or by providing there an opaque plate member. Alternatively, an opaque plate member, as a light shield means, may be provided in the optical path of rays that will become stray light. Alternatively, a hood-like member for blocking stray light may be provided further on the object side of the most-object-side lens. FIG. 1 illustrates an example in which a light shield means 11 is provided in the outside of the effective diameter on the image-side surface of the first lens L1. The position at which the light shield means is provided is not limited to the example illustrated in FIG. 1. The light shield means may be arranged on another lens or between lenses. For example, in the lens system illustrated in FIG. 1, it is desirable that the light shield means for blocking rays that are passing through the outside of the effective diameter is provided between the image-side surface of the fourth lens L4 and the object-side surface of the fifth lens L5. In such a case, it is possible to prevent ghost.

Further, a member, such as a stop, may be arranged between lenses to block peripheral rays in such a manner that relative illumination is within a practically acceptable range. The peripheral rays are rays from an object point that is not on optical axis Z, and pass through the peripheral portion of the entrance pupil of an optical system. When a member that blocks the peripheral rays is provided in such a manner, it is possible to improve the image quality in the peripheral portion of the image formation area. Further, the member can reduce ghost by blocking stray light that generates the ghost. As an example, FIG. 1 illustrates a case of providing a light shield means 12 for blocking peripheral rays and stray light on the object-side surface of the fifth lens L5. Here, the light shield means 12 functions as a vignetting stop that vignettes (VIGNETTING: vignetting).

Figure 4:
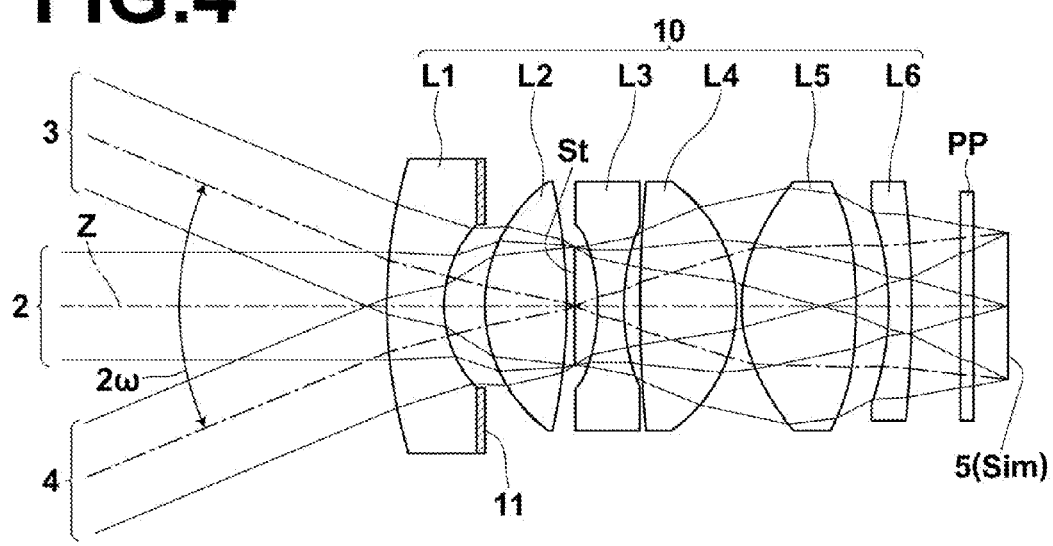
FIG. 4 is a diagram illustrating the structure of an imaging lens according to another embodiment of the present invention, and optical paths.

It is not always necessary that the imaging lens of the present invention has the light shield member for blocking peripheral rays, as described above. For example, as illustrated in the structural diagram of the imaging lens 10 in FIG. 4, a structure using no light shield member for blocking peripheral rays is possible, and high optical performance is achievable also in such a structure. The imaging lens 10 illustrated in FIG. 4 corresponds to Example 20, which will be described later.

Next, numerical value examples of imaging lenses of the present invention will be described. Lens cross sections of imaging lenses of Example 1 through Example 20 are illustrated in FIG. 5 through FIG. 24, respectively. In FIG. 5 through FIG. 24, the left side of the diagram is the object side, and the right side of the diagram is the image side. Further, aperture stop St and optical member PP are illustrated. In each diagram, the aperture stop St does not represent the shape nor the size of the aperture stop St but the position of the aperture stop St on optical axis Z. In each example, signs Ri, Di (i=1, 2, 3, . . . ) in the lens cross section correspond to Ri, Di in lens data, which will be described next.

Table 1 through Table 20 show lens data about the imaging lenses of Example 1 through Example 20, respectively. In each table, (A) shows basic lens data, and (B) shows aspheric surface data, and (C) shows various kinds of data.

In the basic lens data, column Si shows the surface number of the i-th surface (i=1, 2, 3, . . . ). The most object-side surface of composition elements is the first surface, and surface numbers sequentially increase toward the image side. Column Ri shows the curvature radius of the i-th surface, and column Di shows a distance between the i-th surface and the (i+1)th surface on optical axis Z. Here, the sign of a curvature radius is positive when the shape of a surface is convex toward the object side, and the sign of a curvature radius is negative when the shape of a surface is convex toward the image side. Further, column Ndj shows the refractive index of the j-th optical member (j=1, 2, 3, . . . ) for d-line (wavelength is 587.6 nm). The most-object side lens is the first optical member, and the number j sequentially increases toward the image side. The column vdj shows the Abbe number of the j-th optical element for d-line. Here, the basic lens data include aperture stop St and optical member PP. In the column of the surface number, the term (St) is also written for a surface corresponding to aperture stop St.

In the basic lens data, mark "*" is attached to the surface number of an aspheric surface. The basic lens data show, as the curvature radius of the aspheric surface, the numerical value of a paraxial curvature radius (a curvature radius at the center). The aspheric surface data show the surface numbers of aspheric surfaces and aspheric surface coefficients related to the respective aspheric surfaces. In the aspheric surface data, "E-n" (n: integer) means "×10$^{-n}$", and "E+n" means "×10$^{n}$". Further, the aspheric surface coefficients are coefficients KA, RBm (m=3, 4, 5, . . . 8) in the following aspherical equation:

$$Zd = \frac{C \times Y^2}{1 + \sqrt{1 - KA \times C^2 \times Y^2}} + \sum_m RB_m Y^m, \quad \text{[Formula 1]}$$

where

Zd: depth of an aspheric surface (the length of a perpendicular from a point on the aspheric surface at height Y to a flat plane that contacts with the vertex of the aspheric surface and is perpendicular to the optical axis), Y: height (the length from the optical axis to the lens surface), C: paraxial curvature, and KA, RBm: aspheric surface coefficients (m=3, 4, 5, . . . 8).

In various kinds of data, L (in Air) is a length (a back focus portion is a length in air) on optical axis Z from the object-side surface of the first lens L1 to image plane Sim, and Bf (in Air) is a length (corresponding to back focus, length in air) on optical axis Z from the image-side surface of the most-image-side lens to image plane Sim, and f is the focal length of the entire system, and f1 is the focal length of the first lens L1, and f2 is the focal length of the second lens L2, and f3 is the focal length of the third lens L3, and f4 is the focal length of the fourth lens L4, and f5 is the focal length of the fifth lens L5, and f6 is the focal length of the sixth lens L6.

Here, the imaging lenses in a part of the examples are designed by assuming that a vignetting stop, which is a light shield means for blocking peripheral rays and stray light, is provided. With respect to such an example, the surface number of a surface on which the stop is provided and the radius of the aperture of the stop are represented as a vignetting surface number and a vignetting stop diameter, respectively, in the various kinds of data.

Data corresponding to formulas represent values corresponding to the aforementioned formulas (1) through (15). Further, Table 21 shows values corresponding to the formulas (1) through (15) for each of all the examples.

In the tables in the specification of the present application, values are rounded to predetermined digits. As the unit of each numerical value, "mm" is used for length. However, the unit is only an example. Since an optical system can be used by proportionally enlarging or reducing its size, other appropriate units may be used.

TABLE 1

EXAMPLE 1

(A)

| Si | Ri | Di | Ndj | νdj |
|---|---|---|---|---|
| 1 | 17.5325 | 1.7500 | 1.58913 | 61.1 |
| 2 | 3.0540 | 1.5000 | | |
| 3 | 8.6848 | 2.5000 | 1.88300 | 40.8 |
| 4 | −19.9438 | 0.2500 | | |
| 5 (St) | ∞ | 0.7300 | | |
| *6 | −8.1639 | 0.8000 | 1.61396 | 25.5 |
| *7 | 5.8669 | 0.5000 | | |
| 8 | 19.9400 | 2.9500 | 1.58313 | 59.4 |
| 9 | −4.1511 | 0.1500 | | |
| *10 | 4.6963 | 2.8500 | 1.53389 | 56.0 |
| *11 | −6.2612 | 1.0000 | | |
| 12 | −5.3917 | 0.7000 | 1.92286 | 18.9 |
| 13 | −35.0000 | 1.5000 | | |
| 14 | ∞ | 0.4000 | 1.51680 | 64.2 |
| 15 | ∞ | 1.2512 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 3.6733222E−02 | −8.7706429E−02 | 9.9773106E−02 | −6.0217892E−02 | 1.8644648E−02 | −2.4228506E−03 |
| 7 | 0.0000000E+00 | 4.8761058E−03 | −9.0798427E−03 | 5.3146332E−03 | 1.9700994E−03 | −2.0058796E−03 | 3.6311408E−04 |
| 10 | 0.0000000E+00 | −1.6150691E−03 | 2.5219772E−03 | −1.5149736E−03 | 6.9273725E−04 | −1.5858100E−04 | 1.9583278E−05 |
| 11 | 0.0000000E+00 | 1.3360789E−02 | −1.1405448E−02 | 5.0075400E−03 | −1.6056141E−03 | 3.6356528E−04 | −3.2291275E−05 |

(C)

| | | | |
|---|---|---|---|
| L (in Air) | 18.7 | VIGNETTING SURFACE NUMBER | 10 |
| Bf (in Air) | 3.0 | VIGNETTING STOP DIAMETER | 3.0 |
| f | 4.21 | | |
| f1 | −6.57 | | |
| f2 | 7.14 | | |
| f3 | −5.44 | | |
| f4 | 6.17 | | |
| f5 | 5.53 | | |
| f6 | −6.99 | | |

TABLE 2

EXAMPLE 2

(A)

| Si | Ri | Di | Ndj | νdj |
|---|---|---|---|---|
| 1 | 17.5249 | 1.7500 | 1.58913 | 61.1 |
| 2 | 3.0756 | 1.5000 | | |
| 3 | 9.2843 | 2.5000 | 1.88300 | 40.8 |
| 4 | −19.9557 | 0.2500 | | |
| 5 (St) | ∞ | 0.7000 | | |
| *6 | −10.1103 | 0.8000 | 1.61396 | 25.5 |
| *7 | 5.8412 | 0.5000 | | |
| 8 | 19.9542 | 2.9500 | 1.58313 | 59.4 |
| 9 | −4.1655 | 0.1500 | | |
| *10 | 4.6898 | 2.8500 | 1.53389 | 56.0 |
| *11 | −6.3523 | 1.0000 | | |
| 12 | −5.1641 | 0.7000 | 1.92286 | 18.9 |
| 13 | −35.0000 | 1.5000 | | |

TABLE 2-continued

EXAMPLE 2

| | | | | | |
|---|---|---|---|---|---|
| 14 | ∞ | 0.4000 | 1.51680 | 64.2 | |
| 15 | ∞ | 1.1533 | | | |
| IMAGE PLANE | ∞ | | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 3.3471362E−02 | −8.3673761E−02 | 9.5484335E−02 | −5.9464259E−02 | 1.9447384E−02 | −2.7262568E−03 |
| 7 | 0.0000000E+00 | 7.5887798E−03 | −1.3390684E−02 | 6.4438360E−03 | 2.1440105E−03 | −2.0973921E−03 | 3.6461745E−04 |
| 10 | 0.0000000E+00 | −1.6311585E−03 | 2.6360238E−03 | −1.4208349E−03 | 6.8225109E−04 | −1.6402261E−04 | 2.1135077E−05 |
| 11 | 0.0000000E+00 | 1.0977267E−02 | −1.0074125E−02 | 4.9602527E−03 | −1.6472167E−03 | 3.5843224E−04 | −3.0117905E−05 |

(C)

| | | | |
|---|---|---|---|
| L (in Air) | 18.6 | VIGNETTING SURFACE NUMBER | 10 |
| Bf (in Air) | 2.9 | VIGNETTING STOP DIAMETER | 3.0 |
| f | 4.22 | | |
| f1 | −6.63 | | |
| f2 | 7.48 | | |
| f3 | −5.92 | | |
| f4 | 6.19 | | |
| f5 | 5.55 | | |
| f6 | −6.64 | | |

TABLE 3

EXAMPLE 3

(A)

| Si | Ri | Di | Ndj | vdj |
|---|---|---|---|---|
| 1 | 20.0129 | 1.7500 | 1.58913 | 61.1 |
| 2 | 3.2427 | 1.5000 | | |
| 3 | 13.4957 | 2.5000 | 1.88300 | 40.8 |
| 4 | −10.1818 | 0.3534 | | |
| 5 (St) | ∞ | 0.7000 | | |
| *6 | −15.9152 | 0.8000 | 1.61396 | 25.5 |
| *7 | 4.2073 | 0.5000 | | |
| 8 | ∞ | 2.9000 | 1.75500 | 52.3 |
| 9 | −5.3446 | 0.1500 | | |
| *10 | 4.4186 | 2.8500 | 1.53389 | 56.0 |
| *11 | −5.3999 | 1.0000 | | |
| 12 | −5.7550 | 0.8000 | 1.92286 | 18.9 |
| 13 | −69.4406 | 1.5000 | | |
| 14 | ∞ | 0.4000 | 1.51680 | 64.2 |
| 15 | ∞ | 1.3017 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 2.6677331E−02 | −9.7197044E−02 | 9.5848527E−02 | −5.8923384E−02 | 2.1062742E−02 | −3.2709489E−03 |
| 7 | 0.0000000E+00 | 8.0900739E−04 | −3.4328187E−02 | 1.0433354E−02 | 4.8917749E−03 | −3.2515191E−03 | 5.2449069E−04 |
| 10 | 0.0000000E+00 | 5.3048187E−04 | 4.2020115E−04 | −1.0424387E−03 | 6.7423158E−04 | −1.6889531E−04 | 1.8982183E−05 |
| 11 | 0.0000000E+00 | 9.9294267E−03 | −9.1212758E−03 | 5.1569905E−03 | −1.5994216E−03 | 2.9187101E−04 | −2.1526746E−05 |

(C)

| | | | |
|---|---|---|---|
| L (in Air) | 18.9 | VIGNETTING SURFACE NUMBER | 10 |
| Bf (in Air) | 3.1 | VIGNETTING STOP DIAMETER | 3.0 |
| f | 4.22 | | |
| f1 | −6.83 | | |
| f2 | 6.91 | | |
| f3 | −5.34 | | |
| f4 | 7.08 | | |
| f5 | 5.06 | | |
| f6 | −6.84 | | |

TABLE 4

EXAMPLE 4

(A)

| Si | Ri | Di | Ndj | vdj |
|---|---|---|---|---|
| 1 | 20.0009 | 2.0000 | 1.58913 | 61.1 |
| 2 | 3.0802 | 1.3501 | | |
| 3 | 10.3557 | 2.5000 | 1.88300 | 40.8 |
| 4 | −21.1175 | 0.2500 | | |
| 5 (St) | ∞ | 0.7000 | | |
| *6 | −10.0005 | 0.8000 | 1.61396 | 25.5 |
| *7 | 8.4850 | 0.5000 | | |
| 8 | 15.0000 | 2.9000 | 1.58313 | 59.4 |
| 9 | −3.9107 | 0.1500 | | |
| *10 | 5.9838 | 2.8500 | 1.53389 | 56.0 |
| *11 | −8.9971 | 1.0000 | | |
| 12 | −6.4280 | 0.8000 | 1.92286 | 18.9 |
| 13 | −69.4406 | 1.5000 | | |
| 14 | ∞ | 0.4000 | 1.51680 | 64.2 |
| 15 | ∞ | 1.3041 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 3.5228903E−02 | −5.0649592E−02 | 3.3223498E−02 | −1.0945215E−02 | 1.5611772E−03 | −1.0983154E−04 |
| 7 | 0.0000000E+00 | 1.9223681E−02 | −1.8824806E−02 | 7.4831328E−03 | 1.2645651E−03 | −1.2159414E−03 | 1.6730126E−04 |
| 10 | 0.0000000E+00 | −4.7699720E−03 | 4.9818854E−03 | −2.3953677E−03 | 2.6571937E−04 | 7.9415710E−05 | −1.5614975E−05 |
| 11 | 0.0000000E+00 | 3.7138444E−03 | −3.1439772E−03 | 5.8452577E−04 | −3.3455683E−04 | 1.0830034E−04 | −9.0017241E−06 |

(C)

| | | | |
|---|---|---|---|
| L (in Air) | 18.9 | VIGNETTING SURFACE NUMBER | 10 |
| Bf (in Air) | 3.1 | VIGNETTING STOP DIAMETER | 3.0 |
| f | 4.51 | | |
| f1 | −6.46 | | |
| f2 | 8.17 | | |
| f3 | −7.36 | | |
| f4 | 5.64 | | |
| f5 | 7.21 | | |
| f6 | −7.72 | | |

TABLE 5

EXAMPLE 5

(A)

| Si | Ri | Di | Ndj | vdj |
|---|---|---|---|---|
| 1 | 15.7973 | 1.7500 | 1.58913 | 61.1 |
| 2 | 3.3248 | 1.7500 | | |
| 3 | 15.2662 | 2.5000 | 1.88300 | 40.8 |
| 4 | −16.9241 | 0.2500 | | |
| 5 (St) | ∞ | 0.7000 | | |
| *6 | −13.0377 | 0.8000 | 1.61396 | 25.5 |
| *7 | 5.9356 | 0.5000 | | |
| 8 | 19.9685 | 2.9500 | 1.62280 | 57.1 |
| 9 | −4.0314 | 0.1500 | | |
| *10 | 5.2421 | 2.8500 | 1.53389 | 56.0 |
| *11 | −6.5727 | 1.0000 | | |
| 12 | −4.6926 | 0.7000 | 1.92286 | 18.9 |
| 13 | −35.0000 | 1.5000 | | |
| 14 | ∞ | 0.4000 | 1.51680 | 64.2 |
| 15 | ∞ | 1.1273 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 2.2874648E−02 | −7.3248552E−02 | 8.6304819E−02 | −5.8843144E−02 | 2.1054820E−02 | −3.2266410E−03 |
| 7 | 0.0000000E+00 | 7.9727556E−03 | −1.6085553E−02 | 7.0973534E−03 | 2.3062129E−03 | −2.3225860E−03 | 4.3811914E−04 |

TABLE 5-continued

EXAMPLE 5

| | | | | | | |
|---|---|---|---|---|---|---|
| 10 | 0.0000000E+00 | 4.5807027E−04 | 7.2087549E−04 | −7.2020212E−04 | 6.7362066E−04 | −1.9345653E−04 | 2.4661294E−05 |
| 11 | 0.0000000E+00 | 4.4312281E−03 | −6.6536695E−03 | 4.5971058E−03 | −1.7428058E−03 | 3.6191954E−04 | −2.6573008E−05 |

(C)

| | | | |
|---|---|---|---|
| L (in Air) | 18.8 | VIGNETTING SURFACE NUMBER | 10 |
| Bf (in Air) | 2.9 | VIGNETTING STOP DIAMETER | 3.0 |
| f | 4.22 | | |
| f1 | −7.54 | | |
| f2 | 9.43 | | |
| f3 | −6.54 | | |
| f4 | 5.65 | | |
| f5 | 5.96 | | |
| f6 | −5.94 | | |

TABLE 6

EXAMPLE 6

(A)

| Si | Ri | Di | Ndj | vdj |
|---|---|---|---|---|
| 1 | 15.4575 | 1.7500 | 1.58913 | 61.1 |
| 2 | 3.2600 | 1.7500 | | |
| 3 | 13.6719 | 2.8000 | 1.88300 | 40.8 |
| 4 | −6.8257 | 0.2500 | | |
| 5 (St) | ∞ | 0.7000 | | |
| *6 | −8.2278 | 0.8000 | 1.61396 | 25.5 |
| *7 | 5.8228 | 0.5000 | | |
| 8 | ∞ | 2.9500 | 1.62280 | 57.1 |
| 9 | −4.9433 | 0.1500 | | |
| *10 | 5.4172 | 2.8500 | 1.53389 | 56.0 |
| *11 | −5.4513 | 1.0000 | | |
| 12 | −5.8223 | 0.7000 | 1.92286 | 18.9 |
| 13 | −35.0000 | 2.1042 | | |
| 14 | ∞ | 0.4000 | 1.51680 | 64.2 |
| 15 | ∞ | 0.5000 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 1.6063569E−02 | −7.4794148E−02 | 8.0971002E−02 | −5.6411428E−02 | 2.3218356E−02 | −4.0204158E−03 |
| 7 | 0.0000000E+00 | 3.5923699E−03 | −2.9163453E−02 | 8.2294448E−03 | 4.1293627E−03 | −2.0275166E−03 | 2.1786546E−04 |
| 10 | 0.0000000E+00 | −1.5436303E−04 | −6.5226132E−04 | −7.9417578E−04 | 6.3276256E−04 | −2.0192203E−04 | 2.8160436E−05 |
| 11 | 0.0000000E+00 | 2.8639683E−03 | −5.4333976E−03 | 4.3861463E−03 | −1.8014827E−03 | 3.6013912E−04 | −2.3407575E−05 |

(C)

| | | | |
|---|---|---|---|
| L (in Air) | 19.1 | VIGNETTING SURFACE NUMBER | 10 |
| Bf (in Air) | 2.9 | VIGNETTING STOP DIAMETER | 3.0 |
| f | 4.62 | | |
| f1 | −7.41 | | |
| f2 | 5.51 | | |
| f3 | −5.44 | | |
| f4 | 7.94 | | |
| f5 | 5.60 | | |
| f6 | −7.66 | | |

TABLE 7

EXAMPLE 7

(A)

| Si | Ri | Di | Ndj | vdj |
|---|---|---|---|---|
| 1 | 15.4696 | 1.7500 | 1.75500 | 52.3 |
| 2 | 3.4794 | 1.7500 | | |
| 3 | 8.6639 | 2.5000 | 1.88300 | 40.8 |

TABLE 7-continued

EXAMPLE 7

| | | | | |
|---|---|---|---|---|
| 4 | −16.9646 | 0.2500 | | |
| 5 (St) | ∞ | 0.7000 | | |
| *6 | −13.0471 | 0.8000 | 1.63355 | 23.6 |
| *7 | 6.0265 | 0.5000 | | |
| 8 | 40.0006 | 2.9500 | 1.58313 | 59.4 |
| 9 | −4.0890 | 0.1500 | | |
| *10 | 4.7573 | 2.8500 | 1.53389 | 56.0 |
| *11 | −6.7580 | 1.0000 | | |
| 12 | −4.8327 | 0.7000 | 1.92286 | 18.9 |
| 13 | −35.0000 | 1.5000 | | |
| 14 | ∞ | 0.4000 | 1.51680 | 64.2 |
| 15 | ∞ | 1.1235 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 2.3142812E−02 | −7.0776465E−02 | 8.6542616E−02 | −5.9087402E−02 | 2.0950626E−02 | −3.0994875E−03 |
| 7 | 0.0000000E+00 | 9.5047050E−03 | −1.6268456E−02 | 7.0260769E−03 | 2.3372241E−03 | −2.3049871E−03 | 4.2815738E−04 |
| 10 | 0.0000000E+00 | 5.1446640E−04 | 8.0159611E−04 | −6.6634317E−04 | 6.6318695E−04 | −1.9777407E−04 | 2.5499511E−05 |
| 11 | 0.0000000E+00 | 4.2379048E−03 | −6.5694140E−03 | 4.5466236E−03 | −1.7419005E−03 | 3.6491526E−04 | −2.7430523E−05 |

(C)

| | | | |
|---|---|---|---|
| L(in Air) | 18.8 | VIGNETTING SURFACE NUMBER | 10 |
| Bf(in Air) | 2.9 | VIGNETTING STOP DIAMETER | 3.0 |
| f | 4.39 | | |
| f1 | −6.34 | | |
| f2 | 6.81 | | |
| f3 | −6.40 | | |
| f4 | 6.52 | | |
| f5 | 5.72 | | |
| f6 | −6.14 | | |

TABLE 8

EXAMPLE 8

(A)

| Si | Ri | Di | Ndj | νdj |
|---|---|---|---|---|
| 1 | 15.4886 | 1.7500 | 1.58913 | 61.1 |
| 2 | 3.3535 | 1.7500 | | |
| 3 | 15.9048 | 2.5000 | 1.77250 | 49.6 |
| 4 | −16.7861 | 0.2500 | | |
| 5 (St) | ∞ | 0.7000 | | |
| *6 | −13.1461 | 0.8000 | 1.58362 | 30.2 |
| *7 | 6.3300 | 0.5000 | | |
| 8 | 19.9125 | 2.9500 | 1.58913 | 61.1 |
| 9 | −3.9576 | 0.1500 | | |
| *10 | 4.9183 | 2.8500 | 1.53380 | 56.0 |
| *11 | −6.4421 | 1.0000 | | |
| 12 | −4.4626 | 0.7000 | 1.92286 | 18.9 |
| 13 | −35.0000 | 1.5000 | | |
| 14 | ∞ | 0.4000 | 1.51680 | 64.2 |
| 15 | ∞ | 1.1295 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 2.8705887E−02 | −8.2653803E−02 | 9.2590165E−02 | −5.9247453E−02 | 1.9778276E−02 | −2.9205973E−03 |
| 7 | 0.0000000E+00 | 7.5907000E−03 | −1.4064467E−02 | 6.2793869E−03 | 2.2349364E−03 | −2.2440534E−03 | 4.2507606E−04 |
| 10 | 0.0000000E+00 | 4.3767109E−04 | 5.2163893E−04 | −3.7193457E−04 | 6.4924571E−04 | −2.0900936E−04 | 2.8735876E−05 |
| 11 | 0.0000000E+00 | 4.2535131E−03 | −5.7388776E−03 | 4.4347984E−03 | −1.7204544E−03 | 3.7825889E−04 | −3.1894630E−05 |

(C)

| | | | |
|---|---|---|---|
| L(in Air) | 18.8 | VIGNETTING SURFACE NUMBER | 10 |
| Bf(in Air) | 2.9 | VIGNETTING STOP DIAMETER | 3.0 |

TABLE 8-continued

EXAMPLE 8

| | |
|---|---|
| f | 4.14 |
| f1 | −7.68 |
| f2 | 10.94 |
| f3 | −7.21 |
| f4 | 5.87 |
| f5 | 5.72 |
| f6 | −5.60 |

TABLE 9

EXAMPLE 9

(A)

| Si | Ri | Di | Ndj | vdj |
|---|---|---|---|---|
| 1 | 15.4937 | 1.7500 | 1.58913 | 61.1 |
| 2 | 3.6799 | 1.7500 | | |
| 3 | 5.1194 | 2.5000 | 1.88300 | 40.8 |
| 4 | −16.9897 | 0.2500 | | |
| 5 (St) | ∞ | 0.7000 | | |
| *6 | −4.3900 | 0.8000 | 1.61396 | 25.5 |
| *7 | 5.2986 | 0.5000 | | |
| 8 | 40.0009 | 2.9500 | 1.51680 | 64.2 |
| 9 | −5.1357 | 0.1500 | | |
| *10 | 3.9859 | 2.8500 | 1.51104 | 56.8 |
| *11 | −8.1683 | 1.0000 | | |
| 12 | −8.5372 | 0.7000 | 1.92286 | 18.9 |
| 13 | −35.0000 | 1.5000 | | |
| 14 | ∞ | 0.4000 | 1.51680 | 64.2 |
| 15 | ∞ | 1.1295 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 2.1977942E−02 | −6.5275270E−02 | 8.7612198E−02 | −5.9062691E−02 | 2.0919606E−02 | −3.0847678E−03 |
| 7 | 0.0000000E+00 | 6.6446013E−03 | −1.4772937E−02 | 7.7478052E−03 | 2.5016146E−03 | −2.3235149E−03 | 4.3142087E−04 |
| 10 | 0.0000000E+00 | −8.2417700E−04 | −2.2395355E−04 | −8.0206578E−04 | 6.5319208E−04 | −1.9993176E−04 | 2.3038316E−05 |
| 11 | 0.0000000E+00 | 2.6899183E−03 | −6.7725995E−03 | 4.4443686E−03 | −1.7749675E−03 | 3.5968411E−04 | −2.5737104E−05 |

(C)

| | | | |
|---|---|---|---|
| L(in Air) | 18.8 | VIGNETTING SURFACE NUMBER | 10 |
| Bf(in Air) | 2.9 | VIGNETTING STOP DIAMETER | 3.0 |
| f | 5.73 | | |
| f1 | −8.67 | | |
| f2 | 4.70 | | |
| f3 | −3.79 | | |
| f4 | 9.01 | | |
| f5 | 5.69 | | |
| f6 | −12.39 | | |

TABLE 10

EXAMPLE 10

(A)

| Si | Ri | Di | Ndj | vdj |
|---|---|---|---|---|
| 1 | 15.4996 | 1.7500 | 1.58913 | 61.1 |
| 2 | 3.4377 | 1.2500 | | |
| 3 | 5.0346 | 2.5000 | 1.88300 | 40.8 |
| 4 | −16.9963 | 0.2500 | | |
| 5 (St) | ∞ | 0.7000 | | |
| *6 | −4.6080 | 0.8000 | 1.61396 | 25.5 |
| *7 | 5.8008 | 0.6065 | | |
| 8 | 40.0008 | 2.9942 | 1.51680 | 64.2 |
| 9 | −4.8340 | 0.1500 | | |
| *10 | 4.2287 | 2.8500 | 1.51104 | 56.8 |

TABLE 10-continued

EXAMPLE 10

| | | | | |
|---|---|---|---|---|
| *11 | −9.6733 | 1.0000 | | |
| 12 | −8.8279 | 0.7000 | 1.92286 | 18.9 |
| 13 | −35.0000 | 1.5000 | | |
| 14 | ∞ | 0.4000 | 1.51680 | 64.2 |
| 15 | ∞ | 1.3046 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 1.7733519E−02 | −5.2670746E−02 | 7.9655386E−02 | −5.8352795E−02 | 2.2247577E−02 | −3.5007665E−03 |
| 7 | 0.0000000E+00 | 7.5392427E−03 | −1.3106044E−02 | 8.3201966E−03 | 2.1817568E−03 | −2.6873985E−03 | 5.7372027E−04 |
| 10 | 0.0000000E+00 | 3.0993907E−04 | −1.5783426E−04 | −9.0967502E−04 | 6.5041123E−04 | −1.9836880E−04 | 2.4481605E−05 |
| 11 | 0.0000000E+00 | 3.5660578E−03 | −6.6485783E−03 | 4.0325694E−03 | −1.7658254E−03 | 3.8667791E−04 | −2.8103141E−05 |

(C)

| | | | |
|---|---|---|---|
| L(in Air) | 18.6 | VIGNETTING SURFACE NUMBER | 10 |
| Bf(in Air) | 3.1 | VIGNETTING STOP DIAMETER | 3.0 |
| f | 5.92 | | |
| f1 | −7.92 | | |
| f2 | 4.65 | | |
| f3 | −4.06 | | |
| f4 | 8.54 | | |
| f5 | 6.19 | | |
| f6 | −12.96 | | |

TABLE 11

EXAMPLE 11

(A)

| Si | Ri | Di | Ndj | vdj |
|---|---|---|---|---|
| 1 | 24.1916 | 1.7501 | 1.58913 | 61.1 |
| 2 | 3.7812 | 12500 | | |
| 3 | 5.9810 | 2.5000 | 1.88300 | 40.8 |
| 4 | −14.8726 | 0.2525 | | |
| 5 (St) | ∞ | 0.7037 | | |
| *6 | −4.6464 | 0.8000 | 1.61396 | 25.5 |
| *7 | 7.3413 | 0.5311 | | |
| 8 | −18.5281 | 2.9500 | 1.62041 | 60.3 |
| 9 | −4.0774 | 0.1500 | | |
| *10 | 4.6552 | 2.8501 | 1.53389 | 56.0 |
| *11 | −8.0352 | 1.0000 | | |
| 12 | −6.7396 | 0.7000 | 1.92286 | 18.9 |
| 13 | −35.0000 | 1.5000 | | |
| 14 | ∞ | 0.4000 | 1.51680 | 64.2 |
| 15 | ∞ | 1.3048 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 1.5988101E−02 | −4.9454545E−02 | 7.4955122E−02 | −5.7789759E−02 | 2.2861307E−02 | −3.7254018E−03 |
| 7 | 0.0000000E+00 | 5.6899356E−03 | −7.2944320E−03 | 6.2377529E−03 | 1.5611317E−03 | −2.2386287E−03 | 4.8372480E−04 |
| 10 | 0.0000000E+00 | −2.0969075E−04 | 7.0727353E−04 | −1.0042138E−03 | 6.5218286E−04 | −1.9217898E−04 | 2.3601762E−05 |
| 11 | 0.0000000E+00 | 3.1471317E−03 | −6.7114227E−03 | 4.1041450E−03 | −1.7425194E−03 | 3.8887999E−04 | −2.9648776E−05 |

(C)

| | | | |
|---|---|---|---|
| L(in Air) | 18.5 | VIGNETTING SURFACE NUMBER | 10 |
| Bf(in Air) | 3.1 | VIGNETTING STOP DIAMETER | 3.0 |
| f | 5.19 | | |
| f1 | −7.86 | | |
| f2 | 5.12 | | |
| f3 | −4.52 | | |
| f4 | 7.82 | | |

TABLE 11-continued

EXAMPLE 11

| | |
|---|---|
| f5 | 5.99 |
| f6 | -9.15 |

TABLE 12

EXAMPLE 12

(A)

| Si | Ri | Di | Ndj | vdj |
|---|---|---|---|---|
| 1 | 16.5007 | 1.7500 | 1.58913 | 61.1 |
| 2 | 3.5189 | 1.2500 | | |
| 3 | 5.3751 | 2.5000 | 1.83481 | 42.7 |
| 4 | -21.4699 | 0.5791 | | |
| 5 (St) | ∞ | 0.7000 | | |
| *6 | -2.2141 | 0.8000 | 1.63355 | 23.6 |
| *7 | -7.2236 | 0.3215 | | |
| 8 | -34.9507 | 2.9500 | 1.71300 | 53.9 |
| 9 | -5.9817 | 0.1500 | | |
| *10 | 4.3816 | 2.8500 | 1.53389 | 56.0 |
| *11 | -6.9500 | 1.0000 | | |
| 12 | -6.7408 | 0.7000 | 1.92286 | 18.9 |
| 13 | -35.0000 | 1.5000 | | |
| 14 | ∞ | 0.4000 | 1.51680 | 64.2 |
| 15 | ∞ | 1.3048 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 7.9421460E-03 | 1.3803461E-02 | 4.6492338E-02 | -5.2669552E-02 | 2.2268519E-02 | -3.5409260E-03 |
| 7 | 0.0000000E+00 | -9.5408455E-04 | 3.3621685E-02 | -1.0268286E-03 | -7.0796050E-03 | 2.5885858E-03 | -2.6012726E-04 |
| 10 | 0.0000000E+00 | -9.9950858E-04 | 2.5969486E-03 | -1.6254274E-03 | 6.9493378E-04 | -1.6952223E-04 | 1.9283213E-05 |
| 11 | 0.0000000E+00 | 2.9535498E-03 | -5.0686743E-03 | 3.9610333E-03 | -1.7715462E-03 | 4.0655844E-04 | -3.3836578E-05 |

(C)

| | | | |
|---|---|---|---|
| L(in Air) | 18.6 | VIGNETTING SURFACE NUMBER | 10 |
| Bf(in Air) | 3.1 | VIGNETTING STOP DIAMETER | 3.0 |
| f | 5.39 | | |
| f1 | -7.99 | | |
| f2 | 5.38 | | |
| f3 | -5.37 | | |
| f4 | 9.71 | | |
| f5 | 5.52 | | |
| f6 | -9.16 | | |

TABLE 13

EXAMPLE 13

(A)

| Si | Ri | Di | Ndj | vdj |
|---|---|---|---|---|
| 1 | 21.4134 | 1.7500 | 1.58913 | 61.1 |
| 2 | 3.4432 | 1.5000 | | |
| 3 | 16.4484 | 2.5000 | 1.88300 | 40.8 |
| 4 | -16.0627 | 0.2500 | | |
| 5 (St) | ∞ | 0.7000 | | |
| *6 | -14.0655 | 0.8000 | 1.61396 | 25.5 |
| *7 | 6.3672 | 0.5000 | | |
| 8 | 23.6949 | 2.9000 | 1.58313 | 59.4 |
| 9 | -3.8770 | 0.1500 | | |
| *10 | 4.8894 | 3.0000 | 1.53389 | 56.0 |
| *11 | -7.5454 | 1.0000 | | |
| 12 | -4.8965 | 0.7000 | 1.92286 | 18.9 |
| 13 | -35.0000 | 1.5000 | | |

TABLE 13-continued

EXAMPLE 13

| | | | | | |
|---|---|---|---|---|---|
| 14 | ∞ | 0.4000 | 1.51680 | 64.2 | |
| 15 | ∞ | 1.0753 | | | |
| IMAGE PLANE | ∞ | | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 2.9612952E−02 | −8.8421271E−02 | 9.3011686E−02 | −5.8532856E−02 | 1.9853799E−02 | −2.9121871E−03 |
| 7 | 0.0000000E+00 | 6.4538103E−03 | −1.9162594E−02 | 6.3765768E−03 | 2.5934278E−03 | −1.8880706E−03 | 3.0815955E−04 |
| 10 | 0.0000000E+00 | −1.2166319E−03 | 2.3057442E−03 | −1.3557710E−03 | 6.9500661E−04 | −1.6462068E−04 | 2.0356461E−05 |
| 11 | 0.0000000E+00 | 7.8113687E−03 | −8.4375912E−03 | 4.9521367E−03 | −1.7197136E−03 | 3.4340257E−04 | −2.6575060E−05 |

(C)

| | |
|---|---|
| L(in Air) | 18.6 |
| Bf(in Air) | 2.8 |
| f | 4.21 |
| f1 | −7.23 |
| f2 | 9.55 |
| f3 | −7.03 |
| f4 | 5.94 |
| f5 | 6.07 |
| f6 | −6.24 |

TABLE 14

EXAMPLE 14

(A)

| Si | Ri | Di | Ndj | vdj |
|---|---|---|---|---|
| 1 | 16.5466 | 1.7500 | 1.58913 | 61.1 |
| 2 | 3.2008 | 1.2500 | | |
| 3 | 5.7286 | 2.5000 | 1.88300 | 40.8 |
| 4 | −23.0091 | 0.2500 | | |
| 5 (St) | ∞ | 0.7000 | | |
| *6 | −7.8087 | 0.8000 | 1.61396 | 25.5 |
| *7 | 5.8449 | 0.5000 | | |
| 8 | 19.9970 | 2.9500 | 1.51680 | 64.2 |
| 9 | −4.5145 | 0.1500 | | |
| *10 | 4.5246 | 3.5000 | 1.51104 | 56.8 |
| *11 | −15.2126 | 1.0000 | | |
| 12 | −8.2366 | 0.7000 | 1.92286 | 18.9 |
| 13 | −35.0000 | 1.5000 | | |
| 14 | ∞ | 0.4000 | 1.51680 | 64.2 |
| 15 | ∞ | 1.0542 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 1.1135738E−02 | −4.3833967E−02 | 6.6810173E−02 | −5.1735564E−02 | 2.0758901E−02 | −3.3150260E−03 |
| 7 | 0.0000000E+00 | 1.2004773E−03 | −7.6204864E−03 | 4.5110336E−03 | −8.2822105E−04 | 3.7077044E−04 | −9.9216793E−05 |
| 10 | 0.0000000E+00 | −6.1349592E−04 | 3.6412535E−04 | −1.1772594E−03 | 6.8973455E−04 | −1.8067301E−04 | 1.7213929E−05 |
| 11 | 0.0000000E+00 | 1.4294942E−03 | −6.1220909E−03 | 3.7117939E−03 | −1.7510536E−03 | 3.8726517E−04 | −3.0122132E−05 |

(C)

| | |
|---|---|
| L(in Air) | 18.2 |
| Bf(in Air) | 3.9 |
| f | 5.49 |
| f1 | −7.08 |
| f2 | 5.42 |
| f3 | −5.33 |
| f4 | 7.43 |
| f5 | 7.26 |
| f6 | −11.82 |

TABLE 15

EXAMPLE 15

(A)

| Si | Ri | Di | Ndj | vdj |
|---|---|---|---|---|
| 1 | −26.1336 | 1.7501 | 1.58913 | 61.1 |
| 2 | 3.7248 | 1.2501 | | |
| 3 | 6.2751 | 2.5000 | 1.88300 | 40.8 |
| 4 | −8.5107 | 0.2573 | | |
| 5 (St) | ∞ | 0.7014 | | |
| *6 | −4.3476 | 0.8000 | 1.61396 | 25.5 |
| *7 | 9.5982 | 0.6418 | | |
| 8 | 18.4918 | 2.9500 | 1.62041 | 60.3 |
| 9 | −4.6259 | 0.1500 | | |
| *10 | 6.8235 | 2.8501 | 1.53389 | 56.0 |
| *11 | −10.5477 | 1.0000 | | |
| 12 | −7.7189 | 0.7000 | 1.92286 | 18.9 |
| 13 | −35.0000 | 1.5000 | | |
| 14 | ∞ | 0.4000 | 1.51680 | 64.2 |
| 15 | ∞ | 1.3049 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 2.2098628E−02 | −5.9699773E−02 | 8.0026742E−02 | −5.7200862E−02 | 2.1426482E−02 | −3.2961804E−03 |
| 7 | 0.0000000E+00 | 8.9449964E−03 | −8.3314143E−03 | 3.8237431E−03 | 2.1803695E−03 | −1.4473161E−03 | 2.1119664E−04 |
| 10 | 0.0000000E+00 | 2.0514177E−04 | −1.1406246E−04 | −1.0543480E−03 | 6.4432258E−04 | −1.9152520E−04 | 2.4553639E−05 |
| 11 | 0.0000000E+00 | 3.7553079E−03 | −6.5000368E−03 | 3.9020031E−03 | −1.7645915E−03 | 3.9151478E−04 | −2.9196749E−05 |

(C)

| | |
|---|---|
| L(in Air) | 18.6 |
| Bf(in Air) | 3.1 |
| f | 4.99 |
| f1 | −5.42 |
| f2 | 4.44 |
| f3 | −4.77 |
| f4 | 6.27 |
| f5 | 8.23 |
| f6 | −10.86 |

TABLE 16

EXAMPLE 16

(A)

| Si | Ri | Di | Ndj | vdj |
|---|---|---|---|---|
| 1 | −21.0102 | 1.7500 | 1.58913 | 61.1 |
| 2 | 4.9040 | 1.2501 | | |
| 3 | 6.9855 | 2.5000 | 1.88300 | 40.8 |
| 4 | −10.5260 | 1.1001 | | |
| *5 | −5.4099 | 0.8000 | 1.61396 | 25.5 |
| *6 | 8.1243 | 0.2500 | | |
| 7 (St) | ∞ | 0.2500 | | |
| 8 | 72.2471 | 2.9500 | 1.62041 | 60.3 |
| 9 | −4.6069 | 0.1500 | | |
| *10 | 5.3928 | 2.8506 | 1.53389 | 56.0 |
| *11 | −12.4010 | 1.0000 | | |
| 12 | −8.0297 | 0.7000 | 1.92286 | 18.9 |
| 13 | −35.0000 | 1.5000 | | |
| 14 | ∞ | 0.4000 | 1.51680 | 64.2 |
| 15 | ∞ | 1.3056 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 5 | 0.0000000E+00 | 1.2588476E−02 | −5.9309926E−02 | 7.8712342E−02 | −5.7590302E−02 | 2.1358796E−02 | −3.1128204E−03 |
| 6 | 0.0000000E+00 | −2.6965044E−03 | −6.6241220E−03 | 2.8755124E−03 | 1.4787029E−03 | −1.4086614E−03 | 3.5269203E−04 |

TABLE 16-continued

EXAMPLE 16

| | | | | | | | |
|---|---|---|---|---|---|---|---|
| 10 | 0.0000000E+00 | −7.4948547E−04 | 8.2458115E−04 | −7.9531934E−04 | 6.0536347E−04 | −2.1019359E−04 | 3.3836900E−05 |
| 11 | 0.0000000E+00 | 3.8701776E−03 | −5.1881882E−03 | 3.7066104E−03 | −1.7491324E−03 | 4.1797856E−04 | −2.8406092E−05 |

(C)

| | |
|---|---|
| L(in Air) | 18.6 |
| Bf(in Air) | 3.1 |
| f | 5.11 |
| f1 | −6.58 |
| f2 | 5.10 |
| f3 | −5.17 |
| f4 | 7.08 |
| f5 | 7.45 |
| f6 | −11.43 |

TABLE 17

EXAMPLE 17

(A)

| Si | Ri | Di | Ndj | νdj |
|---|---|---|---|---|
| 1 | 11.1081 | 1.7500 | 1.58913 | 61.1 |
| 2 | 3.2171 | 1.5000 | | |
| 3 | 16.2238 | 2.5000 | 1.88300 | 40.8 |
| 4 | −28.5694 | 0.9500 | | |
| *5 | −20.9426 | 0.8000 | 1.61396 | 25.5 |
| *6 | 5.4512 | 0.2500 | | |
| 7 (St) | ∞ | 0.2500 | | |
| 8 | 28.8034 | 2.9000 | 1.58313 | 59.4 |
| 9 | −3.8918 | 0.1500 | | |
| *10 | 4.5559 | 3.0000 | 1.53389 | 56.0 |
| *11 | −6.6767 | 1.0000 | | |
| 12 | −4.9723 | 0.7000 | 1.92286 | 18.9 |
| 13 | −35.0000 | 1.5000 | | |
| 14 | ∞ | 0.4000 | 1.51680 | 64.2 |
| 15 | ∞ | 1.0784 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 5 | 0.0000000E+00 | 3.0669869E−02 | −8.8938432E−02 | 9.2339788E−02 | −5.8744845E−02 | 1.9886508E−02 | −2.8094543E−03 |
| 6 | 0.0000000E+00 | 5.0822352E−03 | −1.8931229E−02 | 5.8451331E−03 | 2.3804051E−03 | −1.8823789E−03 | 3.7914861E−04 |
| 10 | 0.0000000E+00 | −1.2530040E−03 | 2.5128402E−03 | −1.3777984E−03 | 6.8278770E−04 | −1.6631240E−04 | 2.0727310E−05 |
| 11 | 0.0000000E+00 | 7.9354727E−03 | −8.4317700E−03 | 4.9406498E−03 | −1.7127414E−03 | 3.4495859E−04 | −2.6376292E−05 |

(C)

| | |
|---|---|
| L(in Air) | 18.6 |
| Bf(in Air) | 2.8 |
| f | 4.21 |
| f1 | −8.38 |
| f2 | 12.03 |
| f3 | −6.96 |
| f4 | 6.08 |
| f5 | 5.59 |
| f6 | −6.35 |

TABLE 18

EXAMPLE 18

(A)

| Si | Ri | Di | Ndj | νdj |
|---|---|---|---|---|
| 1 | 25.7886 | 1.7500 | 1.75500 | 52.3 |
| 2 | 3.5538 | 1.5000 | | |
| 3 | 9.0635 | 2.5000 | 1.83481 | 42.7 |

TABLE 18-continued

EXAMPLE 18

| | | | | | |
|---|---|---|---|---|---|
| 4 | −13.5645 | 0.9500 | | | |
| *5 | 77.8236 | 0.8000 | 1.63355 | 23.6 | |
| *6 | 4.6560 | 0.2500 | | | |
| 7 (St) | ∞ | 0.2500 | | | |
| 8 | −124.6886 | 2.9000 | 1.58313 | 59.4 | |
| 9 | −4.6122 | 0.1500 | | | |
| *10 | 4.2172 | 3.0000 | 1.53389 | 56.0 | |
| *11 | −5.6427 | 1.0000 | | | |
| 12 | −4.7018 | 0.7000 | 1.92286 | 18.9 | |
| 13 | −35.0000 | 1.5000 | | | |
| 14 | ∞ | 0.4000 | 1.51680 | 64.2 | |
| 15 | ∞ | 1.0771 | | | |
| IMAGE PLANE | ∞ | | | | |

(B)

| SURFACE NUMBER | KA | RB3 | RB4 | RB5 | RB6 | RB7 | RB8 |
|---|---|---|---|---|---|---|---|
| 5 | 0.0000000E+00 | 2.5869581E−02 | −8.3884335E−02 | 8.9865171E−02 | −5.8785515E−02 | 2.0355547E−02 | −2.8255948E−03 |
| 6 | 0.0000000E+00 | 1.2510596E−03 | −1.9658086E−02 | 5.0704022E−03 | 2.2390423E−03 | −1.7745286E−03 | 4.1570054E−04 |
| 10 | 0.0000000E+00 | −1.2384623E−03 | 2.5659755E−03 | −1.3416888E−03 | 6.9608287E−04 | −1.6535504E−04 | 2.0081774E−05 |
| 11 | 0.0000000E+00 | 9.4807217E−03 | −8.4663952E−03 | 5.0457963E−03 | −1.6745566E−03 | 3.4808366E−04 | −3.0696592E−05 |

(C)

| | |
|---|---|
| L(in Air) | 13.6 |
| Bf(in Air) | 2.8 |
| f | 4.20 |
| f1 | −5.65 |
| f2 | 6.85 |
| f3 | −7.85 |
| f4 | 8.14 |
| f5 | 5.06 |
| f6 | −5.95 |

TABLE 19

EXAMPLE 19

(A)

| Si | Ri | Di | Ndj | νdj |
|---|---|---|---|---|
| 1 | 19.8779 | 1.7500 | 1.71300 | 53.9 |
| 2 | 3.3964 | 1.5000 | | |
| 3 | 9.4875 | 2.5000 | 1.75500 | 52.3 |
| 4 | −19.1241 | 0.9500 | | |
| *5 | 33.9076 | 0.8000 | 1.61396 | 25.5 |
| *6 | 4.8130 | 0.2500 | | |
| 7 (St) | ∞ | 0.2500 | | |
| 8 | 76.0495 | 2.9000 | 1.58313 | 59.4 |
| 9 | −4.2338 | 0.1500 | | |
| *10 | 4.4704 | 3.0000 | 1.53389 | 56.0 |
| *11 | −6.5586 | 1.0000 | | |
| 12 | −4.5889 | 0.7000 | 1.92286 | 18.9 |
| 13 | −35.0000 | 1.5000 | | |
| 14 | ∞ | 0.4000 | 1.51680 | 64.2 |
| 15 | ∞ | 1.0780 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 5 | 0.0000000E+00 | 3.1393128E−02 | −8.6960673E−02 | 9.1434536E−02 | −5.9009652E−02 | 1.9953415E−02 | −2.7353426E−03 |
| 6 | 0.0000000E+00 | 6.5191930E−03 | −1.9952509E−02 | 5.2779971E−03 | 2.1858220E−03 | −1.8920639E−03 | 4.1913551E−04 |
| 10 | 0.0000000E+00 | −1.3732364E−03 | 2.8895238E−03 | −1.3324877E−03 | 6.8770942E−04 | −1.6582422E−04 | 2.0886941E−05 |
| 11 | 0.0000000E+00 | 8.3254704E−03 | −8.4463389E−03 | 4.9965045E−03 | −1.6934405E−03 | 3.4607803E−04 | −2.8861121E−05 |

(C)

| | |
|---|---|
| L(in Air) | 18.6 |
| Bf(in Air) | 2.8 |

TABLE 19-continued

EXAMPLE 19

| | |
|---|---|
| f | 4.21 |
| f1 | −6.01 |
| f2 | 8.73 |
| f3 | −9.23 |
| f4 | 6.97 |
| f5 | 5.50 |
| f6 | −5.79 |

TABLE 20

EXAMPLE 20

(A)

| Si | Ri | Di | Ndj | νdj |
|---|---|---|---|---|
| 1 | 15.4939 | 1.7500 | 1.77250 | 49.6 |
| 2 | 3.6111 | 1.2500 | | |
| 3 | 4.7139 | 2.5000 | 1.83400 | 37.2 |
| 4 | −16.9989 | 0.2500 | | |
| 5 (St) | ∞ | 0.7000 | | |
| *6 | −6.5220 | 0.8000 | 1.63355 | 23.6 |
| *7 | 5.8725 | 0.5000 | | |
| 8 | 40.0006 | 2.9500 | 1.51680 | 64.2 |
| 9 | −4.6242 | 0.1500 | | |
| *10 | 4.2588 | 3.5000 | 1.51104 | 56.8 |
| *11 | −16.6843 | 1.0000 | | |
| 12 | −8.7938 | 0.7000 | 1.92286 | 18.9 |
| 13 | −35.0000 | 1.5000 | | |
| 14 | ∞ | 0.4000 | 1.51680 | 64.2 |
| 15 | ∞ | 1.0538 | | |
| IMAGE PLANE | ∞ | | | |

(B)

| SURFACE NUMBER | KA | RB3 | RB4 | RB5 | RB6 | RB7 | RB8 |
|---|---|---|---|---|---|---|---|
| 6 | 0.0000000E+00 | 7.2390437E−03 | −4.6283514E−02 | 6.6392069E−02 | −5.1487038E−02 | 2.0859023E−02 | −3.3740349E−03 |
| 7 | 0.0000000E+00 | −3.0276571E−03 | −9.3718389E−03 | 4.7778112E−03 | −6.4064575E−04 | 4.0638349E−04 | −1.0699402E−04 |
| 10 | 0.0000000E+00 | −1.4962326E−04 | 3.4477491E−05 | −1.1486513E−03 | 7.0278537E−04 | −1.7952806E−04 | 1.6975985E−05 |
| 11 | 0.0000000E+00 | 3.2036726E−03 | −6.3095606E−03 | 3.6878379E−03 | −1.7425956E−03 | 3.8965389E−04 | −3.0648549E−05 |

(C)

| | |
|---|---|
| L(in Air) | 18.9 |
| Bf(in Air) | 2.8 |
| f | 5.91 |
| f1 | −6.51 |
| f2 | 4.67 |
| f3 | −4.76 |
| f4 | 8.21 |
| f5 | 7.04 |
| f6 | −12.89 |

TABLE 21

FORMULA

| EXAMPLE | (1) Nd3 | (2) $\frac{L3F + L3R}{L3F - L3R}$ | (3) f5/f | (4) f4/f5 | (5) f3/f | (6) \|L3R/f\| | (7) \|L5F/L5R\| | (8) L4R/f | (9) L/f | (10) Bf/f | (11) \|L1F/f\| | (12) f3/f5 | (13) $\frac{L1F - L1R}{L1F + L1R}$ | (14) $\frac{L4F - L4R}{L4F + L4R}$ | (15) $\frac{L5F + L5R}{L5F - L5R}$ |
|---|---|---|---|---|---|---|---|---|---|---|---|---|---|---|---|
| 1 | 1.61 | 0.16 | 1.31 | 1.12 | −1.29 | 1.39 | 0.75 | −0.98 | 4.44 | 0.72 | 4.16 | −0.98 | 0.70 | 1.53 | −0.14 |
| 2 | 1.61 | 0.27 | 1.31 | 1.11 | −1.40 | 1.38 | 0.74 | −0.99 | 4.40 | 0.69 | 4.15 | −1.07 | 0.70 | 1.53 | −0.15 |
| 3 | 1.61 | 0.58 | 1.20 | 1.40 | −1.26 | 1.00 | 0.82 | −1.27 | 4.47 | 0.73 | 4.74 | −1.05 | 0.72 | 1.00 | −0.10 |
| 4 | 1.61 | 0.08 | 1.60 | 0.78 | −1.63 | 1.88 | 0.67 | −0.87 | 4.19 | 0.68 | 4.44 | −1.02 | 0.73 | 1.71 | −0.20 |
| 5 | 1.61 | 0.37 | 1.41 | 0.95 | −1.55 | 1.41 | 0.80 | −0.96 | 4.46 | 0.69 | 3.75 | −1.10 | 0.65 | 1.51 | −0.11 |
| 6 | 1.61 | 0.17 | 1.21 | 1.42 | −1.18 | 1.26 | 0.99 | −1.07 | 4.13 | 0.62 | 3.34 | −0.97 | 0.65 | 1.00 | 0.00 |
| 7 | 1.63 | 0.37 | 1.30 | 1.14 | −1.46 | 1.37 | 0.70 | −0.93 | 4.28 | 0.66 | 3.52 | −1.12 | 0.63 | 1.23 | −0.17 |
| 8 | 1.58 | 0.35 | 1.38 | 1.03 | −1.74 | 1.53 | 0.76 | −0.96 | 4.54 | 0.70 | 3.74 | −1.26 | 0.64 | 1.50 | −0.13 |
| 9 | 1.61 | −0.09 | 0.99 | 1.58 | −0.66 | 0.92 | 0.49 | −0.90 | 3.28 | 0.50 | 2.70 | −0.67 | 0.62 | 1.29 | −0.34 |
| 10 | 1.61 | −0.11 | 1.05 | 1.38 | −0.69 | 0.98 | 0.44 | −0.82 | 3.15 | 0.52 | 2.62 | −0.66 | 0.64 | 1.27 | −0.39 |

TABLE 21-continued

| | | FORMULA | | | | | | | | | | | | | |
|---|---|---|---|---|---|---|---|---|---|---|---|---|---|---|---|
| EX-AM-PLE | (1) Nd3 | (2) L3F + L3R / L3F − L3R | (3) f5/f | (4) f4/f5 | (5) f3/f | (6) \|L3R/f\| | (7) \|L5F/L5R\| | (8) L4R/f | (9) L/f | (10) Bf/f | (11) \|L1F/f\| | (12) f3/f5 | (13) L1F − L1R / L1F + L1R | (14) L4F − L4R / L4F + L4R | (15) L5F + L5R / L5F − L5R |
| 11 | 1.61 | −0.22 | 1.15 | 1.31 | −0.87 | 1.41 | 0.58 | −0.78 | 3.56 | 0.59 | 4.66 | −0.75 | 0.73 | 0.64 | −0.27 |
| 12 | 1.63 | −1.88 | 1.02 | 1.76 | −1.00 | 1.34 | 0.63 | −1.11 | 3.45 | 0.57 | 3.06 | −0.97 | 0.65 | 0.71 | −0.23 |
| 13 | 1.61 | 0.38 | 1.44 | 0.98 | −1.67 | 1.51 | 0.65 | −0.92 | 4.42 | 0.67 | 5.09 | −1.16 | 0.72 | 1.39 | −0.21 |
| 14 | 1.61 | 0.14 | 1.32 | 1.02 | −0.97 | 1.06 | 0.30 | −0.82 | 3.32 | 0.72 | 3.01 | −0.73 | 0.68 | 1.58 | −0.54 |
| 15 | 1.61 | −0.38 | 1.65 | 0.76 | −0.96 | 1.93 | 0.65 | −0.93 | 3.73 | 0.62 | 5.24 | −0.58 | 1.33 | 1.67 | −0.21 |
| 16 | 1.61 | −0.20 | 1.46 | 0.95 | −1.01 | 1.59 | 0.43 | −0.90 | 3.64 | 0.60 | 4.11 | −0.69 | 1.61 | 1.14 | −0.39 |
| 17 | 1.61 | 0.59 | 1.33 | 1.09 | −1.66 | 1.30 | 0.68 | −0.93 | 4.42 | 0.68 | 2.64 | −1.25 | 0.55 | 1.31 | −0.19 |
| 18 | 1.63 | 1.13 | 1.20 | 1.61 | −1.87 | 1.11 | 0.75 | −1.10 | 4.42 | 0.68 | 6.13 | −1.55 | 0.76 | 0.93 | −0.14 |
| 19 | 1.61 | 1.33 | 1.31 | 1.27 | −2.19 | 1.14 | 0.68 | −1.01 | 4.42 | 0.68 | 4.73 | −1.68 | 0.71 | 1.12 | −0.19 |
| 20 | 1.63 | 0.05 | 1.19 | 1.17 | −0.81 | 0.99 | 0.26 | −0.78 | 3.19 | 0.48 | 2.62 | −0.68 | 0.62 | 1.26 | −0.59 |

In all of the imaging lenses of Examples 1 through 20, the first lens L1, the second lens L2, the fourth lens L4 and the sixth lens L6 are glass spheric lenses, and the third lens L3 and the fifth lens L5 are plastic aspheric lenses.

FIG. 25, Section A through FIG. 25, Section D, FIG. 26, Section A through FIG. 26, Section D, FIG. 27, Section A through FIG. 27, Section D, FIG. 28, Section A through FIG. 28, Section D, FIG. 29, Section A through FIG. 29, Section D, FIG. 30, Section A through FIG. 30, Section D, FIG. 31, Section A through FIG. 31, Section D, FIG. 32, Section A through FIG. 32, Section D, FIG. 33, Section A through FIG. 33, Section D, FIG. 34, Section A through FIG. 34, Section D, FIG. 35, Section A through FIG. 35, Section D, FIG. 36, Section A through FIG. 36, Section D, FIG. 37, Section A through FIG. 37, Section D, FIG. 38, Section A through FIG. 38, Section D, FIG. 39, Section A through FIG. 39, Section D, FIG. 40, Section A through FIG. 40, Section D, FIG. 41, Section A through FIG. 41, Section D, FIG. 42, Section A through FIG. 42, Section D, FIG. 43, Section A through FIG. 43, Section D, and FIG. 44, Section A through FIG. 44, Section D show aberration diagrams of the imaging lenses of Examples 1 through 20, respectively.

Here, the aberration diagrams of Example 1 will be explained as an example, but the aberration diagrams of the other examples are similar to those of Example 1. FIG. 25, Section A, FIG. 25, Section B, FIG. 25, Section C and FIG. 25, Section D illustrate a spherical aberration, astigmatism, distortion (distortion aberration), and a lateral chromatic aberration (a chromatic aberration of magnification) in the imaging lens of Example 1, respectively. In the spherical aberration diagram, Fno. represents F-number, and in the other diagrams, ω represents a half angle of view. In the diagram of distortion, a shift amount from an ideal image height f×tan (φ) is illustrated by using focal length f of the entire system and angle φ of view (variable, 0≤φ≤ω). Each aberration diagram illustrates an aberration when d-line (587.56 nm) is a reference wavelength. The spherical aberration diagram illustrates aberrations also for F-line (wavelength 486.13 nm) C-line (wavelength 656.27 nm), s-line (wavelength 852.11 nm) and an offense against the sine condition (indicated as SNC). Further, the diagram of lateral chromatic aberration illustrates aberrations for F-line, C-line and s-line.

As these data show, the imaging lenses of Examples 1 through 20 are small-sized and structured at low cost. Further, the F-number is in the range of 1.50 to 1.80, which is small, and the full angle of view is 45.0° through 61.0°. Further, the imaging lens has high optical performance in which various aberrations are corrected in an excellent manner. These imaging lenses are appropriate for use in a surveillance camera, an in-vehicle camera for imaging an image on the front side, the lateral sides, the rear side or the like of a car, or the like.

Figure 45:
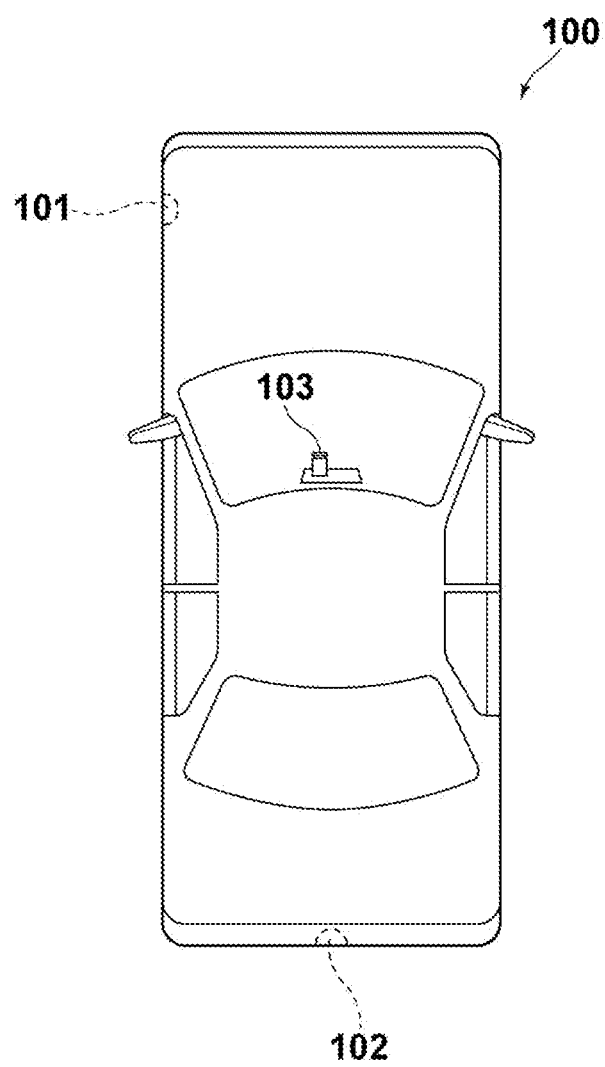
FIG. 45 is a diagram for explaining the arrangement of an imaging apparatus for in-vehicle use according to an embodiment of the present invention.

FIG. 45 illustrates an application example in which an imaging apparatus including the imaging lens of the present embodiment is mounted in a car 100. In FIG. 45, the car 100 includes an exterior camera 101 for imaging a driver's blind spot on a side of a seat next to the driver, an exterior camera 102 for imaging a driver's blind spot on a rear side of the car 100, and an interior camera 103 for imaging the same range as the driver's visual field. The interior camera 103 is attached to the back side of a rearview mirror. The exterior camera 101, the exterior camera 102, and the interior camera 103 are imaging apparatuses according to an embodiment of the present invention, and they include an imaging lens according to an embodiment of the present invention and an imaging device for converting an optical image formed by the imaging lens into electrical signals.

The imaging lenses according to the embodiments of the present invention have the aforementioned advantages. Therefore, the exterior cameras 101 and 102, and the interior camera 103 can be structured in small size and at low cost. They can be used even in low illumination photography conditions. Further, high-resolution excellent images are obtainable.

So far, the present invention has been described by using embodiments and examples. However, the present invention is not limited to the aforementioned embodiments nor examples, and various modifications are possible. For example, values of a curvature radius, a distance between surfaces, a refractive index, an Abbe number, and aspheric surface coefficients of each lens element are not limited to the values in the aforementioned examples of numerical values, but may be other values.

In the embodiment of the imaging apparatus, a case in which the present invention is applied to an in-vehicle camera was illustrated in the drawing and described. However, application of the present invention is not limited to this purpose. For example, the present invention may be applied to a camera for a mobile terminal, a surveillance camera, and the like.

What is claimed is:
1. An imaging lens, consisting of:
a negative first lens having a concave image-side surface;
a positive second lens;
a negative third lens;
a positive fourth lens;
a positive fifth lens having a convex image-side surface; and
a negative sixth lens, which are in this order from an object side, wherein all of the lenses constituting the lens system are single lenses, which are not cemented lenses, wherein a stop is arranged closer to the object side than an image-side surface of the fourth lens is arranged, wherein when a refractive index of a material of the third lens for d-line is Nd3, the following formula (1-1) is satisfied:

$$Nd3<1.65 \qquad (1\text{-}1),\text{ and}$$

wherein the Abbe number of the material of the third lens for d-line is less than or equal to 30.2.

2. The imaging lens, as defined in claim 1, wherein when a curvature radius of an object-side surface of the third lens and a curvature radius of an image-side surface of the third lens are L3F and L3R, respectively, and a focal length of the entire system is f, and a focal length of the fifth lens is f5, the following formulas (2) and (3) are satisfied:

$$-0.1<(L3F+L3R)/(L3F-L3R) \qquad (2);\text{ and}$$

$$1.15<f5/f<3.00 \qquad (3).$$

3. The imaging lens, as defined in claim 1, wherein when a focal length of the fourth lens is f4, and a focal length of the fifth lens is f5, the following formula (4) is satisfied:

$$1.29<f4/f5<2.5 \qquad (4).$$

4. The imaging lens, as defined in claim 1, wherein an Abbe number of a material of the first lens for d-line is greater than or equal to 40, and wherein an Abbe number of a material of the second lens for d-line is greater than or equal to 25, and wherein an Abbe number of a material of the third lens for d-line is less than or equal to 30.2, and wherein an Abbe number of a material of the fourth lens for d-line is greater than or equal to 40, and wherein an Abbe number of a material of the fifth lens for d-line is greater than or equal to 40, and wherein an Abbe number of a material of the sixth lens for d-line is less than or equal to 25.

5. The imaging lens, as defined in claim 1, wherein a material of the third lens and a material of the fifth lens are plastic.

6. The imaging lens, as defined in claim 1, wherein when a focal length of the entire system is f, and a focal length of the third lens is f3, the following formula (5) is satisfied:

$$-2.5<f3/f<-0.4 \qquad (5).$$

7. The imaging lens, as defined in claim 1, wherein the absolute value of a curvature radius of an object-side surface of the second lens is less than the absolute value of a curvature radius of an image-side surface of the second lens.

8. The imaging lens, as defined in claim 1, wherein when a focal length of the entire system is f and a curvature radius of an image-side surface of the third lens is L3R, the following formula (6) is satisfied:

$$0.5<|L3R/f|<2.5 \qquad (6).$$

9. The imaging lens, as defined in claim 1, wherein when a focal length of the entire system is f, and a curvature radius of an object-side surface of the fifth lens and a curvature radius of an image-side surface of the fifth lens are L5F and L5R, respectively, the following formula (7) is satisfied:

$$0.1<|L5F/L5R|<1.5 \qquad (7).$$

10. The imaging lens, as defined in claim 1, wherein when a focal length of the entire system is f, and a curvature radius of an image-side surface of the fourth lens is L4R, the following formula (8) is satisfied:

$$-2.5<L4R/f<-0.5 \qquad (8).$$

11. The imaging lens, as defined in claim 1, wherein the stop is arranged between an object-side surface of the second lens and the image-side surface of the fourth lens.

12. The imaging lens, as defined in claim 1, wherein the center thickness of the first lens is greater than or equal to 1.5 mm.

13. The imaging lens, as defined in claim 1, wherein when a curvature radius of an object-side surface of the third lens and a curvature radius of an image-side surface of the third lens are L3F and L3R, respectively, the following formula (2-1) is satisfied:

$$-0.1<(L3F+L3R)/(L3F-L3R)<0.6 \qquad (2\text{-}1).$$

14. The imaging lens, as defined in claim 1, wherein when a focal length of the entire system is f, and a focal length of the fifth lens is f5, the following formula (3-1) is satisfied:

$$1.19<f5/f<1.65 \qquad (3\text{-}1).$$

15. The imaging lens, as defined in claim 1, wherein when a focal length of the fourth lens is f4 and a focal length of the fifth lens is f5, the following formula (4-1) is satisfied:

$$1.32<f4/f5<1.85 \qquad (4\text{-}1).$$

16. An imaging apparatus, comprising an imaging lens, as defined in claim 1.

17. An imaging lens, consisting of:

a negative first lens having a concave image-side surface;

a positive second lens;

a negative third lens;

a positive fourth lens;

a positive fifth lens having a convex image-side surface; and a negative sixth lens, which are in this order from an object side, wherein when a refractive index of a material of the third lens for d-line is Nd3, the following formula (1-1) is satisfied:

$$Nd3<1.65 \qquad (1\text{-}1),\text{ and}$$

wherein the Abbe number of the material of the third lens for d-line is less than or equal to 30.2.

18. The imaging lens of claim 17, wherein all of the lenses constituting the lens system are single lenses, which are not cemented lenses.

19. The imaging lens of claim 17, wherein a stop is arranged closer to the object side than an image-side surface of the fourth lens is arranged.

* * * * *